(12) United States Patent
Hayama et al.

(10) Patent No.: US 7,110,147 B1
(45) Date of Patent: Sep. 19, 2006

(54) IMAGE PROCESSING METHOD AND APPARATUS

(75) Inventors: Hitoshi Hayama, Shiojiri (JP); Yoshiharu Konishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1275 days.

(21) Appl. No.: 09/657,213

(22) Filed: Sep. 7, 2000

(30) Foreign Application Priority Data

Sep. 9, 1999 (JP) ............................................ 11-256193
Sep. 9, 1999 (JP) ............................................ 11-256197

(51) Int. Cl.
*H04N 1/387* (2006.01)

(52) U.S. Cl. ........................ 358/464; 358/452; 358/537
(58) Field of Classification Search ................ 358/452, 358/453, 462, 464, 537; 347/172; 400/61, 400/62, 76, 120.02
See application file for complete search history.

(56) References Cited

U.S. PATENT DOCUMENTS

| | | | | | |
|---|---|---|---|---|---|
| 5,200,739 | A | * | 4/1993 | Eland ........................... 345/634 |
| 5,206,719 | A | * | 4/1993 | Ikeda et al. ................... 358/518 |
| 5,563,713 | A | * | 10/1996 | Sugiura ....................... 382/256 |
| 5,691,827 | A | * | 11/1997 | Kamei et al. ................ 358/530 |
| 5,760,929 | A | * | 6/1998 | Ichikawa et al. ............. 358/2.1 |
| 5,855,440 | A | * | 1/1999 | Ueno et al. .................... 400/76 |
| 5,890,820 | A | * | 4/1999 | Handa ...................... 400/615.2 |
| 6,169,607 | B1 | * | 1/2001 | Harrington ................... 358/1.9 |
| 6,314,213 | B1 | * | 11/2001 | Miyahara et al. ........... 382/312 |
| 6,600,832 | B1 | * | 7/2003 | Nakayama et al. ......... 382/162 |

* cited by examiner

*Primary Examiner*—Thomas D. Lee
(74) *Attorney, Agent, or Firm*—Hogan & Hartson, LLP

(57) ABSTRACT

A decorated character image is formed by arranging at least one decorated character formed by providing a desired character decoration on at least one arbitrary character, on an arbitrary background, with a character color being set to a character portion corresponding to the at least one arbitrary character, and a decorative color being set to a decorative portion corresponding to a portion formed by the desired character decoration. The decorated character image includes the character portion, the decorative portion, and a background portion formed by removing the character portion and the decorative portion from the background. At least one predetermined first default color is each set to a corresponding one of at least one of the character color and the decorative color, when arbitrary setting of the at least one of the character color and the decorative character is omitted. When a combination of the character color the decorative color makes the character portion and the decorative portion difficult to discriminate from each other, a predetermined second default color is set to one of the character color and the decorative color. The decorated character image is formed by coloring the character portion and the decorative portion with the character color and the decorative color, respectively.

42 Claims, 30 Drawing Sheets

F I G. 4
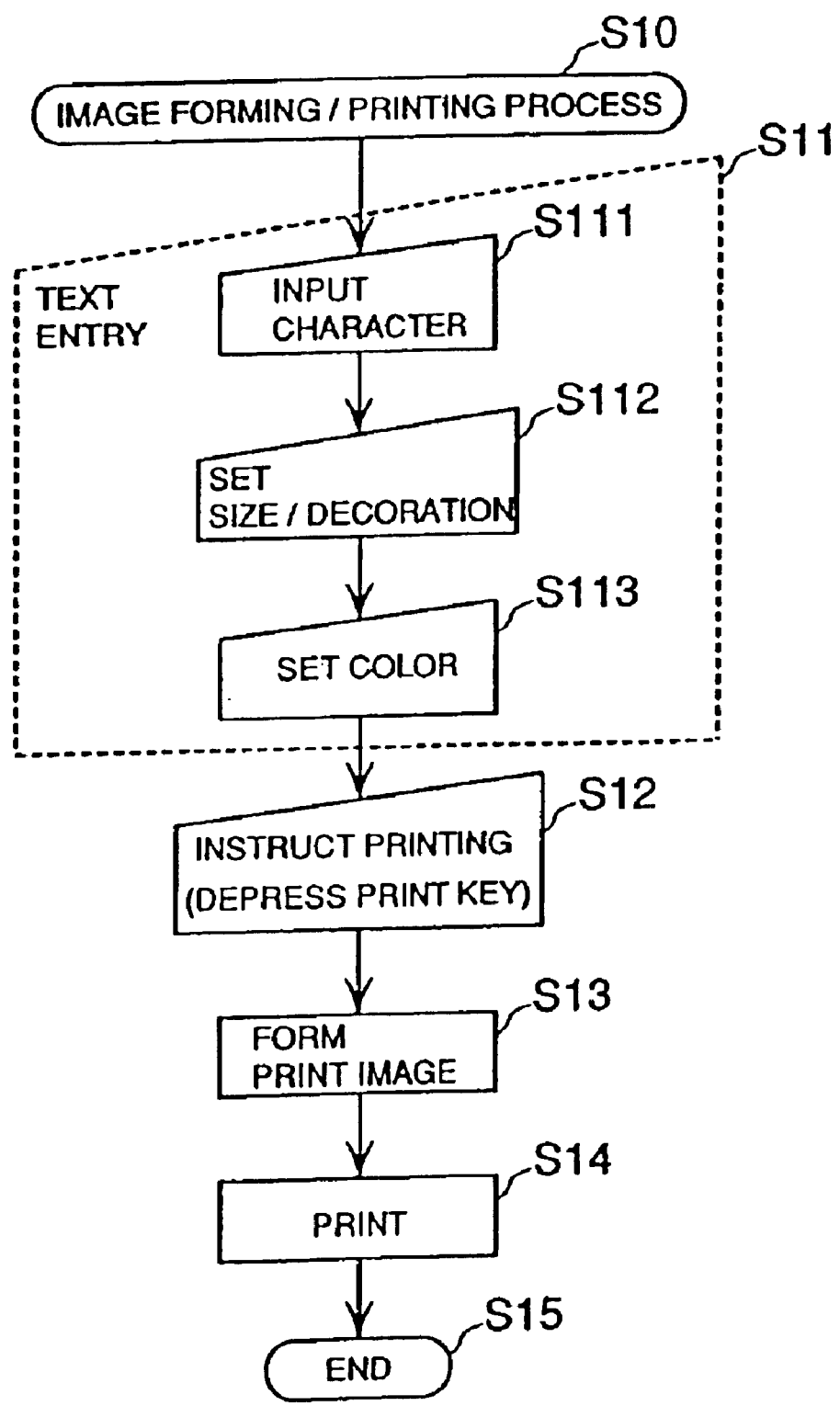

F I G. 5

|   | A | B | C | D | E | F | G | H | I | J | K |
|---|---|---|---|---|---|---|---|---|---|---|---|
| 1 | PEACH | LIGHT RED | FLESH | EGG YORK | MAIZE (LIGHT YELLOW) | VERDANT GREEN | LIGHT GREEN | AQUA | BRIGHT BLUE | LIGHT LILAC | TRANS-PERLANT |
| 2 | PEONY | BRIGHT READ | BRIGHT VERMILION | BRIGHT YELLOW | LEMON YELLOW | YELLOW-ISH GREEN | YONG BAMBOO | BRIGHT GREEN | BLUE LILAC | DARK LILAC | WHITE |
| 3 | AMA-RANTH | RED | VERMILION | ORANGE | YELLOW | LIGHT GREEN | GREEN | CYAN | BLUE | LAVENDER | BRIGHT GRAY |
| 4 | PONCEAU RED | DARK RED | ROSE | BRIGHT BROWN | KHAKI | PINE NEEDLE | DEEP GREEN | BRIGHT GREEN | AZURE | BELL-FLOWER | GRAY |
| 5 | PURPLE | DARK BROWN | MAJOLICA | CHEST-NUT BROWN | DRY LEAF | GRASS GREEN | DARK GREEN | STEELY BLACK | DARK INDIGO | INDIGO | DARK GRAY |
| 6 | PONCEAU LILAC | LIGHT BROWN | SAND | IVORY | DRY GRASS | POW-DERED GREEN | SAGE GREEN | PERSE | LIGHT INDIGO | DARK BLUE | BLACK |

FIG. 6

| No. | COLOR MODE | BACKGROUND | | FRAME | | CHAR-ACTER COLOR |
|---|---|---|---|---|---|---|
| | | BACK-GROUND COLOR | BACK-GROUND PATTERN COLOR | FRAME LINE COLOR | IN-FRAME COLOR | |
| 1 | CAUTION | E3 | K6 | K6 | E3 | K6 |
| 2 | ACTIVE | B3 | E3 | E3 | I3 | E3 |
| 3 | CASUAL | G3 | K2 | K2 | B3 | K2 |
| 4 | NATURAL | D6 | D4 | D4 | F1 | D4 |
| 5 | FRESH | I3 | E3 | E3 | G2 | E3 |
| 6 | COOL | H2 | K3 | K3 | I6 | K3 |
| 7 | CLEAR | I4 | K2 | K2 | H4 | K2 |
| 8 | SOFT | H1 | I4 | I4 | J2 | I4 |
| 9 | FANCY | A1 | J2 | J2 | G1 | J2 |
| 10 | PRETTY | B1 | E1 | E1 | I2 | E1 |
| 11 | RELAX | G2 | B6 | B6 | E1 | B6 |
| 12 | MODERN | K6 | B3 | B3 | K4 | B3 |
| 13 | CLASSIC | C5 | E5 | E5 | G5 | E5 |
| 14 | ELEGANT | A1 | A6 | A6 | K2 | A6 |
| 15 | TRADITIONAL | D5 | C6 | C6 | K6 | C6 |
| 16 | DANDY | K6 | C5 | C5 | K4 | C5 |
| 17 | GORGEOUS | J4 | C6 | C6 | B4 | C6 |
| 18 | ETHNIC | E5 | B4 | B4 | G5 | B4 |
| 19 | CHIC | K5 | K3 | K3 | J2 | K3 |
| 20 | MONOTONE | K6 | K2 | K2 | K4 | K2 |

FIG. 7

| No. | COLOR MODE | DECORATIVE COLOR | | | | |
|---|---|---|---|---|---|---|
| | | OUTLINE COLOR | SHADE COLOR | ENCLOSING LINE COLOR | ENCLOSED PORTION COLOR | MESH COLOR |
| 1 | CAUTION | K6 | K6 | K6 | E3 | K6 |
| 2 | ACTIVE | E3 | E3 | E3 | B3 | E3 |
| 3 | CASUAL | K2 | K2 | K2 | G3 | K2 |
| 4 | NATURAL | D4 | D4 | D4 | D6 | D4 |
| 5 | FRESH | E3 | E3 | E3 | I3 | E3 |
| 6 | COOL | K3 | K3 | K3 | H2 | K3 |
| 7 | CLEAR | K2 | K2 | K2 | I4 | K2 |
| 8 | SOFT | I4 | I4 | I4 | H1 | I4 |
| 9 | FANCY | J2 | J2 | J2 | A1 | J2 |
| 10 | PRETTY | E1 | E1 | E1 | B1 | E1 |
| 11 | RELAX | B6 | B6 | B6 | G2 | B6 |
| 12 | MODERN | B3 | B3 | B3 | K6 | B3 |
| 13 | CLASSIC | E5 | E5 | E5 | C5 | E5 |
| 14 | ELEGANT | A6 | A6 | A6 | A1 | A6 |
| 15 | TRADITIONAL | C6 | C6 | C6 | D5 | C6 |
| 16 | DANDY | C5 | C5 | C5 | K6 | C5 |
| 17 | GORGEOUS | C6 | C6 | C6 | J4 | C6 |
| 18 | ETHNIC | B4 | B4 | B4 | E5 | B4 |
| 19 | CHIC | K3 | K3 | K3 | K5 | K3 |
| 20 | MONOTONE | K2 | K2 | K2 | K6 | K2 |

IMAGE PROCESSING METHOD AND APPARATUS

BACKGROUND OF THE INVENTION

1. Field of the Invention

This invention relates to an image processing method and apparatus, and more particularly to an image processing method and apparatus for processing a decorated character image formed by arranging decorated characters formed by decorating arbitrary characters as desired, on an arbitrary background.

2. Prior Art

In general, in an image processing method and apparatus of this kind, for instance, when a color image is processed, the color of each pixel of the color image is represented by gradation values of respective basic colors for use in composing various colors. For the color of each pixel of a display image, for instance, three colors R (red), G (green), and B (blue) are defined as the basic colors, while for the color of each pixel of a print image, three primary colors C (cyan), M (magenta), and Y (yellow), or the three primary colors plus a color K (black) are defined as the basic colors. A color image is represented by image data in which the color of each pixel of the color image is expressed by decomposing it into gradation values indicative of respective gradation (gray) levels of the basic colors. As a result, the colors of the pixels of the color image are expressed by a so-called additive or subtractive color mixing process. Further, for instance, when a unicolored monochrome (e.g. black and white) image is processed, the colors (gray tones) of pixels of the monochrome image are represented by gradation values of the pixels.

Therefore, in an image processing method and apparatus of the above-mentioned kind, if a color image is to be processed, arbitrary colors are set, or if a monochrome image is to be processed, arbitrary gradation values (gray tones) are set, to portions of the image to be processed (elements forming the image to be processed: image elements or the like) such that the image can be formed or output (displayed or printed) according to the settings. It should be noted that in the following description, a color image and a monochrome image are not particularly distinguished from each other since the monochrome image can be regarded as color image of a type which is small in the total number of gradation values that can represent the color of the image (i.e. low in resolution). For this reason, let it be assumed that in the following description, the concept of "color" includes one represented only by gray tones (gradation values), that is, different colors include identical colors different from each other only in gray tone (gradation value), for instance. Further, when an image contains a lot of colors (including gray tones, as described above) to be represented, the image is described as "an image having a high resolutions", whereas when an image contains a small number of colors to be represented, the image is described as "an image having a low resolutions".

Now, when there are many kinds of colors which can be set, and further when there are a lot of image elements whose color can be set separately, it is a very troublesome and time-consuming work to select desired colors one by one from the many kinds of colors and set them for the image elements. To eliminate this inconvenience, the present assignee proposed a setting method which is capable of selectively setting a predetermined default color adapted to an image or impression of a keyword or the like instead of setting colors for all the elements of a character image, thereby saving part of the trouble of effecting settings of the above-mentioned kind (Japanese Patent Application No. 10-54432). The same setting method can be employed also when a decorated character image is formed by arranging decorated characters formed by decorating arbitrary characters as desired, on an arbitrary background (see FIGS. 5 and 6). According to this setting method, it is possible to effect ordinary settings required for forming a decorated character image, simply by selecting a predetermined mode (color mode) as one adapted to a whole image or impression of the decorated character image, or thereafter further arbitrarily changing only colors of desired elements, thereby saving part or whole of a troublesome setting operation. (It should be noted that throughout the especification and claims appended thereto, the term "character image" is used to mean "image of at least one character".)

However, depending on a combination of predetermined default colors set for individual image elements, or a combination of a default color and a color set as desired, it is sometimes difficult to discern elements (image elements) from each other. For instance, generally, a character portion corresponding to a character or characters of a decorated character image is desired to be made conspicuous against a background thereof, so that a default color set to the character portion is also made conspicuous against a default color set for the background. Further, similarly, a decorative portion corresponding to a portion for decorating the character portion of the decorated character image is also desired to be made conspicuous against the background thereof, so that a default color for the decorative portion is also set conspicuous against the default color for the background (see FIGS. 5 to 7). Therefore, a default color for the character portion and a default color for the decorative portion are liable to become identical or similar (similar colors include different colors but having gradation values identical or close to each other: identical or similar colors in the case of a monochrome image) to each other, and when settings of colors of both of the character portion and the decorative portion are omitted, a combination of default colors are set for the character portion and the decorative portion, respectively, which often makes it difficult to distinguish the color of the character portion from the color of the decorative portion. Further, also when one of a character color and a decorative color is set as desired, the user usually selects a color conspicuous against a background color, so that the combination of a default color and a color set as desired is liable to be a combination of colors identical to or similar to each other. This is likely to result in a combination of colors which makes it difficult to discern a character portion from a decorative portion.

Further, it is often desired to verify a decorated character image formed by the present apparatus for being output by an output device of another apparatus, by using an output device of the present machine. If the output device of the present apparatus is capable of outputting an image which is higher in resolution than the decorated character image formed, i.e. if the output resolution of the output device of the present apparatus is higher than the resolution of the decorated character image, the decorated character image can be output as it is, without causing any problem. On the other hand, if the output resolution of the output device of the present apparatus is lower than the resolution of the decorated character image, only a smaller number of colors dependent on the output resolution of the output device of the present apparatus can be output, and hence it is required to convert the decorated character image to an image formed of the smaller number of colors (this processing will be referred to hereinafter as "color-limiting processing) and then output the resulting image (hereinafter referred to as "limited-color outputs"). For instance, when a decorated character image of colors of a larger number of gradation levels (high in resolution) is to be output to an output device which is capable of outputting an image of colors of a smaller number of gradation levels (including monochrome as mentioned above) (i.e. which has lower output resolution), it is required to carry out the color-limiting processing to convert the decorated character image higher in resolution to an output image lower in resolution, and the limited-color output to output the output image subjected to the color-limiting process.

The same things occur within an identical image processing apparatus. For instance, a decorated character image prepared (as a print image) for being printed by a printing device (printing means) higher in output resolution may be desired to be verified or checked before printing by causing the image to be displayed by using a display device (display means) lower in output resolution. This corresponds e.g. to a case in which a color print image is desired to be verified or checked on a monochrome display screen. Further, preliminarily for subsequent processing, a decorated character image formed at a higher resolution may be desired to be output at a lower resolution, intentionally, as in the case of a monochrome printing being carried out to check on the layout or impression of a color print image to be formed after printing, to thereby save the cost of a preview print.

However, in these cases. i.e. when a decorated character image provided (e.g. formed) for being output to an output device having a higher output resolution is output to an output device (output means, such as display means) having a lower output resolution, or when such a decorated character image is intentionally output at a lower output resolution, the image output (by coloring-limiting output) after subjecting the prepared decorated character image to the color-limiting processing can be difficult to discern, i.e. may not provide information sufficient for a user to grasp what kind of image it is. This is mainly due to difficulty of discrimination between elements of composition of the image (image elements). For instance, a character portion corresponding to characters of the decorated character image and a decorative portion corresponding to a portion subjected to character decoration are both desired to be made conspicuous against the background, so that colors set for these portions are liable to become identical or similar (in the sense defined as above) to each other. In such a case, if a decorated character image having a higher resolution is output for limited-color output in a manner simply adapted to the lower resolution of a lower resolution output device without further processing, a plurality of image elements (e.g. one or more character portions and one or more decorative portions) of the decorated character image which are originally distinguished by the higher resolution are caused to have an Identical color or a similar color to each other. Thus, one or more boundaries dividing the plurality of image elements can become unable to be discerned, which makes it impossible to identify the output image.

SUMMARY OF THE INVENTION

It is a first object of the invention to provide an image processing method and apparatus that is capable of forming a decorate character image having suitable colors arranged in character portions and decorative portions such that the colors make the portions easily discernable, even when color setting for one or both of the character portions and the decorative portions is omitted in forming a decorated character image by arranging decorated characters formed by decorating arbitrary characters as desired, on an arbitrary background.

It is a second object of the invention to provide an image processing method and apparatus that is capable of outputting an output image having suitable colors arranged in character portions and decorative portions such that the colors make the portions easily discernable, even when limited-color output is carried out, in outputting a decorated character image formed by arranging decorated characters formed by decorating arbitrary characters as desired, on an arbitrary background, with character colors being set to the character portions and decorative colors being set to the decorative portions.

To attain the first object, according to a first aspect of the invention, there is provided an image processing method for creating a decorated character image formed by arranging at least one decorated character formed by providing a desired character decoration on at least one arbitrary character, on an arbitrary background, with a character color being set to a character portion corresponding to the at least one arbitrary character, and a decorative color being set to a decorative portion corresponding to a portion formed by the desired character decoration, the decorated character image including the character portion, the decorative portion, and a background portion formed by removing the character portion and the decorative portion from the background, the image processing method comprising the steps of:

setting at least one predetermined first default color each to a corresponding one of at least one of the character color and the decorative color, when arbitrary setting of the at least one of the character color and the decorative character is omitted;

setting, when a combination of the character color and the decorative color makes the character portion and the decorative portion difficult to discriminate from each other, a predetermined second default color to one of the character color and the decorative color; and forming the decorated character image by coloring the character portion and the decorative portion with the character color and the decorative color, respectively.

To attain the first object, according to a second aspect of the invention, there is provided an image processing apparatus for creating a decorated character image formed by arranging at least one decorated character formed by providing a desired character decoration on at least one arbitrary character, on an arbitrary background, with a character color being set to a character portion corresponding to the at least one arbitrary character, and a decorative color being set to a decorative portion corresponding to a portion formed by the desired character decoration, the decorated character image including the character portion, the decorative portion, and a background portion formed by removing the character portion and the decorative portion from the background, the image processing apparatus comprising:

first default color-setting means for setting at least one predetermined first default color each to a corresponding one of at least one of the character color and the decorative color, when arbitrary setting of the at least one of the character color and the decorative character is omitted;

second default color-setting means for setting, when a combination of the character color and the decorative color makes the character portion and the decorative portion difficult to discriminate from each other, a predetermined second default color to one of the character color and the decorative color; and image-forming means for forming the decorated character image by coloring the character portion and the decorative portion with the character color and the decorative color, respectively.

According to the image processing method and apparatus, in forming a decorated character image having a character portion set to a character color, a decorative portion set to a decorative color, and a background portion which is obtained by removing the character portion and the decorative portion from a background of the image, at least one predetermined first default color is each set to a corresponding one of at least one of the character color and the decorative color, when arbitrary setting of the at least one of the character color and the decorative character is omitted; when a combination of the character color and the decorative color makes the character portion and the decorative portion difficult to discriminate from each other, a predetermined second default color is set to one of the character color and the decorative color: and the decorated character image is formed by coloring the character portion and the decorative portion with the character color and the decorative color, respectively. That is, there are defined not only first default colors for use in the case of omission of the arbitrary setting of the character color and the decorative color, but also second default colors used for use in the case of the character portion and the decorative portion becoming difficult to discriminate from each other. Then, when a first default color is used, if the character portion and the decorative portion become difficult to discriminate from each other, the character color or the decorative color is changed to a second default color, whereby it is possible to avoid making the two portions difficult to discriminate from each other. Therefore, according to the image processing method and apparatus, in forming a decorated character image by arranging decorated characters formed by decorating arbitrary characters as desired, on an arbitrary background, even when arbitrary setting of the character color for the character portion and/or the decorative color for the decorative portion is omitted, it is possible to form the decorated character image having proper color arrangement for the character portion and the decorative portion which makes these portions easily distinguishable from each other.

Preferably, the predetermined second default color used when an image of the background is a plain image which is achromatic or unicolored, or a background pattern image with a predetermined background pattern of a predetermined color provided on the plain image, is a transparent color which is assimilated with the background, and set to the character color.

Depending on the type of character decoration, a decorated character image sometimes has a more excellent appearance when a character portion is assimilated with a background, that is, only a decorative portion is made conspicuous against the background than when both of the character portion and the decorative portion are made conspicuous. The image processing method and apparatus of the preferred embodiment is suitably applied to such a case. That is, the second default color is a "transparent color" (color capable of assimilating with a background) set to the character color, whereby the character portion is assimilated with the background of the decorated character image, making the decorative portion more conspicuous. Further, for instance, if the resulting decorative portions clearly show deletion of character portions corresponding thereto, it is also possible to implicitly emphasize (make potentially conspicuous) the existence of the invisible character portions. Further, this prevents the character portions and the decorative portions from having an identical color or similar colors, so that color arrangement can be effected such that the character portions and the decorative portions are made readily distinguishable from each other.

Preferably, the predetermined second default color used when an image of the background is a background pattern image having a predetermined background pattern of a predetermined color provided on a plain image which is achromatic or unicolored, is a color identical to a color of the plain image.

When the image of a background is a background pattern image which has a background pattern of a predetermined color on an achromatic or unicolored plain image, omission (deletion) of a character portion and a decorative portion therefrom sometimes provides a conspicuous achromatic or unicolored portion. Depending on the pattern of the background pattern image, that is, when the background pattern is formed of a fine pattern or the like, for instance, if a character portion or a decorative portion is omitted (deleted), and a background pattern portion supposed to exist thereunder also disappears only the color of the basic plain image is left to make conspicuous the resulting portion of this color. In such a case, depending on the type of character decoration, a decorated character image sometimes has a more excellent appearance when colors are arranged such that only one of the character portion and the decorative portion of a decorated character is made conspicuous against the plain image than when the color arrangement is carried out such that both of the character portion and the decorative portion are made conspicuous against the plain image. The image processing method and apparatus of the preferred embodiment is suitably applied to such a case. The second default color is a color identical to the color of the plain image in the background and set to one of the character color and the decorative color, whereby the one of these portions is made conspicuous by the color identical to the color of the plain image, while the other can be made conspicuous by the color set in advance thereto. Further, this prevents the character color and the decorative color from becoming identical or similar, the color arrangement is effected which makes the portions easily distinguishable from each other.

For instance the at least one arbitrary character decoration includes character-shading decoration forming a shaded character by shading the at least one arbitrary character.

According to the image processing method and apparatus of the preferred embodiment, the arbitrary character decoration includes the shading decoration for forming a shaded character of an arbitrary character, and hence a decorated character image can be formed by the shading decoration such that the decorated character image has a character-shading portion as a decorative portion with suitable color arrangement of the character portion and the decorative portion made such that these portions are readily distinguishable from each other.

For instance, the desired character decoration includes character-outlining decoration forming an outlined character by outlining a contour of the at least one arbitrary character.

According to the image processing method and apparatus of the preferred embodiment, the arbitrary character decoration includes the character-outlining decoration for forming an outlined character of an arbitrary character, and hence a decorated character image can be formed by the character-outlining decoration such that the decorated character image has an outlined portion as the decorative portion with suitable color arrangement of the character portion and the decorative portion made such that these portions are readily distinguishable from each other.

For instance, the desired character decoration includes character-outlining/shading decoration forming an outlined and shaded character by providing an outlined character with shades.

According to the image processing method and apparatus of the preferred embodiment, the arbitrary character decoration includes the character-outlining/shading decoration for forming an outlined and shaded character of an arbitrary character, and hence when a decorated character image can be formed by character-outlining/shading decoration such that the decorated character image has an outlined and shaded portion as the decorative portion with suitable color arrangement made such that the character portion and the decorative portion are readily distinguishable from each other.

Preferably, the image processing method further includes the step of outputting an output image based on the decorated character image.

Preferably, the image processing apparatus further includes image output means for outputting an output image based on the decorated character image.

According to the image processing method and apparatus, an output image based on the decorated character image is output. That is, an image (decorated character image) can processed not only for forming thereof but also outputting of the same.

More preferably, the step of outputting the output image is the step of displaying the output image on a display screen.

More preferably, the image output means comprises display means for displaying the output image on a display screen.

According to the image processing method and apparatus, since the output image is displayed, the method and apparatus can be applied to processing of an output image for display.

More preferably, the step of outputting the output image is the step of printing the output image on a printing medium.

More preferably, the image output image comprises printing means for printing the output image on a printing medium.

According to the image processing method and apparatus, since the output image is printed, the method and apparatus can be applied to processing of an output image for printing, and hence to a printer.

More preferably, the printing medium is a tape.

According to the image processing method and apparatus of the preferred embodiment, since the printing medium is a tape, the method and apparatus can be applied to a tape printing apparatus.

To attain the second object, according to a third aspect of the invention, there is provided an image processing method comprising the steps of:

creating a decorated character image formed by arranging at least one decorated character formed by providing a desired character decoration on at least one arbitrary character, on an arbitrary background, with a character color being set to a character portion corresponding to the at least one arbitrary character, and a decorative color being set to a decorative portion corresponding to a portion formed by the desired character decoration, the decorated character image including the character portion, the decorative portion, and a background portion formed by removing the character portion and the decorative portion from the background, changing, when the decorated character image is to be subjected to limited-color output at a resolution lower than a resolution of the decorated character image as created, setting colors set for the character portion, the decorative portion, and the background portion of the decorated character image, including the character color and the decorative color, for the limited-color output;

changing, when a combination of the character color and the decorative color makes the character portion and the decorative portion difficult to discriminate from each other, one of the character color and the decorative color to a predetermined default color;

forming, when at least one of the setting colors is changed, an output image based on the decorated character image by using the setting colors including the changed at least one of the setting colors, or setting, when none of the setting colors are changed, the decorated character image to the output image; and outputting the output image.

To attain the second object, according to a fourth aspect of the invention, there is provided an image processing apparatus comprising:

decorated character image-creating means for creating a decorated character image formed by arranging at least one decorated character formed by providing a desired character decoration on at least one arbitrary character, on an arbitrary background, with a character color being set to a character portion corresponding to the at least one arbitrary character, and a decorative color being set to a decorative portion corresponding to a portion formed by the desired character decoration, the decorated character image including the character portion, the decorative portion, and a background portion formed by removing the character portion and the decorative portion from the background, limited color-setting means for changing, when the decorated character image is to be subjected to limited-color output at a resolution lower than a resolution of the decorated character image as created, setting colors set for the character portion, the decorative portion, and the background portion of the decorated character image, including the character color and the decorative color, for the limited-color output;

default color-setting means for changing, when a combination of the character color and the decorative color makes the character portion and the decorative portion difficult to discriminate from each other, one of the character color and the decorative color to a predetermined default color;

output image-forming/setting means for forming, when at least one of the setting colors is changed, an output image based on the decorated character image by using the setting colors including the changed at least one of the setting colors, or setting, when none of the setting colors are changed, the decorated character image to the output image; and image output means for outputting the output image.

According to the image processing method and apparatus, there is created a decorated character image having a character portion set to a character color, a decorative portion set to a decorative color, and a background portion which is obtained by removing the character portion and the decorative portion from a background of the image, and when limited color output is carried out at a resolution lower than a resolution of the decorated character image as created, setting colors set for the character portion, the decorative portion, and the background portion of the decorated character image, are changed to setting colors for the limited-color output. That is, when the limited color output is carried out, the setting colors are changed to ones adapted thereto (subjected to color-limiting processing), and hence the decorated character image can be output by using a limited number of colors or gray levels. Further, if a combination of a character color and a decorative color makes the character portion and the decorative portion difficult to discriminate from each other, one of these colors is changed to a predetermined default color. That is, if the character portion and the decorative portion are made difficult to discriminate from each other by a combination of the character color and the decorative color originally set, when the limited color output is not carried out, or by a combination of changed setting colors adapted to the limited color output, when the limited color output is carried out, one of the character color and the decorative color is changed to a predetermined default color. This makes it possible to prevent the character portion and the decorative portion from becoming difficult to discriminate from each other irrespective of whether the limited color output is carried out or not, since when the portions are difficult to discriminate from each other, one of them (character color or decorative color) is changed to the default color.

When at least one of the setting colors is changed, an output image is formed based on the decorated character image by using the setting colors including the changed at least one of the setting colors, or when none of the setting colors are changed, the decorated character image is set to the output image, and then the output image is output. In other words, when limited-color output is performed, or when it is difficult to distinguish the character portion and the decorative portion from each other, depending on colors set therefor, at least one of the character color and the decorative color can be changed to a suitable one. If the change in color is effected, an output image is prepared based on the updated setting of colors, whereas if the change in color is not effected, the decorated character image is set to an output image, so that it is possible to prepare an output image having a character color and a decorative color suitably arranged. Therefore, according to the image processing method and apparatus, when a decorated character image, which is formed by arranging at least one decorated character formed by providing a desired character decoration on an arbitrary background, with a character color being set to a character portion corresponding to the at least one arbitrary character and a decorative color being set to a decorative portion corresponding to a portion formed by the desired character decoration, is output as an output image, it is possible to output an output image formed such that the character portion and the decorative portion have suitable colors readily distinguishable from each other. Further, even when limited-color output is carried out, similarly, it is possible to output the output image formed such that the character portion and the decorative portion have suitable colors readily distinguishable from each other.

Preferably, the predetermined default color used when an image of the background is a plain image which is achromatic or unicolored, or a background pattern image with a predetermined background pattern of a predetermined color provided on the plain image, Is a transparent color which is assimilated with the background, and set to the character color.

Depending on the type of character decoration, a decorated character image sometimes has a more excellent appearance when a character portion is assimilated with a background, that is, only a decorative portion is made conspicuous against the background than when both of the character portion and the decorative portion are made conspicuous. The image processing method and apparatus of the preferred embodiment is suitably applied to such a case. That is, the default color is a "transparent color" (color capable of assimilating with a background) set to the character color, the character portion can be assimilated with the background of the decorated character image, whereby the decorative portion can be made more conspicuous. Further, for instance, if the resulting decorative portions clearly show deletion of character portions corresponding thereto, it is also possible to implicitly emphasize (make potentially conspicuous) the existence of the invisible character portions. Further, this prevents the character portions and the decorative portions from having an identical color or similar colors, so that color arrangement can be effected such that the character portions and the decorative portions are made readily distinguishable from each other.

Preferably, the predetermined default color used when an image of the background is a background pattern image having a predetermined background pattern of a predetermined color provided on a plain image which is achromatic or unicolored, is a color identical to a color of the plain image.

When the image of a background is a background pattern image which has a background pattern of a predetermined color on an achromatic or unicolored plain image, omission (deletion) of a character portion and a decorative portion therefrom sometimes provides a conspicuous achromatic or unicolored portion. Depending on the pattern of the background pattern image, that is, when the background pattern is formed of a fine pattern or the like, for instance, if a character portion or a decorative portion is omitted (deleted), and a background pattern portion supposed to exist thereunder also disappears, only the color of the basic plain image is left to make conspicuous the resulting portion of this color. In such a case, depending on the type of character decoration, a decorated character image sometimes has a more excellent appearance when colors are arranged such that only one of the character portion and the decorative portion of a decorated character is made conspicuous against the plain image than when the color arrangement is carried out such that both of the character portion and the decorative portion are made conspicuous against the plain image. The image processing method and apparatus of the preferred embodiment is suitably applied to such a case. The default color is a color identical to the color of the plain image of the background and set to one of the character color and the decorative color, whereby the one of these portions is made conspicuous by the color identical to the color of the plain image, while the other can be made conspicuous by the color set in advance thereto. Further, this prevents the character color and the decorative color from becoming identical or similar whereby the color arrangement can be effected which makes the portions easily distinguishable from each other.

For instance, the at least one arbitrary character decoration includes character-shading decoration forming a shaded character by shading the at least one arbitrary character.

For instance, the desired character decoration includes character-outlining decoration forming an outlined character by outlining a contour of the at least one arbitrary character.

For instance, the desired character decoration includes character-outlining/shading decoration forming an outlined and shaded character by providing an outlined character with shades.

According to the image processing method and apparatus of these preferred embodiments of the third and fourth aspects of the invention, it is possible to obtain the same advantageous effects as provided by the preferred embodiments of the first and second aspects of the invention described above.

Preferably, the image processing method further includes the step of setting a limited color mode for carrying out the limited-color output, and the step of changing the setting colors for the limited-color output is executed when the limited color mode is set.

Preferably, the image processing apparatus further includes limited color mode-setting means for setting a limited color mode for carrying out the limited-color output, and the limited color-setting means changes the setting colors, when the limited color mode is set.

According to the image processing method and apparatus of these preferred embodiments, it is possible to set a limited color mode for carrying out the limited-color output, and the limited color-setting means changes the setting colors, when the limited color mode is set. Therefore, the method and apparatus can be applied to a case in which a decorated character image originally formed to have a higher resolution is desired to be output at a lower resolution.

Preferably, the step of outputting the output image is the step of displaying the output image on a display screen.

Preferably, the image output image comprises display means for displaying the output image on a display screen.

According to the image processing method and apparatus of these preferred embodiments, the output image is displayed on a display screen, and hence the method and apparatus can be applied to processing of an output image for display.

Preferably, the decorated character image is created as a print image to be printed on a printing medium, and the step of changing the setting colors for the limited-color output is executed when the resolution of the decorated character image is higher than a resolution at which the display screen can perform display.

Preferably, the decorated character image is created as a print image to be printed on a printing medium, and the limited color-setting means changes the setting colors when a resolution of the decorated character image is higher than a resolution at which the display screen can perform display.

According to the image processing method and apparatus of these preferred embodiments, the decorated character image is created as a print image to be printed on a printing medium, and setting colors are changed for the limited color output when a resolution of the decorated character image is higher than a resolution at which the display screen can perform display. This makes it possible to verify the decorated character image originally formed as the print image when a resolution of a displayed image is lower than the resolution of the decorated character image.

Preferably, the step of outputting the output image is the step of printing the output image on a printing medium.

Preferably, the image output means comprises printing means for printing the output image on a printing medium.

According to the image processing method and apparatus, since the output image is printed, the method and apparatus can be applied to processing of an output image for printing, and hence to a printer.

More preferably, the printing medium is a tape.

According to the image processing method and apparatus of the preferred embodiment, since the printing medium is a tape, the method and apparatus can be applied to a tape printing apparatus.

The above and other objects, features, and advantages of the invention will become more apparent from the following detailed description taken in conjunction with the accompanying drawings.

BRIEF DESCRIPTION OF THE DRAWINGS

FIG. 4 is a flowchart showing a routine for a typical image-forming/printing process for forming and printing a character image, executed by the tape printing apparatus 1;

FIG. 5 is a table showing an example of a method of expressing colors;

FIG. 6 is a table showing examples of default colors set by default when part or whole of a color-setting operation is omitted by selecting a color mode;

FIG. 7 is a diagram similar to FIG. 6 and continued therefrom;

DETAILED DESCRIPTION

The invention will now be described in detail with reference to the drawings showing an embodiment thereof. In the embodiment, an image processing method and apparatus according to the invention is applied to a tape printing apparatus. First, FIG. 1 is a block diagram of a control system of the tape printing apparatus.

The tape printing apparatus 1 is capable of carrying out color printing of a print image on a tape T by a thermal printing method as well as cutting off the printed portion of the tape T to thereby produce a label. The print image is formed based on desired letters and the like entered via a keyboard of the apparatus 1.

The tape T is comprised of a substrate tape, an adhesive layer coated on an underside surface of the substrate tape, and a release paper tape affixed to the adhesive layer. The substrate tape is formed of a material which is capable of readily absorbing ink, such as paper, paper with a coated layer or a film with a coated layer. The adhesive layer is used for affixing a printing tape as a label to an object article, such as a file, while the release paper tape is used for preventing dust or dirt from depositing on the adhesive layer. Tape cartridges are provided which contain various kinds of tapes T with various tape widths of from 4.5 mm to 48 mm. A print image having a resolution of 24 to 1024 dots in the direction of the width thereof is printed on the tape T, dependent on the width thereof. It should be noted that there are provided still other tapes T different in material or having background colors other than white. Therefore, it is possible to use at least several tens of kinds of tapes T including ones to be adopted in the future.

Figure 1:
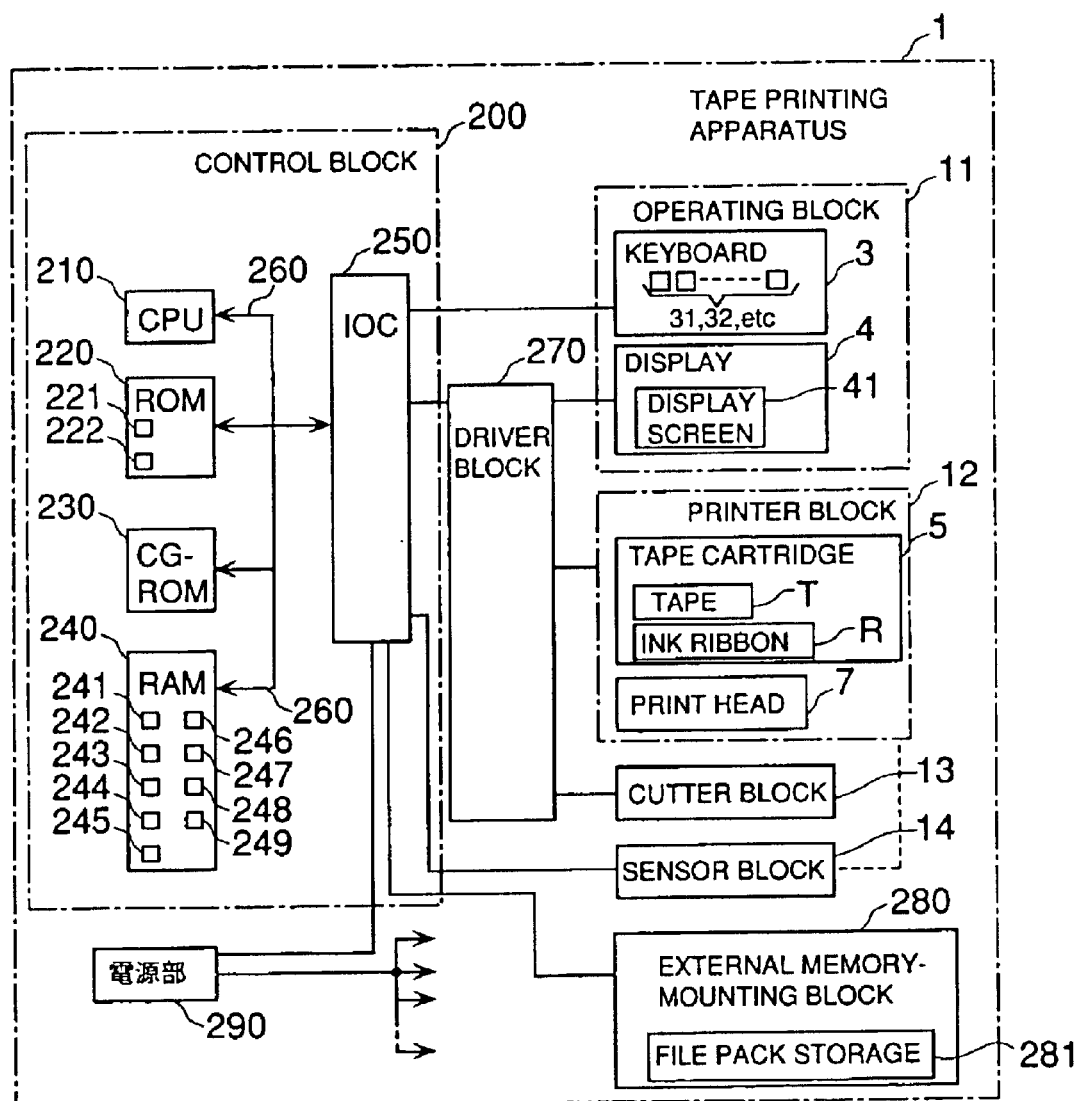
FIG. 1 is a block diagram of a control system of a tape printing apparatus to which is applied an image processing method and apparatus according to the invention.

As shown in FIG. 1, the tape printing apparatus 1 is basically comprised of an operating block 11 having the keyboard 3 and a display 4 and interfacing with a user, a printer block 12 having a print head 7 of a thermal type for printing on a tape T unwound from the tape cartridge 5, a cutter block 13 for cutting off the printed portion of the tape T, a sensor block 14 having various sensors for carrying out various detecting operations, a driving block 270 having various drivers for driving circuits of blocks and devices, an external memory-mounting block 280 for removably mounting an external memory (called "file pack storage") therein, a power supply block 290, and a control block 200 for controlling operations of components of the tape printing apparatus 1 including the above-mentioned sensors and drivers. To implement the above construction, a casing of the apparatus accommodates a circuit board, not shown, in addition to the printer block 12, the cutter block 13, the sensor block 14, the external memory-mounting block 280, and so forth. On the circuit board are mounted the power supply block 290 and the circuits of the driving block 270 and the control block 200. A power supply unit of the power supply block 290 is connected to a connector socket connectable with an AC adapter, and a battery, such as a nicad battery, removably mounted from the outside of the apparatus casing, so as to supply power to the components of the tape printing apparatus 1.

Although illustration and indication of each component are omitted, the printer block 12 has the tape cartridge 5 containing the tape T and an ink ribbon R within a casing thereof. The tape cartridge 5 has a through hole for receiving therein a head unit arranged in a compartment of the printer block. The tape cartridge 5 contains a tape reel for receiving therein a positioning pin arranged in the compartment, and a ribbon take-up reel for receiving therein a ribbon take-up reel-driving shaft arranged in the compartment. Further, a platen roller is arranged within the tape cartridge at a location where the tape T and the ink ribbon R overlap, for receiving therein a platen drive shaft in the compartment such that the platen roller faces toward the print head (thermal head) 7 incorporated in the head unit.

The tape cartridge 5 has a plurality of small holes formed in the bottom thereof for discrimination of the type of tape T contained therein from the other types of the tape T having different widths, which are contained in other tape cartridges 5. A tape-discriminating sensor, not shown, comprised e.g. of micro-switches is arranged in the compartment, for detecting these holes to thereby determine the type of tape T contained in the tape cartridge. Further, the compartment is provided with an ambient temperature sensor, such as a thermistor, which sends information of an ambient temperature detected thereby to the control block 200. Further, a head surface temperature sensor formed e.g. by a thermistor, is arranged on a surface of the print head 7 in a manner intimately contacting the surface, which sends information of the surface temperature of the thermal head 7 detected thereby to the control block 200. The apparatus casing is formed with a tape exit for causing the compartment and the outside of the apparatus to communicate with each other. On the tape exit faces a tape cutter for cutting off a dispensed portion of the tape T.

When the tape cartridge 5 is loaded in the compartment, the through hole of the tape cartridge 5 receives the head unit therein, the tape reel receives the positioning pin therein, the platen roller receives the platen drive shaft therein, and the ribbon take-up reel receives the ribbon take-up reel drive shaft therein, which enables the feed of the tape T and the ink ribbon R. Further, in the above state, the print head 7 is brought into contact with the platen roller in a manner sandwiching the tape T and the ink ribbon R therebetween, whereby the apparatus is ready for a printing operation, when the tape T is rolled out from the tape reel, the ink ribbon R is also rolled out from the ribbon reel and fed or run together with the tape T in a state lying upon the tape T, followed by being taken up by the ribbon take-up reel. That is, the platen roller and the ribbon take-up reel are rotated in synchronism with each other, whereby the tape T and the ink ribbon are simultaneously fed, and at the same time the print head 7 is driven in synchronism with running of the tape T and the ink ribbon R to thereby carry out printing.

In the tape printing apparatus 1, the user, after loading the tape cartridge 5 in the compartment of the printer block 12, enters printing information of print images, such as desired characters (letters, numerals, symbols, figures and the like), via the keyboard 3, while verifying results of the entry on the display 4 or edits the same. Thereafter, when the user instructs a printing operation via the keyboard 3, the tape feeder block of the printer block 12 is driven to unwind the tape T from the tape cartridge 5, and at the same time the print head 7 is driven to print characters on the tape T as desired. The printed portion of the tape T is delivered from the tape exit, as the printing operation proceeds. After the desired characters have been printed in the above manner, the platen roller continues to rotate for a predetermined time period (the ribbon take-up reel also continues to rotate in synchronism with rotation of the platen roller), whereby the tape T continues to be fed until a predetermined cutting position on the tape T, which is adapted to a tape length including the length of a marginal area, reaches a point corresponding to a location of the tape cutter.

The tape feeder block of the printer block 12 is arranged in a space extending from a lateral side of the compartment to a bottom side of the same, and rotates the platen drive shaft and the ribbon take-up reel drive shaft by using a tape feed motor (TF motor) arranged as a power (drive) source at a location laterally outward of the component. The tape feeder block includes the TF motor, the platen drive shaft, the ribbon take-up reel drive shaft, a reduction gear train for transmitting part of the driving force of the TF motor to each drive shaft, and a chassis for supporting them thereon.

Further, the TF motor according to the present embodiment is implemented by a DC motor, and the tape feeder block of the printer block 12 further includes an encoder, not shown, for detecting the number of rotations of the TF motor (DC motor). The encoder is comprised of a disc, not shown, which is formed with four detection openings along a periphery thereof and rigidly fixed to an end of the main shaft of the DC motor, and a rotational speed sensor, not shown, which is comprised of a photo sensor which faces the detection openings of the disk sequentially, and a sensor circuit board supporting the photo sensor thereon and carries out photoelectric conversion in cooperation with the photo sensor. The photo sensor has a light-emitting element and a light-receiving element arranged in a manner opposed to each other. Light emitted from the light-emitting element passes through the detection openings (arranged along the periphery) of the disk and is received by the light-receiving element whereby the number of rotations of the DC motor (the number of pulses corresponding to the number of turns of the DC motor is generated). In other words, the on-off of the light received from the light-emitting element by the light-receiving element is photoelectrically converted by the sensor circuit board and output as a pulse signal to the control block 200. Of course, the above TF motor can also be constructed by a stepping motor (pulse motor) to omit the encoder such that the tape T can be fed with ease by a predetermined number of steps based on the pulse signal.

In FIG. 1, for convenience of description, it is assumed that the sensor block 14 includes the above-mentioned tape-discriminating sensor, ambient temperature sensor, head surface temperature sensor, and rotational speed sensor. The sensor block 14 generates signals indicative of a sensed type of a tape, ambient temperature, head surface temperature, and rotational speed. These signals are reported or delivered to the control block 200. It should be noted that in the sensor block 14 can be provided other sensors, such as a voltage sensor which is connected to the power supply unit of the power supply block 290 that supplies power to the components of the tape printing apparatus 1, for detecting changes in the electric potential of the power supply unit, and the like, or some of the above sensors, such as the encoder in the case of the TF motor being the pulse motor, can be omitted to suit the actual requirements of the apparatus.

Next, the cutter block 13 includes a tape cutter and a cutter motor for driving the tape cutter for cutting operations. When the tape T is cut automatically, e.g. in the case of fixed length printing, the tape T is further sent by the length of a rear margin after completion of the printing operation, and then stopped, whereupon the cutter motor is driven to cut off the tape T. It should be noted that the tape printing apparatus 1 is provided with a cut key for enabling the user to manually cut the tape by key stroke, and it is possible to switch between an automatic cutting mode and a manual cutting mode. In the manual cutting mode carried out e.g. in the case of a desired length printing, when the printing operation and additional feed of the tape are completed, the user depresses the cut key, whereby the tape cutter is actuated to cut off the tape T into a desired length.

The driving block 270 includes a display driver, a head driver, and a motor driver. The display driver drives the display 4 of the operating block 11 in response to control signals delivered from the control block 200, i.e. in accordance with commands carried by the signals. Similarly, the head driver drives the print head 7 of the printer block 12 in accordance with commands from the control block 200. Further, the motor driver has a TF motor driver for driving the TF motor of the printer block 12, and a cutter motor driver for driving the cutter motor of the cutter block 13, and drives each motor in accordance with commands from the control block 200.

Next, according to the tape printing apparatus 1, the user can removably mounting the external memory (hereinafter referred to as "the file pack storage" ) 281 which is capable of storing a lot of document files and the like, as an auxiliary memory for use with a RAM 240, described hereinafter. The file pack storage 281 contains one or a plurality of (e.g. two) SRAMs (static RAMS), and is backed-up by batteries or the like, such that stored data can be preserved even when the file pack storage 281 is removed from the tape printing apparatus 1. Further, when the file pack storage 281 is mounted in the compartment of the external memory-mounting block 280, the file pack works such that it appears to the user to be part (e.g. one directory) of a memory area of the RAM 240, and is employed as a work area for carrying out the control process.

The operating block 11 includes the keyboard 3 and the display 4. The display 4 has a display screen 41 which is capable of displaying display image data e.g. of 198×64 dots on a rectangular display area of approximately 8 cm in the horizontal direction (X direction)×4 cm in the vertical direction (Y direction). The display 4 is used by the user when he enters data via the keyboard 3 to form or edit matrix data representative of a character image in which characters, such as letters, numerals, symbols, simple figures, etc., (hereinafter generically referred to as "characters") are arranged or a print image including the character image, view the result of such entry or edit of data, and enter various commands including selection commands via the keyboard 3.

On the keyboard 3, there are arranged a character key group 31 including an alphabet key group, not shown, a symbol key group (including a space key), not shown, a number key group, not shown, and a nonstandard character key group, not shown, for calling nonstandard characters for selection, as well as a function key group 32 for designating various operation modes. In a type of the apparatus 1 which is capable of entering the Japanese language, there is also provided a kana key group, not shown, for entering Japanese hiragana letters and Japanese katakana letters.

The function key group 32 includes a power key, not shown, a print key, not shown, for instructing a printing operation, a selection key, not shown, for finally determining entry of character data and starting new lines during text entry as well as determining selection of one of the various operating modes on a corresponding one of the selection screens, a color specification key, not shown, for specifying printing colors including neutral colors (mixed colors) of print image data, a color-setting key, not shown, for setting colors of characters and background colors, and four cursor keys (up arrow key, down arrow key, left arrow key, and right arrow key: hereinafter generically referred to as the "cursor key"), not shown, for moving the cursor or the display range of print image data on the display screen 41 in respective upward, downward, leftward, and rightward directions.

The function key group 32 also includes a cancel key, not shown, for canceling instructions, a shift key, not shown, for use in changing roles of respective keys as well as modifying registered image data, and nonstandard character registration image data, an image key, not shown, for alternately switching between a text edit screen or a selection screen and a display screen (image screen) for displaying print image data, a proportion-changing (zoom) key, not shown, for changing a proportion between the size of print image data and the size of display image data displayed on the image screen, a style key, not shown, for setting styles of labels to be formed, a file key, not shown, for handling files, an illustration key, not shown, for selecting background images, the aforementioned cut key, not shown, for manually cutting the tape T, a nonstandard character key, not shown, for registering nonstandard characters, a conversion key, not shown, for carrying out conversion operations, such as kana-kanji conversion (in the case of a Japanese language-adapted type of the apparatus), a pack key, not shown, for initialization of the file pack storage 281 or changing the settings thereof, a format key, not shown, for setting formats for background pattern printing or fixed length printing, an enlarged-image print key, not shown, for instructing an enlarged-image printing operation for printing a print image which is formed by enlarging a basic image by a desired factor of enlargement, a character decoration key, not shown, for setting decorations of characters, a color mode key, not shown, for setting color modes for simplifying color-setting operations, and a preview print key, not shown, for printing print image data by limiting print colors thereof.

Similarly to keyboards of the general type, the above key entries may be made by separate keys exclusively provided for respective key entries and/or by a smaller number of keys operated in combination with the shift key or the like. Here, for purposes of ease of understanding, the following description will be made assuming that there are provided as many keys as described above.

As shown in FIG. 1, from the keyboard 3, various commands and data described above are input to the control block 200.

The control block 200 includes a CPU 210, a ROM 220, a character generator ROM (CG-ROM) 230, a RAM 240, and an input/output control circuit (IOC) 250, all of which are connected to each other by an internal bus 260.

The ROM 220 has a control program area 221 storing control programs executed by the CPU 210 as well as a control data area 222 storing control data including a color conversion table, a character modification table, and the like. The CG-ROM 230 stores font data, i.e. data defining characters, symbols, figures and the like, provided for the tape printing apparatus 1. When code data identifying a character or the like is input thereto, it outputs the corresponding font data. In the type of the apparatus 1 which is capable of entering the Japanese language, there is also provided a kana-kanji conversion table for converting Japanese hiragana letters into corresponding Japanese kanji letters.

The RAM 240 is backed-up such that stored data items can be preserved even when the power is turned off by operating the power key. The RAM 240 includes areas of a register group 241 used as flags or the like, a text data area 242 for storing text data of characters or the like entered by the user via the keyboard 3, a display image data area 243 for storing image data displayed on the display screen 41, a print image data area 244 for storing print image data, a registered image data area 245 for storing registered image data, a nonstandard character registration image data area 246 for storing nonstandard character registration image data, a background image data area 247 for storing background image data as a candidate for a background image and character color data corresponding thereto, and buffer areas 248 including a character image-forming buffer, a color conversion buffer, a color-by-color dithered image matrix-arranging buffer, a print buffer, and so forth. The RAM 240 is used as a work area for carrying out the control process.

The IOC 250 incorporates a logic circuit for complementing the functions of the CPU 210 as well as dealing with interface signals for interfacing between the CPU 210 and peripheral circuits. The logic circuit is comprised of gate arrays, and custom LSIs. The IOC 250 also incorporates the function of a timer for measuring elapsed time. The IOC 250 is connected to the sensors of the sensor block 14 and the keyboard 3, for receiving the signals generated by the sensor block 14 as well as commands and data entered via the keyboard 3, and inputting these to the internal bus 260 directly or after processing them. Further, the IOC 250 cooperates with the CPU 210 to deliver data and control signals input to the internal bus 260 by the CPU 210 or the like, to the driving block 270 directly or after processing them.

Further, the IOC 250 is connected to the external memory-mounting block 280 to control the input and output of data apparently carried out by accessing the RAM 240 but actually carried out by accessing the file pack storage 281, whereby when the file pack storage 281 is mounted in the compartment of the external memory-mounting block 280, the IOC 250 carries out control operations thereof such that the RAM 240 appears to be expanded (the memory capacity of the RAM 240 appears to be increased) to the user (in handling files and the like). Therefore, in the following, unless otherwise specified, description is made assuming that the RAM 240 contains a memory capacity of the file pack storage 281, and that data stored in the file pack storage 281 is stored in the RAM 240 (although shown as the file pack storage 281 in FIG. 1 for purposes of clarity, actually, part or all of the above areas can be shared with the file pack storage 281).

The CPU 210 of the control block 200 receives the signals and data from the components of the tape printing apparatus 1 via the IOC 250, according to the control program read from the ROM 220, processes font data from the CG-ROM 230 and various data stored in the RAM 240 (including the file pack area 249 as described above), and delivers signals and data to the components of the tape printing apparatus 1 via the IOC 250 to thereby carry out position control during printing operations, display control of the display screen 41, and print control for causing the print head 7 to carry out printing on the tape T under predetermined printing conditions. In short, the CPU 210 controls the overall operation of the tape printing apparatus 1.

Figure 2:
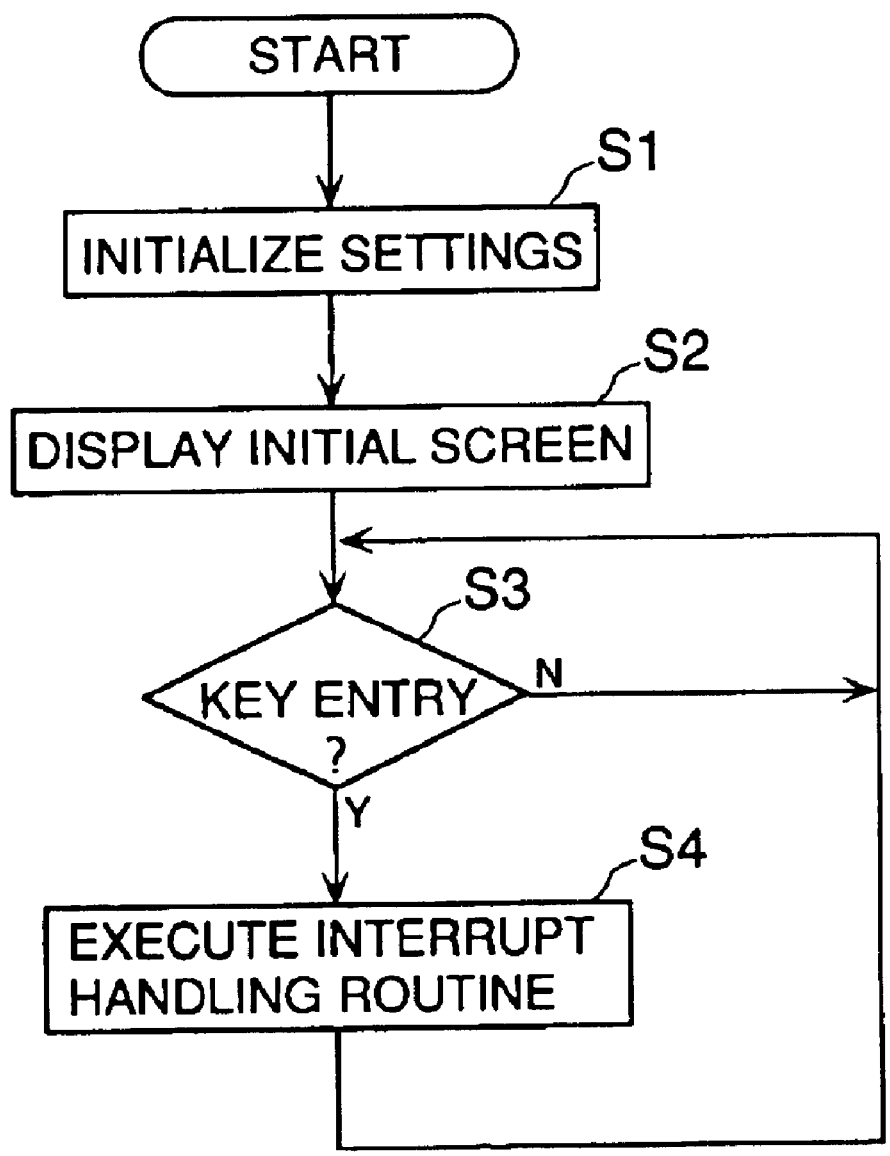
FIG. 2 is a flowchart showing a conceptual representation of an overall control process executed by the FIG. 1 tape printing apparatus.

Next, the overall control process carried out by the tape printing apparatus 1 will be described with reference to FIG. 2. As shown in the figure, when the program for carrying out the control process is started e.g. when the power key is depressed (the power of the tape printing apparatus 1 is turned on), first, at step S1, initialization of the system including restoration of saved control flags is carried out to restore the tape printing apparatus 1 to the state it was in before the power was turned off the last time. Then, the image that was displayed on the display screen 41 before the power was turned off the last time is shown as an initial screen at step S2. The following steps in FIG. 2, that is, step S3 for determining whether or not a key entry has been made and step S4 for carrying out an interrupt handling routine, provide a conceptual representation of actual operations. Actually, when the initial screen has been displayed at the step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at the step S4, and after the interrupt handling routine is terminated, the key entry wait state is again enabled and maintained (No to S3).

As described above, in the tape printing apparatus 1, main processing operations by the apparatus are carried out by interrupt handling routines, and hence if print image data for printing is provided or has been prepared, the user can print a print image based on the print image data at a desired time point by depressing the print key to thereby generate an interrupt by the print key and start a printing process. In short, an operating procedure up to the printing operation can be selected by the user as he desires.

Figure 3:
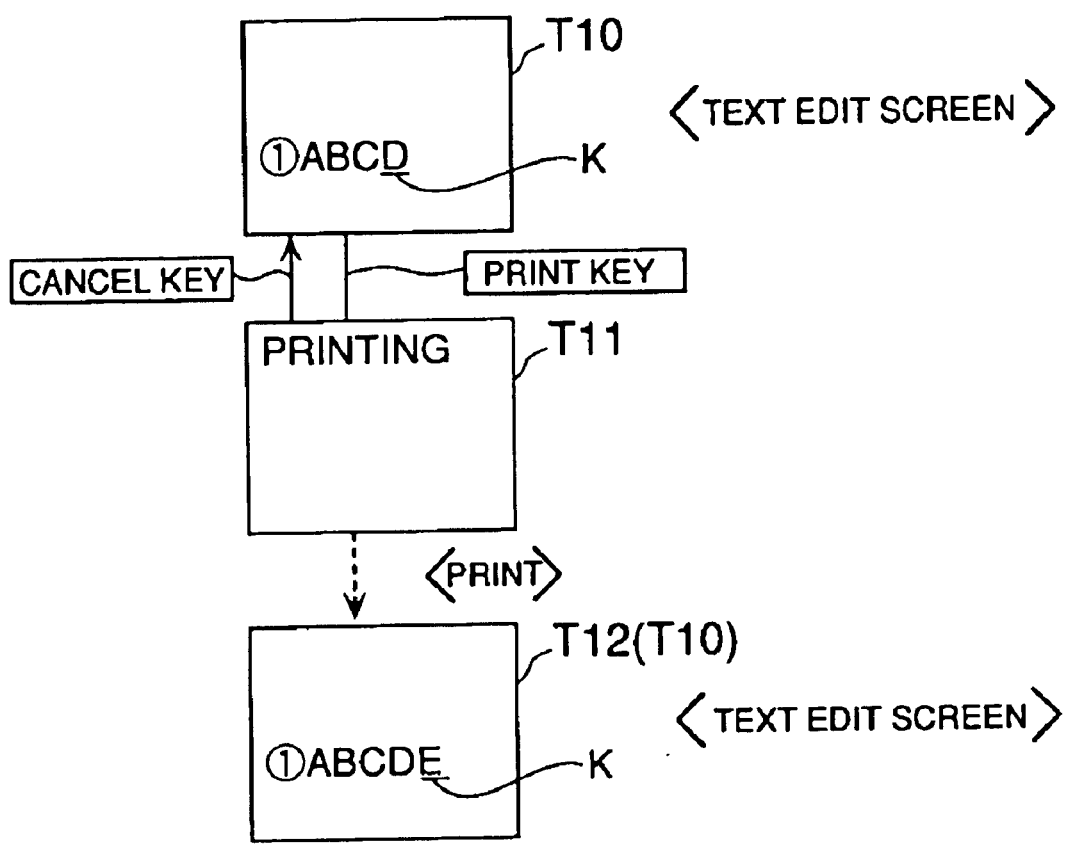
FIG. 3 is a diagram showing an example of a sequence of display screens displayed during a printing process for printing a character image, which is useful in explaining a typical operating procedure for execution of the process.

For instance, as shown in FIG. 3, if the print key is depressed by the user when the text edit screen displays a character string "ABCDE" as a first line of the entry by the user (screen T10: hereinafter, contents displayed on the display screen 41 of the display 4 are referred to as the "screen T??" (? represents a digit) and the reference numerals for the screens are shown only by T??. Further, a cursor position is indicated by a symbol K), a message "PRINTING" is displayed, and at the same time the character image of the character string "ABCDE" is printed as a print image (T11). After the printing has been completed, the screen returns to the text edit screen (T12: the same as T10).

In a narrow sense, the terms "display image" and "print image" mean a displayed image itself and a printed image itself, respectively, and the apparatus 1 deals with display image data representative of a display image and print image data representative of a print image. That is, although in the apparatus 1, an object to be processed by forming, modification, or registration is image data but not an image itself, for simplicity of the following description, "image data representative of ~image" is referred to as "~image", similarly to the image itself.

Generally, in a typical image-forming/printing process for forming/printing a character image (S10) executed by the tape printing apparatus 1, as shown in FIG. 4, for instance, first, when a character string is input as text data via the keyboard 3 at step S11, and printing is instructed (the print key 322 is depressed) at step S12, a print image corresponding to the character string input is formed at step S13, and the print image is printed at step S14, followed by terminating the image-forming printing process (S10) at step S15. In the tape printing apparatus 1 according to the present embodiment, when text data is input at the step S11, it is possible not only to enter characters (character string: text data of characters) but also designate a character or characters or a range of the character string to set the character size or the kind of character decoration at step S112 as well as designated various colors and set them for respective portions (characters or ranges of the character string) at step S113.

It should be noted that various methods of specifying colors can be contemplated since there are various methods of expressing colors. In the tape printing apparatus 1 according to the present embodiment, description is made assuming that colors are expressed or referred to based on a table shown in FIG. 5, and each color in the figure can be set to the color of each portion of a character string (can be used as a setting color therefor). Further, in the following description, it is assumed that the techniques of character decoration in this embodiment include character-shading decoration forming a shaded character by shading a desired character in a character string, character-outlining decoration forming an outlined character by outlining a contour of a desired character in a character string (decoration close to a so-called hollow character in the case of a black and white image), character-outlining/shading decoration forming an outlined and shaded character by providing an outlined character with shades, character-enclosing decoration forming an enclosed character by enclosing the same with a decorative portion (decoration close to a so-called reversed image of a character in the case of a black and white image), decoration by so-called half-tone dot shading, and outer frame decoration enclosing a desired character in a character string with an outer frame.

Figure 8:
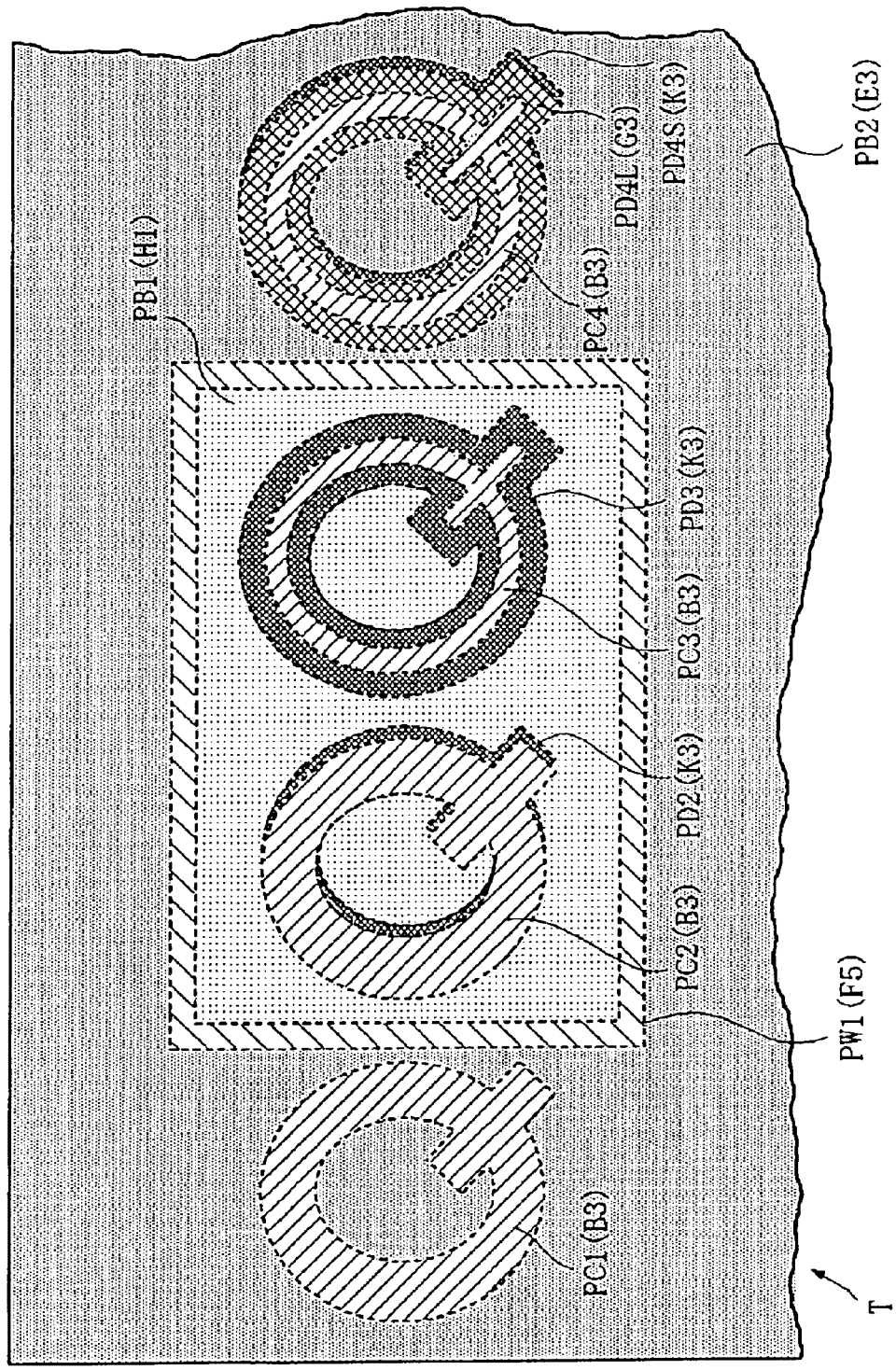
FIG. 8 is a diagram showing an example of a result of printing of a decorated color character image subjected to character decoration, on a tape.

For instance, if the user desires to print decorated character images (decorated character image) having decorated characters, as shown in FIG. 8, first, the user inputs a character string "QQQQ" comprised of four characters of "Q" at step S111. In this state, he depresses the character decoration key to switch the screen to a selection screen for setting character decoration. Then, after an option "SHADED" (shaded character) has been selected on the selection screen, by designating the second character "Q" of the character string through operation of the cursor key, the user can specify only the second character "Q" as a decorative range. In the tape printing apparatus 1, when the character decoration key is depressed by the user, the screen is switched to a selection screen for setting character decoration, and when the option "SHADED" is selected on the selection screen, and only the second character "Q" is designated as a decorative range, a shaded character of the character, i.e. of the second character "Q" is formed.

In the following, for purposes of ease of discrimination therebetween, let it be assumed that character data of the first to fourth "Q's" dealt with by the tape printing apparatus 1 are referred to as characters C1 to C4, respectively, and main images of printed characters are represented by character images (character portions) PC1 to PC4, respectively. In the illustrated example, a shaded character of the character C2 i.e. the second "Q" is formed (dotted lines appearing in the figure are imaginary lines provided for purposes of clarity, and the same applies hereinafter). Similarly, when the character C3 i.e. the third "Q" is desired to be decorated by outlining a contour thereof, and the character C4 i.e. the fourth "Q" is desired to be decorated by outlining and shading the same, options "OUTLINED" (outlined character) and "OUTLINED & SHADED" (outlined & shaded character) are selected on respective character decoration selection screens to designate only the third and fourth characters "Q's" as decorative ranges. Further, if the second and third "Q's" are desired to be surrounded by an outer frame, an option "OUTER FRAME" is selected to designate the second and third "Q's" as a decorative range (S112).

Figure 9:
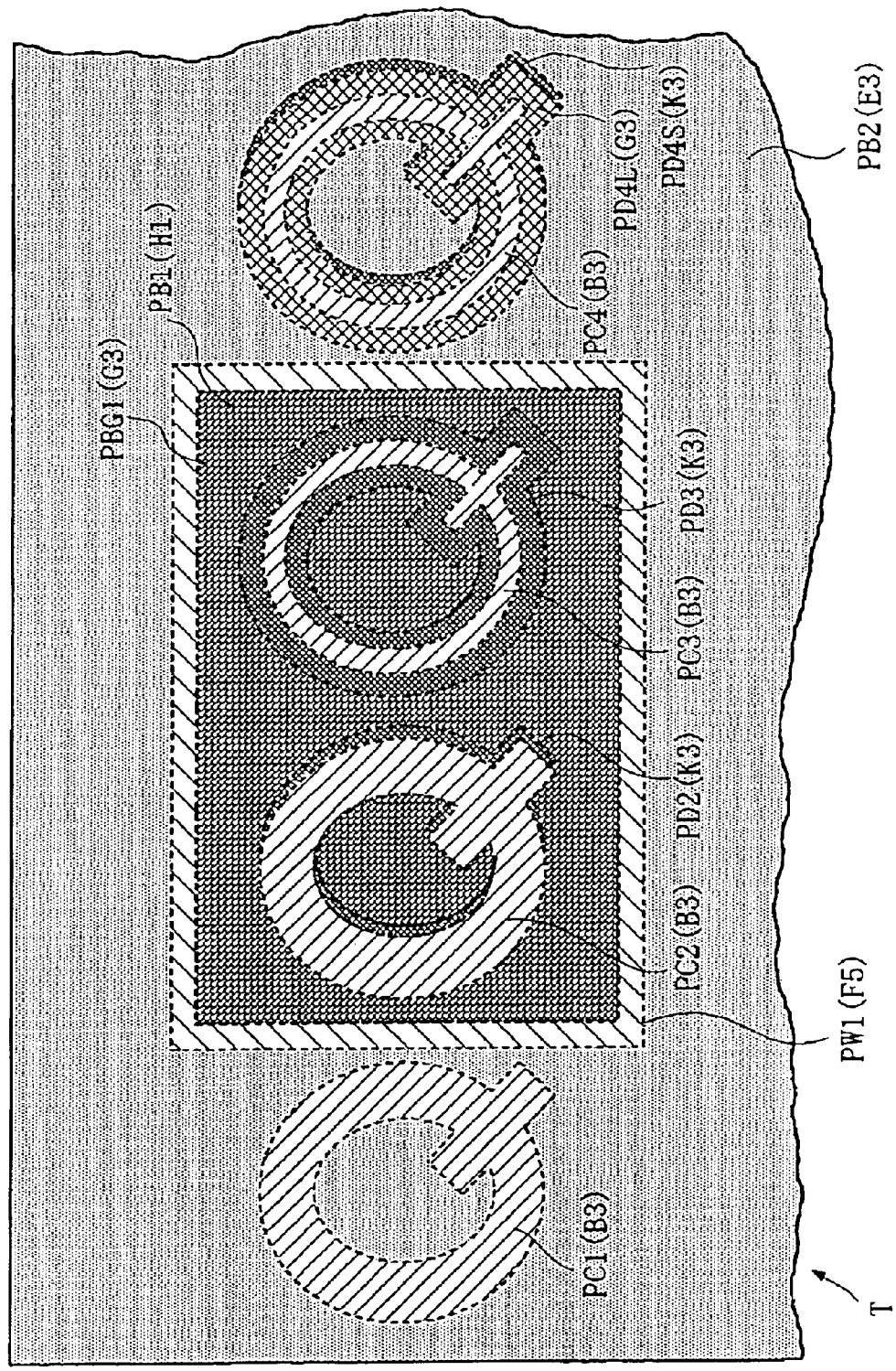
FIG. 9 is a diagram similar to FIG. 8, which illustrates an example of a decorated character image having a background pattern set in an in-frame portion of FIG. 8.

It should be noted that also when a character is desired to be decorated by enclosing it with a decorative portion or by the half-tone dot shading, the same setting procedure as described above may be carried out. Further, although at the step S112, the user can also set or change character sizes and the like if he operates the style key to switch the screen to a style selection screen, here, description thereof is omitted. Further, for instance, as shown in FIG. 9, when a background pattern is desired to be printed in a background of a character (the background is set within the outer frame, in this example), an option "BACKGROUND PATTERN PRINTING" may be selected on a format selection screen displayed by depressing the format key, and after the screen is switched to a selection screen for selecting a background pattern, hierarchically immediately under the selected option, a background pattern (picture) desired to be printed may be selected. Then, by designating a range of characters to have the background pattern printed in a background thereof e.g. as shown in the figure, the second and third "Q's" as a range of decoration similarly to the character-enclosing decoration, the background pattern is set to be printed on their background.

In carrying out a color-setting operation, first, the user operates the color specification key to select a color, e.g. "B3" in the table of FIG. 5 (red color: shown by oblique lines extending rightward and downward in the figure) as a designated color on a color specification selection screen. Then, by depressing the color-setting key, the user switches the screen to a selection screen for selecting an item for which the color "B3" is set. Here, in the tape printing apparatus 1, options, such as "BACKGROUND", "FRAME", "CHARACTER COLOR", "DECORATIVE COLOR" and the like, are displayed at a first level of a hierarchical menu for selecting an item for which a color is set, so that for instance, when the user desires the designated color "B3" to be set as a character color, he selects the option "CHARACTER COLOR".

Further, in the tape printing apparatus 1, when "CHARACTER COLOR" is selected as an option for selecting an item for which the designated color "B3" is set, the screen is switched to a selection screen hierarchically immediately under the option of "CHARACTER COLOR", on which are displayed options, such as "BG COLOR" (background color), "BG PATTERN COLOR" (background pattern color) and the like. Hence, when the designated color "B3" is desired to be set as a background color (i.e. the ground color of the background), the option "BG COLOR" is selected. Similarly, when the designated color "B3" is desired to be set as the color of a background pattern (i.e. a color forming the background pattern) without changing the ground color of the background, the option "BG PATTERN COLOR" is selected. Further, in the tape printing apparatus 1, when the option "FRAME" is selected as an option for selecting an item for which the designated color "B3" is set, the screen is switched to a selection screen hierarchically immediately under the option "FRAME", on which are displayed options, such as "FRAME LINE COLOR", "IN-FRAME COLOR" and the like. Accordingly, when the designated color "B3" is desired to be set as the color of a frame line (i.e. a color forming the frame line), the option "FRAME LINE COLOR" is selected. Similarly, when the designated color "B3" is desired to be set as a color in a frame (i.e. the ground color of a background within the frame), the option "FRAME LINE COLOR" is selected.

For instance, as shown in FIG. 8, after the color "B3" (red color) has been selected as a designated color, the option "CHARACTER COLOR" is selected, and the characters C1 to C4 i.e. the first to fourth "Q's" are specified as a range for the setting, whereby it is possible to set the color of the main images (character portions) PC1 to PC4 of the characters C1 to C4, that is, a character color therefor to the color "B3". Similarly, after a color "E3" (yellow color: shown by thick dot shading in the figure) has been selected as a designated color, if the option "BG COLOR" is selected, and the characters C1 to C4 i.e. the first to fourth "Q's" are specified as a range for the setting, it is possible to set the color of a background portion B2 (image PB2 of the background portion of a result of printing of the characters C1 to C4), that is, a background color to the color "E3" (hereinafter, as shown in the figure, portions of an image printed based the settings described above are referred to as a character portion PC1 (B3), a character portion PC2 (B3), a character portion PC3 (B3), a character portion PC4 (B3), the background portion PB2 (E3), and so forth). Similarly, after a color "F5" (grass green; shown by oblique lines extending leftward and downward in the figure) has been selected as a designated color, the option "FRAME LINE COLOR" is selected, and the characters C2 and C3 i.e. the second and third "Q's" are specified as a range for the setting, whereby the color "F5" can be set as the color of a frame line (frame line portion) PW1 (hereinafter described as "the color of the frame line portion PW1 (F5) can be set"). Further, similarly, a color of a background portion (in-frame portion) PB1 (H1: aqua color: shown by thin dot shading in the figure) inside the frame can be set.

Further, similarly, in the case of the example illustrated in FIG. 9, a color "G3" (green color: shown in the figure in a manner not distinguished from other colors, since the color "G3" is not used for a plane here) is designated to a background pattern color, and the characters C2 and C3 i.e. the second and third "Q's" are specified as a range for the setting, whereby the color "G3" can be set as the color of a portion of a background pattern (background pattern portion) PBG1 drawn on an immediate background of the characters, that is, the color of a background pattern portion PBG1 formed on an in-frame portion PB1 (H1) (the color of the background pattern portion PBG1 (G3) can be set). In the above case, the apparatus may be configured such that options "IN-FRAM BG COLOR (or IN-FRAME GROUND COLOR)" and "IN-FRAME BG PATTERN COLOR", for instance, are provided in place of the option "IN-FRAME COLOR" to permit selection of one of them. In this case, a background pattern which is identical to or different from a background pattern within the frame may be set only for background portions of the characters C2, C3 (i.e. portions above an upper part of and below a lower part of the frame line portion PW1 (F5) in the figure), in the background portion PB2 (E3) such that background patterns inside and outside the frame can have different colors from each other set therefor. To this end, the option "BG PATTERN COLOR" hierarchically immediately under the option "BACKGROUND" may be used as one for setting the color of a background pattern outside the frame.

Further, in the tape printing apparatus 1, when "DECORATIVE COLOR" is selected as an option of an item for which a designated color is set, the screen is switched to a selection screen hierarchically immediately under the option of "DECORATIVECOLOR", on which a redisplayed options, such as "OUTLINE COLOR" (character outline color), "SHADE COLOR" (character shade color), "ENCLOSING LINE COLOR", "ENCLOSED PORTION COLOR". "MESH COLOR", and the like. The option "OUTLINE COLOR" is provided for setting the color of the outline (character outline portion) of a character in the case of the character-outlining decoration and the character-outlining/shading decoration. As shown in FIGS. 8 and 9, for instance, when a designated color "K3" (light gray color) is desired to be set as a decorative color (i.e. character outline color) of a decorative portion (i.e. character outline portion) PD3 of the character C3 i.e. the third "Q", the option "OUTLINE COLOR" is selected and the character C3 i.e. the third "Q" is set as a range for the setting, whereby the color of the character outline portion PD3 (K3) can be set.

Further, the option "SHADE COLOR" is provided for setting the color of a shade (character shade portion) of a character in the case of the shading decoration and the character-outlining/shading decoration. Similarly, for instance, when the designated color "K3" (light gray color: shown by fine mesh in the figure) is desired to be set as a decorative color (i.e. character shade color) of a decorative portion (i.e. character shade portion) PD2 of the character C2 i.e. the second "Q", the option "SHADE COLOR" is selected and the character C2 i.e. the second "Q" is specified as a range for the setting, whereby the color of the character shade portion PD2 (K3) can be set. Further, for instance, as to the character C4 i.e. the fourth "Q", if the designated color "G3" (green color: shown by coarse mesh in the figure) is desired to be set as a decorative color (i.e. character outline color) of a character outline portion PD4L of the character C4, and the designated color "K3" (light gray color) is desired to be set as a decorative color (i.e. character shade color) of a character shade portion PD4S of the character C4, the option "OUTLINE COLOR" and the option "SHADE COLOR" are selected and the character C4 i.e. the fourth "Q" is specified as a range for the settings, whereby the color of the character outline portion PD4L (G3) and the color of the character shade portion PD4S (K3) can be set.

Further, the options "ENCLOSING LINE COLOR" and "ENCLOSED PORTION COLOR" are provided for setting the color of a line portion forming a line enclosing a character (enclosed character), and the dolor of a portion (except for a character portion) inside the line, respectively. They have the same relationship therebetween as the relationship between the options "FRAME LINE COLOR" and "IN-FRAME COLOR", described above. The option "MESH COLOR" is provided for setting the color of a meshed portion produced in the case of the half-tone dot shading decoration, and the mesh color can be set as the color of a mesh pattern against the ground color of a background. Color-setting operations in the cases of the options "ENCLOSING LINE COLOR", "ENCLOSED PORTION COLOR" being selected can be carried out in the same manner as in the above-mentioned color-setting operations.

Further, instead of employing the above setting methods (the character decoration-setting method and the color-setting method), after the image key is operated in the state of the text edit screen or one of the selection screens being displayed to switch the screen to a display screen (image screen) for displaying a print image, thereby causing the same image as shown in FIG. 8 or 9 to be displayed on the image screen, portions of the image may be directly designated for character decoration and color settings on the display screen, thereby decorating designated characters or setting designated colors to the colors of designated portions of characters.

Referring to FIG. 4, irrespective of whether settings are carried out on the text edit screen or on the above image screen, after entry of text data (including entry of settings: S11) is completed, if printing is instructed (the print key is depressed) at step S12, a print image is formed according to the settings at step S13, and printed at step S14, followed by terminating the image-forming/printing process (S10) at step S15.

Now, as described hereinabove with reference to FIGS. 8 and 9, when there are a lot of kinds of colors which can be set, and further when there are a lot of image elements which can be set separately, it is a very troublesome and time-consuming work to select a desired color one by one from the many colors for setting the color for each image element. To eliminate these inconveniences, in the tape printing apparatus 1, it is possible to carry out ordinary settings required for forming a decorated character image, simply by selecting a predetermined mode (color mode) as one adapted to a whole image or impression of the decorated character image, thereafter further arbitrarily changing only colors of desired elements, thereby saving part or whole of a troublesome setting operation. More specifically, in the tape printing apparatus 1, if the color mode key is depressed during entry of text data (S11), the screen is switched to a selection screen for selecting a color mode, on which are displayed options for setting a color mode, such as "CAUTION", "ACTIVE", "CASUAL", "NATURAL", . . . , "MONOTONE" and the like, shown in FIGS. 6 and 7. Hence, if only a desired color mode is selected and colors set for specific elements by the desired color mode are changed if desired, it is possible to carry out ordinary settings required for forming the decorated character image, thereby saving part or whole of a troublesome setting operation.

For instance, FIGS. 6 and 7 show examples of colors set by default (default colors) which can be substituted for colors whose settings are omitted when a color mode is selected to save part or whole of a color-setting operation. For instance, in the case of the examples described above with reference to FIGS. 8 and 9, if an option "MODERN" (No. 12) is selected in advance as the color mode, it is possible to omit the color settings of the character portions PC1 (B3) to PC4 (B3), that is, the settings of the character colors. Further, if an option of "COOL" (No.6) or "CHIC" (No.19) is selected beforehand as the color mode, it is possible to omit the setting of a color of the character shade portion PD2 (K3), the character outline portion PD3 (K3), and the character shade portion PD4S (K3), all of which are decorative portions, that is, the settings of the decorative colors.

However, depending on a combination of predetermined default colors set for individual image elements, or a combination of a default color and a color set as desired, it is sometimes difficult to discern elements (image elements) from each other. For instance, generally, a character portion corresponding to a character or characters of a decorated character image is desired to be made conspicuous against a background thereof, so that a default color set to the character portion is also made conspicuous against a default color set to the background. Further, similarly, a decorative portion corresponding to a portion for decorating the character portion of the decorated character image is also desired to be made conspicuous against the background thereof, so that a default color for the decorative portion is also set conspicuous against the default color for the background (see FIGS. 5 to 7). Therefore, a default color for the character portion and a default color for the decorative portion are liable to become identical or similar to each other, and when settings of colors of both of the character portion and the decorative portion are omitted, a combination of default colors are set for the character portion and the decorative portion, respectively, which often makes it difficult to distinguish the color set to the character portion from the color set to the decorative portion. Further, also when one of a character color and a decorative color is set as desired, the user usually selects a color conspicuous against a background color, so that the combination of a default color and a color set as desired is liable to be a combination of colors identical to or similar to each other. This is likely to result in a combination of colors which makes it difficult to discern a character portion from a decorative portion.

Figure 10:
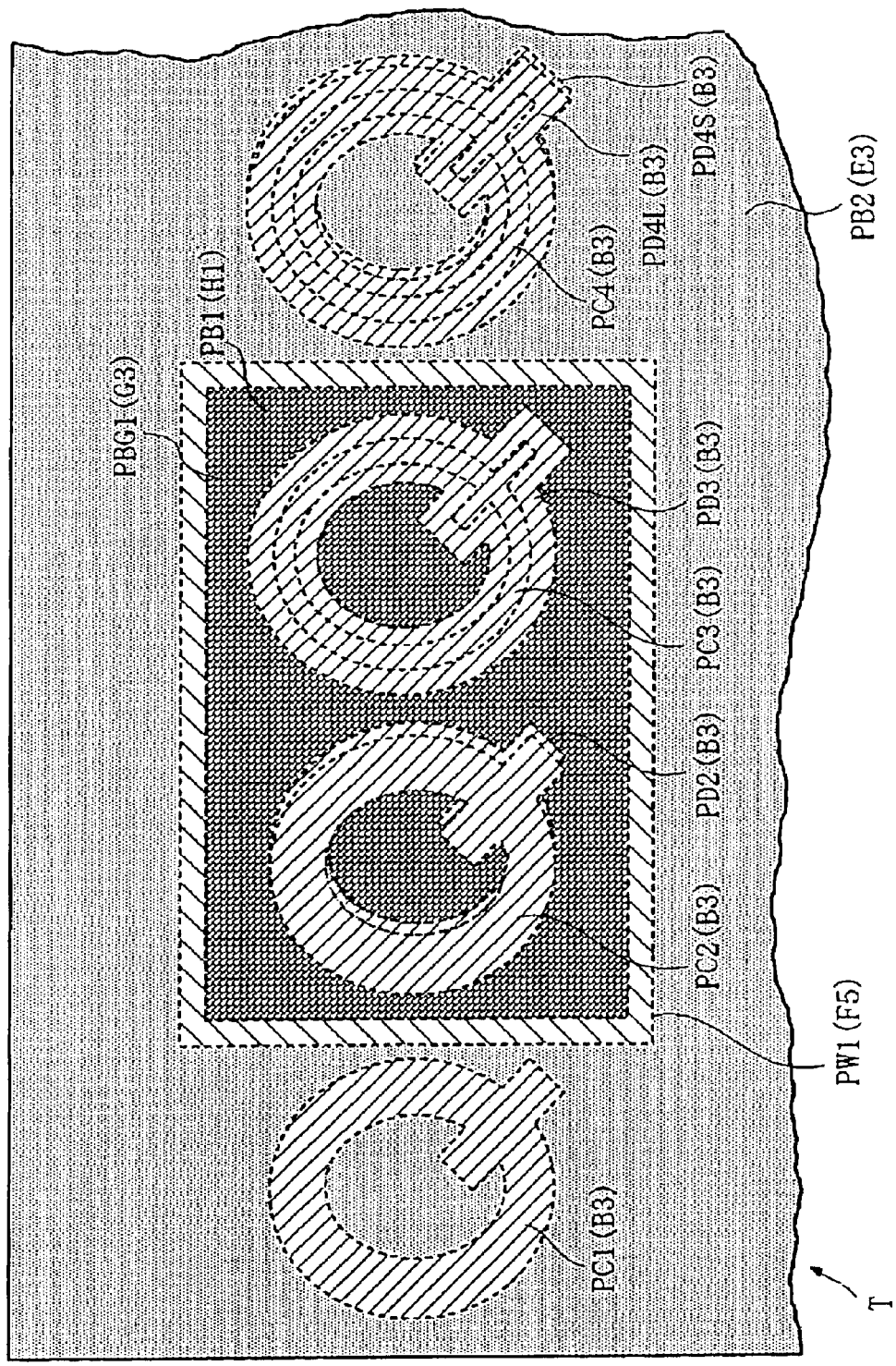
FIG. 10 is a diagram similar to FIG. 9, which illustrates an example of a combination of colors preventing character portions and decorative portions from being discerned from each other when an arbitrary setting of at least one of a character color and a decorative color appearing in FIG. 9 is omitted.
Figure 11:
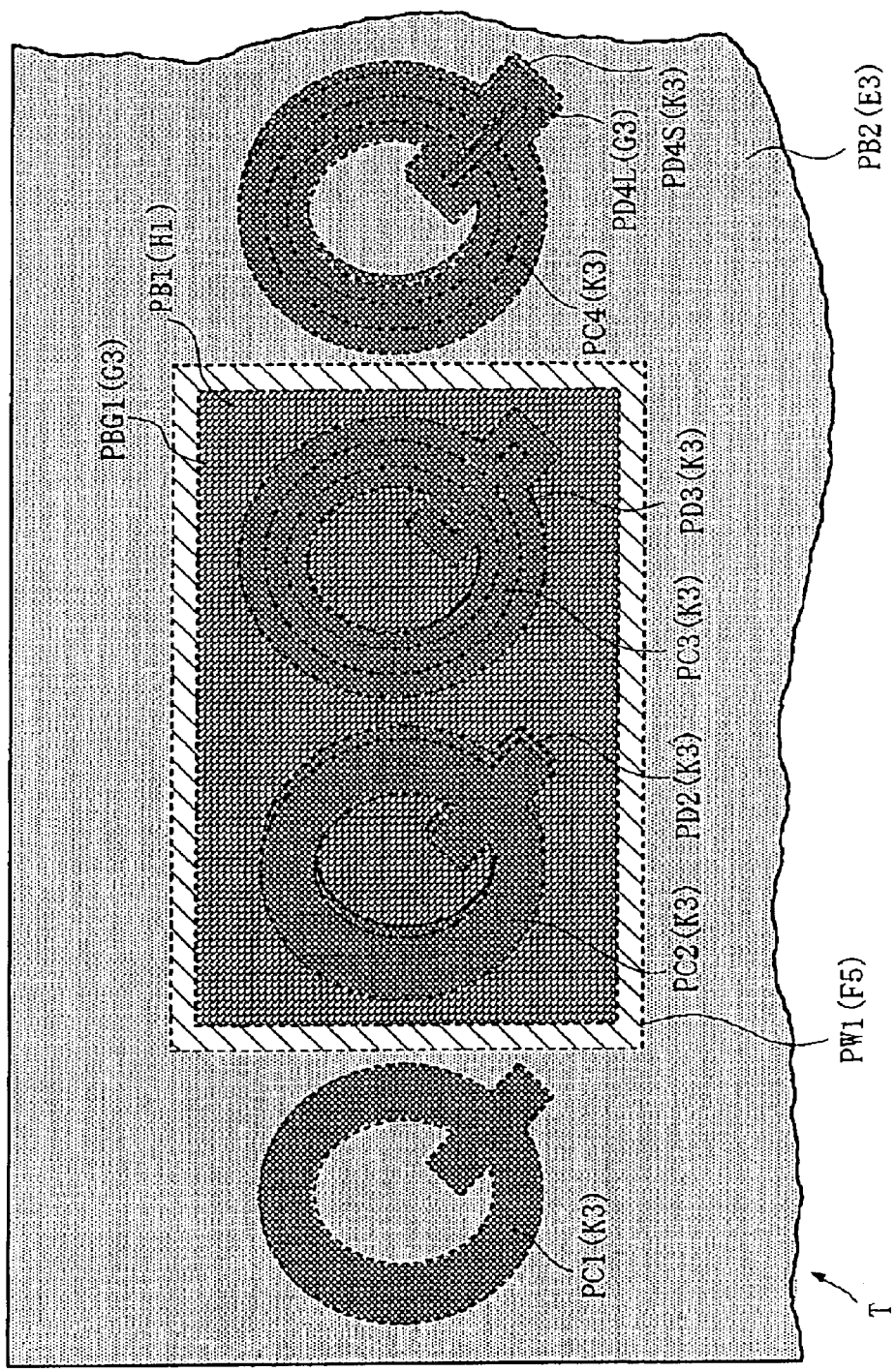
FIG. 11 is a diagram similar to FIG. 10, which is useful in explaining another example of a combination of colors preventing character portions and decorative portions from being discerned from each other, with reference to FIG. 10.

For instance, after selection of the option "MODERN" (No.12) as a color mode, when the user sets the decorative color "B3" for each decorative portion without being conscious of the default character color "B3" set for the color mode "MODERN", so as to make the decorative portion conspicuous against the background portion PB2 (E3) (outside the frame) of the whole character image and the background portion (in-frame portion) PB1 (H1), or inversely when the user sets the character color "B3" for each character portion without being conscious of the default character color "B3" set for the color mode "MODERNS" or further when the user omit all the settings of colors of each character portion and each decorative portion, as shown in FIG. 10, the combination of the default color and the color set as desired, or the combination of the default colors becomes a combination of identical colors, which makes it difficult to distinguish each character portion and each decorative portion from each other, differently from the example of the same character image appearing in FIG. 9. FIG. 11 shows another example of the combination of identical colors. For instance, when the user selects the option of "COOL" (No.6) or "CHIC" (No.19), and sets the decorative color "K3" for each decorative portion without being conscious of the default character color "K3" set for each color mode, or inversely when the user sets the character color "K3" for each character portion without being conscious of the default character color "K3" or further when the user omits all the settings of colors of each character portion and each decorative portion, the combination of the default color and the color set as desired, or the combination of the default colors becomes a combination of identical colors, which makes it difficult to distinguish each character portion and each decorative portion from each other.

To solve the above problem, in the tape printing apparatus 1, when a decorated character image is formed by arranging decorated characters formed by decorating arbitrary characters as desired, on an arbitrary background, an image processing method is adopted which is capable of forming a decorated character image having a character portion and a decorative portion decorated by colors suitable and readily distinguishable from each other, even if a color-setting operation for setting a color or colors for one or both of the character portion and the decorative portion of the character image are omitted. In the following, the image processing method employed in the tape printing apparatus 1 will be described.

According to the image processing method employed in the tape printing apparatus 1, when a decorated character image is formed which has a character portion, a decorative portion, and a background portion as a portion of a background on which the decorated character image is formed, exclusive of the character portion and the decorative portion, with a color being set for the character portion as a character color and a color being set for the decorative portion as a decorative color, a default color or default colors (first default colors(s)) as shown in FIGS. 6 and 7 are set for the at least one of the character color and the decorative color whose setting is omitted due to omission of an arbitrary setting thereof. This makes it possible to save the trouble of setting of colors. However, as shown in FIGS. 10 and 11, when it is difficult to discern the character portion and the decorative portion from each other depending on a combination of the first default color and the other color (i.e. the decorative color in the case of omission of the setting of a character color, or the character color in the case of omission of the setting of the decorative color), a predetermined second default color is determined as a color to be set in place of the other color or the first default color, and the colors thus set as the character color and the decorative color are allocated to the character portion and the decorative portion to thereby form a decorated character image.

In other words, not only a first default color is determined when the arbitrary setting is omitted but also a second default color is determined when it is difficult to discern the character portion and the decorative portion from each other, whereby if it is difficult to distinguish the character portion and the decorative portion from each other when the first default color is set, one of the character color and the decorative color is changed to the second default color, whereby it becomes possible to avoid difficulty in discriminating the character portion from the decorative portion. Therefore, according to the image processing method employed by the tape printing apparatus 1, when a decorated character image is formed by arranging decorated characters formed by decorating arbitrary characters as desired, on an arbitrary background, the decorated character image can be formed such that it has a character portion and a decorative portion decorated by respective suitable colors readily distinguishable from each other, even if a color-setting operation for setting a color or colors for one or both of a character color for the character portion and a decorative color for the decorative portion is omitted.

More specifically, in the case where a print image having a character portion and a decorative portion difficult to distinguish from each other, e.g. as shown in FIG. 11, is formed by printing of a decorated character image as formed by setting the first default color as a character color or a decorative color, according to the tape printing apparatus 1, it is possible to select a color-setting method from the following two default color-setting methods, that is, a transparent character color-setting method and a background pattern deletion-setting method, by depressing the format key (similarly to the case of setting formats for the background pattern printing and the fixed length printing). The latter background pattern deletion-setting method is employed only for printing a portion whose background is subjected to the background pattern printing, so that the former transparent character color-setting method is employed by default.

In the transparent character color-setting method, a transparent color is designated as the second default color for a character color (hereinafter, this setting processing is referred to as "the character color-transparentizing processing"). Generally, depending on the type of character decoration, a decorated character image sometimes has a more excellent appearance when character portions are assimilated with a background, that is, only decorative portions are made conspicuous against the background than when both of the character portions and the decorative portions are made conspicuous. Here, the term "transparent color" is used to mean a color capable of assimilating with a background. To provide the transparent color, image processing may be carried out by cutting out the transparent portion (character portion) from a character image and pasting the resulting character image onto a background image, or if the background image of the decorated character is an achromatic or unicolored plain image, the same color as that of the background image may be set for the character portion. Alternatively, if the background image is a background pattern image having a background pattern of a predetermined color, the character portion may be formed such that it is caused to have a pattern continuous with the background pattern by writing the background pattern over the character portion. In any of these cases, the transparent character color-setting method is especially suitable for a case in which a decorated character image has a more excellent appearance when a color arrangement is carried out such that only decorative portions are made conspicuous against a background portion.

Figure 12:
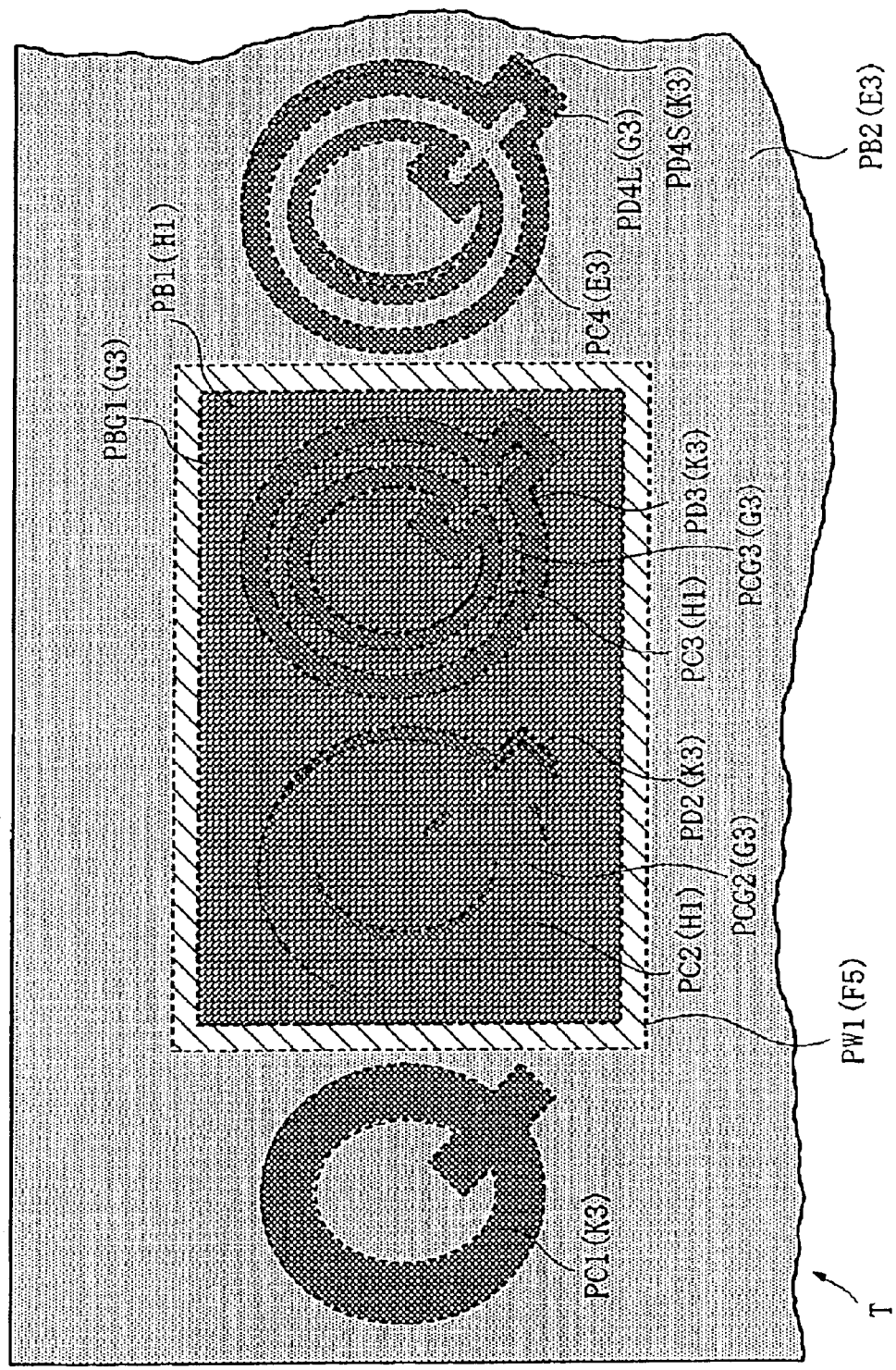
FIG. 12 is a diagram similar to FIG. 9, which is useful in explaining an example of a result of printing of a decorated color character image which is formed by carrying out character color-transparentizing processing on the FIG. 11 decorated color character image.
Figure 13:
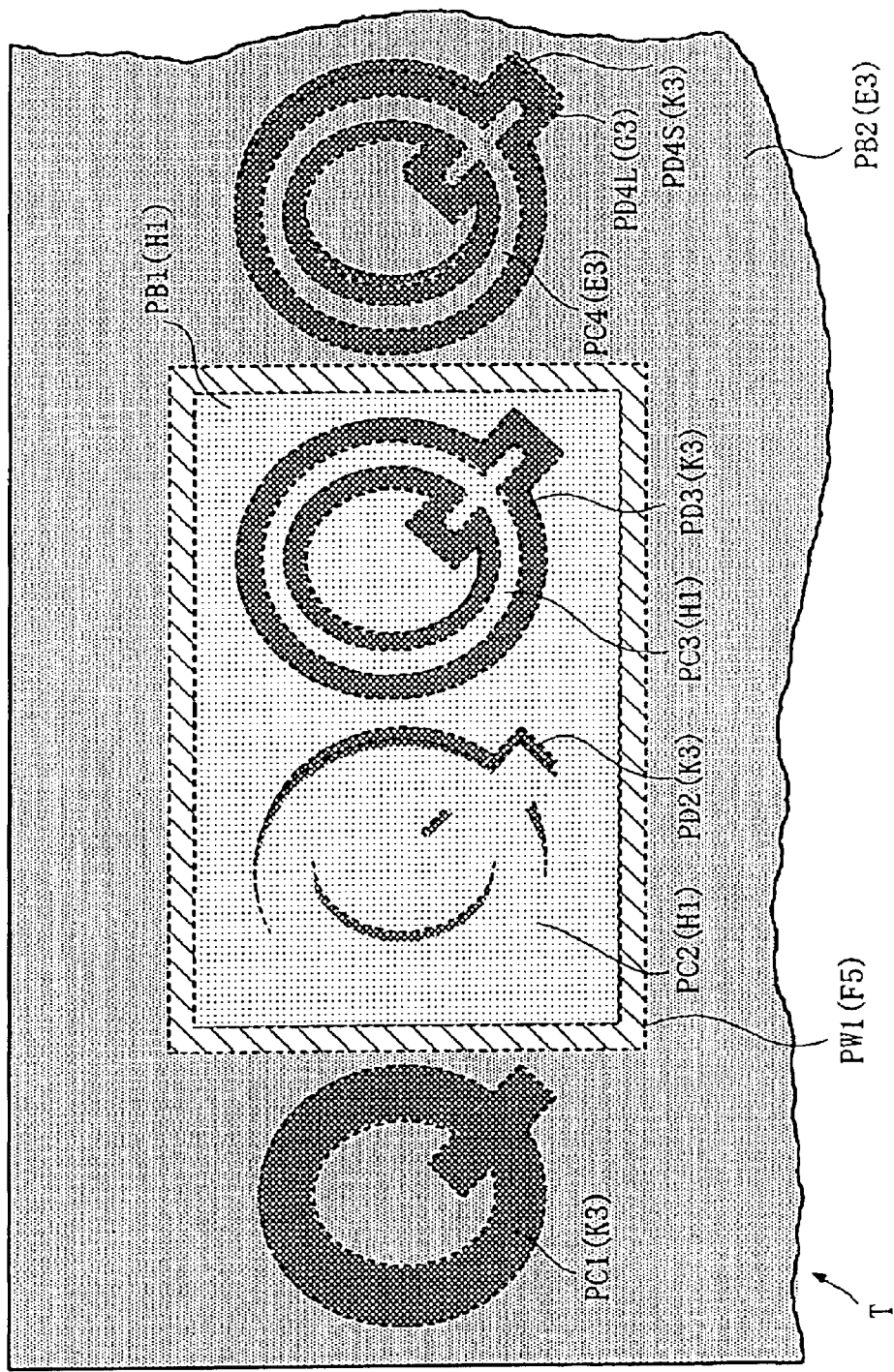
FIG. 13 is a diagram similar to FIG. 12, which illustrates an example of a result of printing of a decorated color character image, which is formed by deleting a background pattern from the FIG. 11 decorated color character image and carrying out the character color-transparentizing processing thereon.

For instance, if printing of decorated character images without further processing produces such a print image as described above with reference to FIG. 11, the transparent character color-setting method sets a transparent color as the second default color to a character color, as shown in FIG. 12, for instance, whereby character portions PC2, PC3, PC4 can be assimilated with backgrounds thereof, thereby making decorative portions PD2, PD3, PD4L, PD4S more conspicuous. Further, for instance, if the resulting decorative portions clearly show deletion of character portions corresponding thereto, it is also possible to implicitly emphasize (make potentially conspicuous) the existence of the invisible character portions. Further, this prevents the character portions and the decorative portions from having an identical color or similar colors, so that color arrangement can be effected such that the character portions and the decorative portions are made readily distinguishable from each other. This transparent character color-setting method can be applied to a decorated character image irrespective of whether a background image thereof is a plain image or a background pattern image. For instance, even when the decorated character image does not have the background pattern portion PBG1 shown in FIG, 11, a print image as shown in FIG. 13, for instance, is printed by carrying out the character color-transparentizing processing in the same manner as described above with reference to FIG. 12.

On the other hand, as described above, if the background pattern deletion-setting method is selected beforehand, the method is employed only for printing a portion whose background is subjected to the background pattern printing, while to the other portions the default transparent character color-setting method is applied. In general, when the image of a background is a background pattern image which has a background pattern of a predetermined color on an achromatic or unicolored plain image, omission (deletion) of a character portion or a decorative portion therefrom sometimes provides a conspicuous achromatic or unicolored portion. Depending on the pattern of the background pattern image, that is, when the background pattern is formed of a fine pattern or the like, for instance, if a character portion or a decorative portion is omitted (deleted), and a background pattern portion supposed to exist thereunder also disappears, only the color of the basic plain image is left to make conspicuous the resulting portion of this color. In such a case, depending on the type of character decoration, a decorated character image sometimes has a more excellent appearance when colors are arranged such that only one of the character portion and the decorative portion of a decorated character is made conspicuous against the plain image than when the color arrangement is carried out such that both of the character portion and the decorative portion are made conspicuous against the plain image.

The background pattern deletion-setting method can be suitably applied to the above case, whereby the second default color is made identical to the color of the plain image of the background to set the same to one of the character color and the decorative color (hereinafter, this setting processing is referred to as "the background pattern deletion processing"). In the background pattern deletion processing, image processing may be carried out by writing the second default color having the same color as that of the plain image over one of the character portion and the decorative portion, for which the second default color is set. Alternatively, a portion corresponding to the character portion and the decorative portion may be cut from the background pattern image and the resulting background pattern image may be pasted onto the plain image, and then the image of the other of the character portion and the decorative portion (for which the second default color is not set) may be arranged at (pasted to) the portion (cut from the background pattern to leave a plain image) again in a color set therefor.

Figure 14:
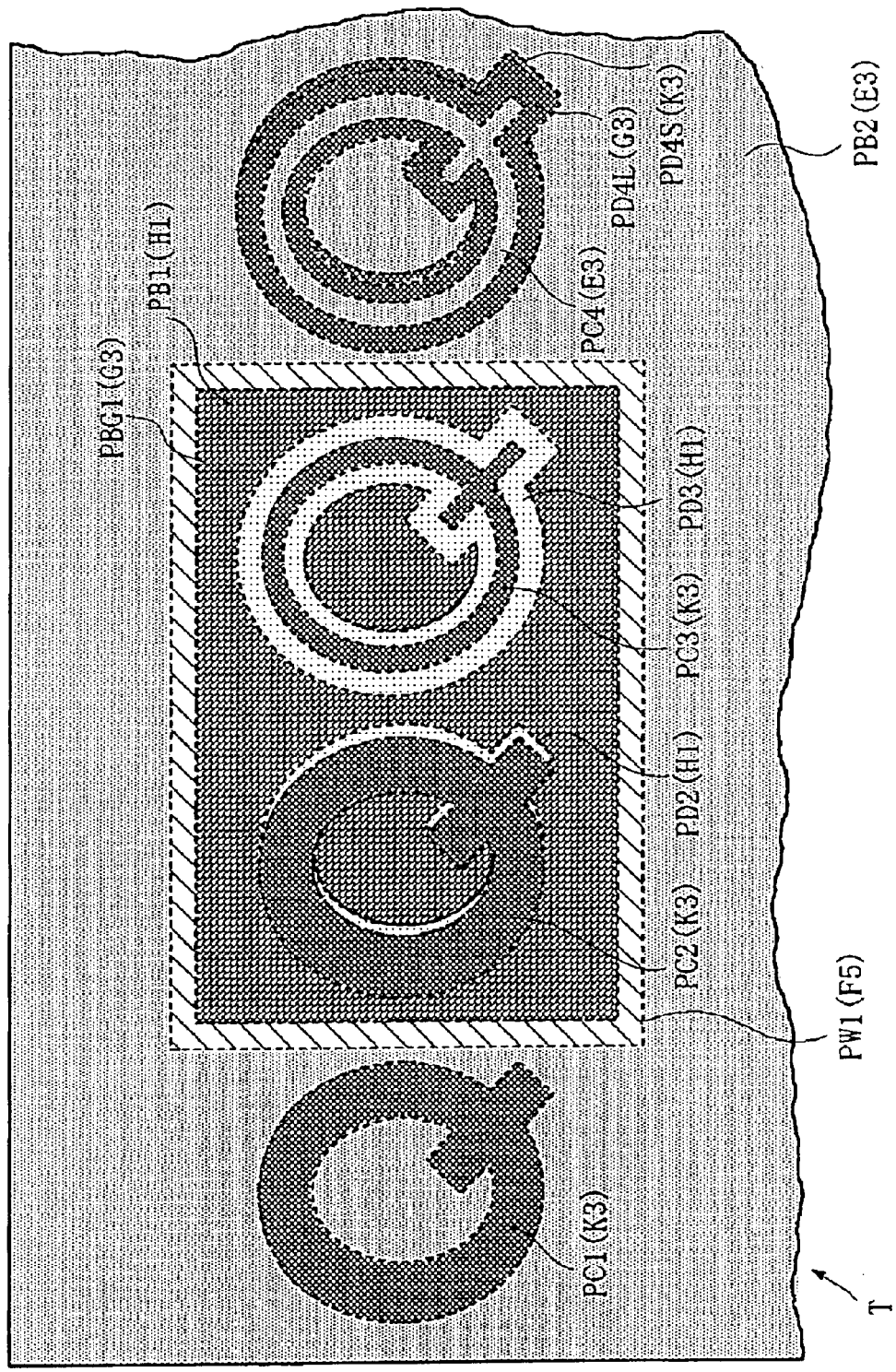
FIG. 14 is a diagram similar to FIG. 9, which is useful in explaining an example of a result of printing of a decorated color character image which is formed by carrying out background pattern deletion processing on decorative portions of the FIG. 11 decorated color character image, with reference to FIG. 12.
Figure 15:
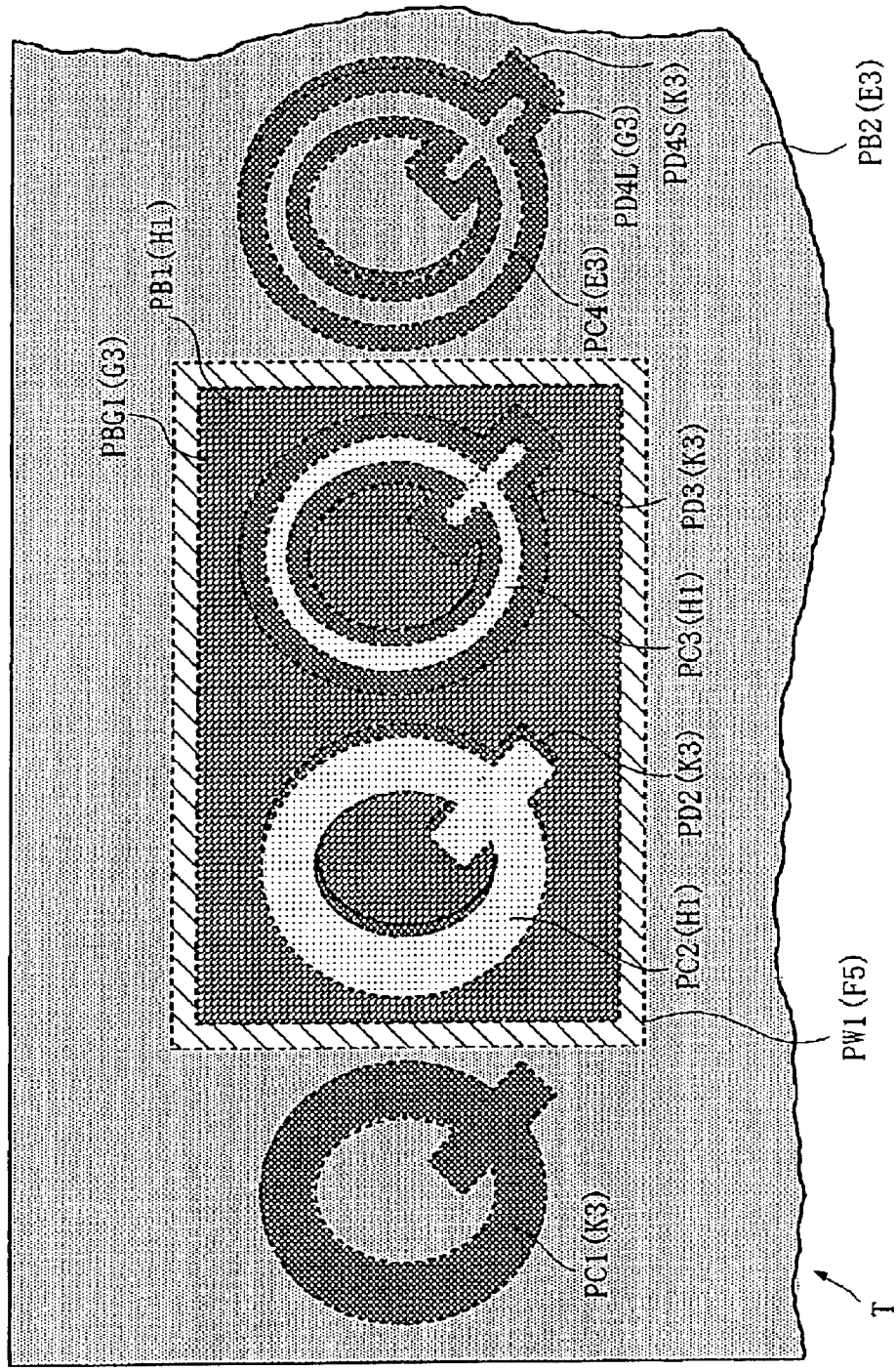
FIG. 15 is a diagram similar to FIG. 14, which is useful in explaining an example of a result of printing of a decorated color character image which is formed by carrying out the background pattern deletion processing on character portions of the FIG. 11 decorated color character image.

For instance, in the case where printing of the decorated character images without further processing provides the print image as described above with reference to FIG. 11, if the background pattern deletion-setting method is selected in advance, the method is applied to portions whose background is subjected to background pattern printing, that is, in the illustrated example, to the image portions of the characters C2 and C3 i.e. the second and third "Q's", whose background is the in-frame portion PB1 (H1) having the background pattern portion PBG1 (G3) drawn thereon. On the other hand, to the other portions the default transparent character color-setting method is applied. Hence, for instance, when the color "H1" is set as the second default color for the decorative portions PD2, PD3 (i.e. when the color setting is carried out for the decorative portion PD2 (H1), the decorative portion PD3 (H1)), for instance, a print image as shown in FIG. 14 is obtained. Similarly, when the second default color "H1" is set for the character portions PC2 and PC3 (i.e. when the color setting is carried out for the character portion PC2 (H1) and the character portion PC3 (H1)), for instance, a print image as shown in FIG. 15 is obtained. Further, when the background pattern deletion-setting method has been selected (set), which of the character portions and the decorative portions should be caused to have the second default color (i.e. the color of the plain image) may be determined beforehand, or it may be selected on a selection screen hierarchically immediately under the option of the background pattern deletion-setting method when the method is selected (set). Further, the background pattern deletion-setting method may be preferentially applied to one of the character portions and the decorative portions, for which the first default color is set (or whose color is set as desired).

In any of these cases, when the image of a background is a background pattern image which has a background pattern of a predetermined color on an achromatic or unicolored plain image, the background pattern deletion-setting method is applied to a portion which has such a background pattern image, and the second default color is made identical to the color of the plain image to set the same to one of the character color and the decorative color, so that it is possible to make one of the character portion and the decorative portion conspicuous by the color identical to the color of the plain image, and the other by a color set therefor beforehand. As a result, since the character portion and the decorative portion are prevented from having identical colors or similar colors to each other, color arrangement can be effected such that the character portion and the decorative portion are made readily distinguishable from each other.

Although for purposes of ease of understanding, the transparent character color-setting method and the background pattern deletion-setting method have been described based on an example in which the character portion and the decorative portion have the same color, this is not limitative, but the methods can be applied not only to the combination of identical colors but also to the combination of similar colors, if a range of similarity in coloration or gray tone is set in advance.

As described above, according to the tape printing apparatus 1, the arbitrary character decoration includes the shading decoration for forming a shaded character of an arbitrary character, and hence when a decorated character image is formed by the shading decoration, it is possible to form a decorated character image having a character-shading portion as a decorative portion with a character portion and the decorative portion set to such suitable colors as make these portions readily distinguishable from each other. Similarly, the arbitrary character decoration includes the character-outlining decoration for forming an outlined character of an arbitrary character, and the character-outlining/shading decoration for forming an outlined and shaded character of an arbitrary character, and hence when a decorated character image is formed by the shading decoration or the character-outlining/shading decoration, it is possible to form a decorated character image having a character-shading portion or a character outlining/shading portion as a decorative portion with a character portion and the decorative portion set to such suitable colors as make these portions readily distinguishable from each other.

Although examples of the enclosing decoration and the half-tone dot shading decoration have not been given, they can be employed similarly to the above decoration methods. In the enclosing decoration and the half-tone dot shading decoration, the character portion of a decorated character results in a portion enclosed by a decorative portion of the decorated character, so that similarly to the case of the character-outlining decoration, if the character portion is made transparent or caused to have the same color as that of a plain image left behind after deleting the background pattern of the background of the decorated character, the result is that both of the character portion and the decorative portion are made conspicuous. Further, when the background of the decorated character has a background pattern, if the decorative portion enclosing the character portion is caused to have the same color as that of the plain image, both of the character portion and the decorative portion can be made conspicuous. Further, particularly in the case of the enclosing decoration, since an enclosing line color and the color of an enclosed portion can be set or configured, it is possible to employ a method of setting the color of the enclosed portion to a transparent color or to the same color as that of the plain image. Further, similarly, in the case of the character- outlining/shading decoration as well, a method of setting an outline color to a transparent color or to the same color as that of the plain image can also be employed, since the outline color and a shade color can be set or configured.

Further, in the tape printing apparatus 1, an image formed therein can be output as a display image displayed (output) on the display screen, or as a print image printed on the tape (printing medium) T, and hence it is possible not only to produce a decorated character image but also to output an output image formed based on the decorated character image as a display image or a print image.

Generally, the user sometimes wants to check e.g. a decorated character image, which is prepared by his machine for being output by an output device other than the output device of his machine, by outputting the decorated character image by using his own output device. In such a case, if his output device is capable of outputting an image having a resolution higher than that of the decorated character image prepared, i.e. if the output resolution of the output device of his machine is higher than that of the decorated character image prepared, there occurs no problem, because the decorated character image can be output as it is. However, if the output resolution of his output device is lower than that of the decorated character image prepared, only a small number of colors corresponding to the output resolution can be employed, so that it is required to convert the decorated character image to an image formed of the small number of colors (hereinafter this conversion is referred to as "the color-limiting processing") for output (hereinafter referred to as "limited-color output") of the character image. For instance, when a decorated color character image having multiple gradation values (having a higher resolution) is output to an output device which can only output a color image (including a monochrome image, as described above) having a smaller number of gradation values (having a lower resolution) (i.e. a lower resolution output device), it is required to carry out the color-limiting processing for converting a decorated color character image having a higher resolution to a color output image having a lower resolution and limited-color output of the output image subjected to the color-limiting processing.

The tape printing apparatus 1 according to the embodiment described above (hereinafter referred to as "the first embodiment") is capable of handling a decorated color character image. Now, let it be assumed, for instance, that the tape printing apparatus 1 according to the first embodiment is employed as a tape printing apparatus commonly used between a plurality of persons including the user himself, and personal data is filed and stored in the file pack storage 281 or the like owned by each person, while a user has a lower-end apparatus which is compatible with the file pack storage 281 but has an output resolution lower than that of the tape printing apparatus 1 according to the first embodiment. In such a case, it is convenient if a data item (decorated color character image) stored in the user's file pack storage 281 can be displayed or printed for preview by using his lower-end apparatus when the data item is desired to be checked on or verified during another person's use of the tape printing apparatus 1 for common use. Further, for instance, a situation is possible in the future in which the tape printing apparatus 1 according to the first embodiment is held by each person while a successor to the apparatus (higher-end apparatus) having an output resolution higher than that of the tape printing apparatus 1 is developed and commonly used between the persons. This is a situation similar to the above, and such a situation usually occurs concerning an image processing apparatus (e.g. a personal computer or the like) other than the tape printing apparatus.

Further, when a decorated character image formed by another higher-end image processing apparatus than the tape printing apparatus 1 can be diverted via a storage medium such as an FD (floppy disk), or via a network.

Further, the same situation as described above also occurs in the same image processing apparatus. For instance, the user sometimes wants to check on a decorated character image prepared for being printed (as a print image) by a printing apparatus (print means) having a higher output resolution, by displaying the decorated character image on a display device (display means) having a lower output resolution before printing. This holds true e.g. with a case in which a color print image is desired to be checked by preview on a monochrome display screen. Further, after forming a decorated character image at a higher resolution, the user sometimes desires to (intentionally) output the decorated character image at a lower resolution, in view of the following process. This holds true e.g. for a case in which a color print image is printed as a monochrome image so as to perform preview printing of the image at a low cost when the layout or the whole image or impression of the color print image to be formed by normal printing is desired to be checked.

However, in the above cases, that is, in the case in which the decorated character image prepared for being output to a higher resolution output device (output means: print means) is output by a lower resolution output device (output means: display means), or in the case where the decorated character image is intentionally output at a lower resolution, it is sometimes difficult to identify the decorated character image, if the color-limiting processing is simply carried out on the decorated character image for output (limited-color output) of the same. This is mainly because it becomes difficult to distinguish one element (image element) from another. For instance, usually, both a character portion corresponding to a character or characters of a decorated character image and a decorative portion corresponding to a portion for decorating the character portion of the decorated character image are each desired to be made conspicuous against a background thereof, so that colors set for the character portion and the decorative portion are liable to be made identical or similar to each other (similar colors include different colors but having gradation values identical or close to each other: identical or similar colors in the case of a monochrome image). In such a case, if a decorated character image having a higher resolution is output for limited-color output in a manner simply adapted to the lower resolution of a lower resolution output device without further processing, a plurality of image elements (e.g. one or more character portions and one or more decorative portions) of the decorated character image which are originally distinguished by the higher resolution are caused to have an identical color or similar colors to each other. Thus, one or more boundaries dividing the plurality of image elements can become unable to be discerned, which makes it impossible to identify the output image.

To solve the above problem, in the following, a tape printing apparatus 1 which has not only the function (carrying out the image processing method) of the tape printing apparatus 1 according to the first embodiment but also a function of coping with the above situations will be described as a second embodiment. The second embodiment has the same hardware construction as the first embodiment. More specifically, according to the tape printing apparatus of the second embodiment, when a decorated character image formed by arranging at least one decorated character formed by providing a desired character decoration on at least one arbitrary character, on an arbitrary background, with a character color being set to a character portion corresponding to the at least one arbitrary character and a decorative color being set to a decorative portion corresponding to a portion formed by the desired character decoration, is output as an output image, an image processing method is employed which is capable of outputting an output image having suitable colors readily distinguishable from each other which are set for the character portion and the decorative portion, even when limited-color output is carried out.

Although a decorated character image prepared for another output device can be employed by way of example, for purposes of simplicity, the following description will be made assuming that the tape printing apparatus 1 according to the present embodiment has a capability of (intentionally) outputting a decorated character image formed at a higher resolution, at a lower resolution. More specifically, it is assumed that the function key group 32, referred to hereinabove, includes a preview print key. That is, in this tape printing apparatus 1, the user can carry out preview printing to print a color print image as a monochrome image by operating the preview print key when he desires to check on the layout or the whole image of the color print image to be formed by normal printing.

First, the above problem is described by giving some examples. The decorated character images described above with reference to FIGS. 8 and 9 in the description of the first embodiment each actually has a color arrangement which is easily adaptable to preview printing, which would be clearly understood if a color image actually formed by printing the color images, in color, could be shown here. For instance, in FIGS. 8 and 9, the color set to the character portions PC1, PC2, PC3, PC4, that is, the character color "B3" (red color) is made very conspicuous against the color "H1" (aqua color: see FIG. 5, similarly see the figure in confirming the following colors set for each portion) set (as a background color) for the in-frame portion (background portion within the frame) PB1, and the color "E3" set (as a background color) for the background portion PB2 of the whole character image. On the other hand, the color set to the decorative portions PD2, PD3, PD4S, that is, the decorative color "K3" (light gray color: bright gray color), and the color set to the decorative portion PD4L, that is, the decorative color "G3" (green color) are made relatively inconspicuous against the colors "H1", "E3". They are, so to speak, in respective approximately intermediate positions between the background color and the character color. The same applies to the color set to the background pattern portion PBG1 shown in FIG. 9 since it is also "G3".

Therefore, even when the FIG. 9 decorated character images which are actually prepared as a color print image are subjected to monochrome preview printing, if the resolution of the monochrome print image is high to some degree, (i.e. if the total number of gradation values capable of representing gray tones of the character images is not extremely small in number), it is possible to distinguish the character portions, the decorative portions, and the background portion from each other, although they are not distinguished from each other so clearly as they are printed in color. For instance, if an original decorated character image is represented in colors C (cyan), M (magenta), Y (yellow), and K (black) as a color image with 256 gradation levels per color, and a monochrome image as a result of preview printing is formed as a monochrome (e.g. black and white) image with 256 gradation levels (corresponding to the total number of gradation values approximately at a level of a so-called gray level or gray scale image in a software application operating on an OS (Operating system) or the like in recent years), the preview printing, e.g. of the FIG. 8 decorated character image and the FIG. 9 decorated character image produces a FIG. 16 print image, and a FIG. 17 print image, respectively. The character portions, the decorative portions, and the background portion can be distinguished from each other (the case in which the total of gradation values is extremely small will be described hereinbelow).

However, as described above, the above examples result from the fact that the decorative colors have been set to relatively inconspicuous colors. If only the color image is considered without taking into account the preview printing and the monochrome printing, it is possible to arrange colors such that the character portion and the decorative portion are both made conspicuous against the background portion, and at the same time the character portion and the decorative portion can be distinguished from each other. For instance, if the color (decorative color) set for the FIG. 8 decorative portions PD2, PD3, PD4S, referred to hereinabove, is changed from the color "K3" (light gray color) to a color "I1" (bright blue color), colors can be arrange such that not only the character portions PC1 (B3), PC2 (B3), PC3 (B3), PC4 (B3) but also the decorative portions PD2 (I1), PD3 (I1), PD4 (I1) are made conspicuous against the background portions PB1 (H1), PB2 (E3), and at the same time the character portions PC1 (B3), PC2 (B3), PC3 (B3), PC4 (B3), and the decorative portions PD2 (I1), PD3 (I1), PD4S (I1) are made clearly distinguishable from each other.

Figure 17:
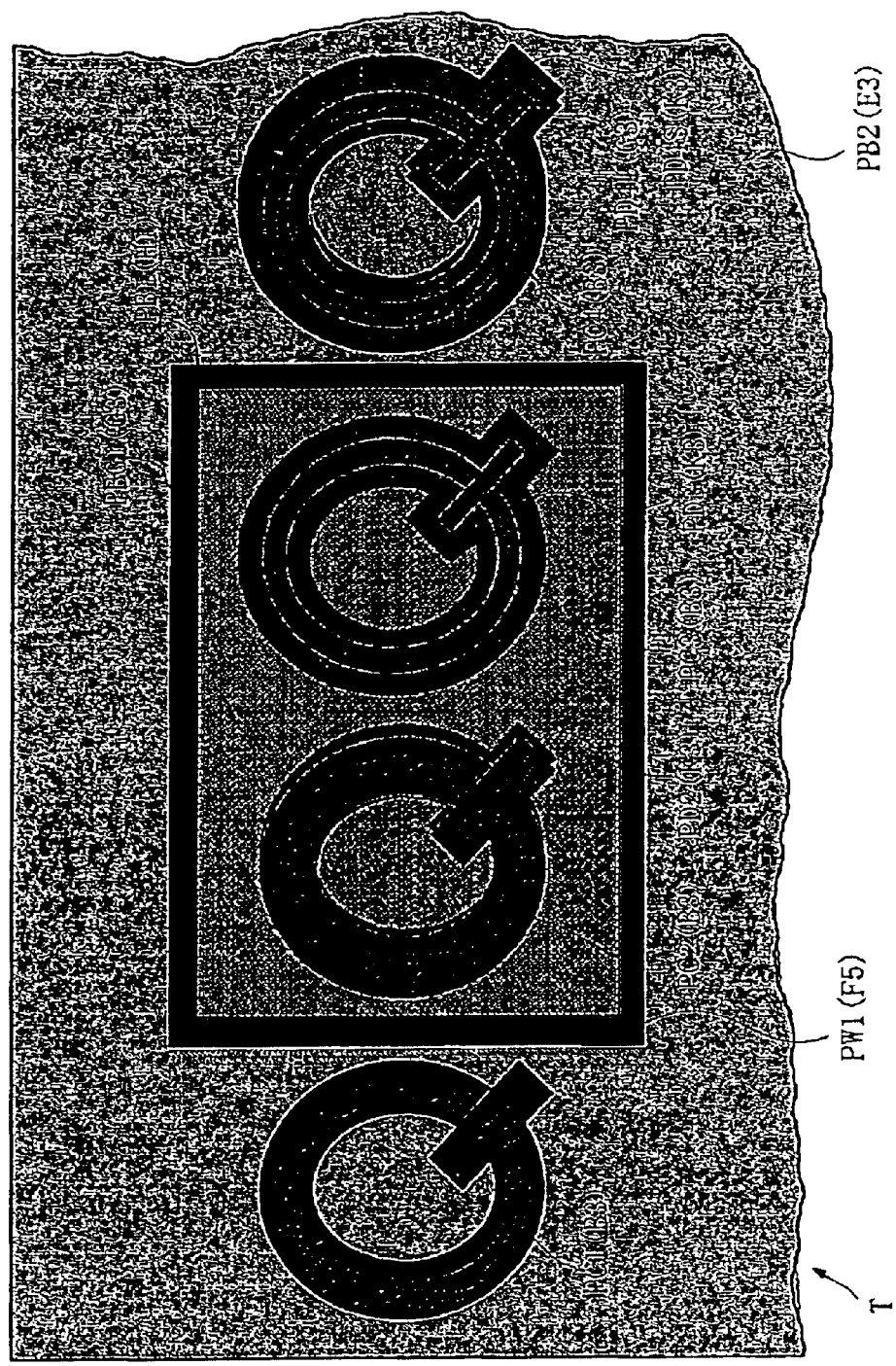
FIG. 17 is a diagram similar to FIG. 16, which is useful in explaining an example of a result of printing of the FIG. 9 decorated color character image by the color-limiting printing method.
Figure 18:
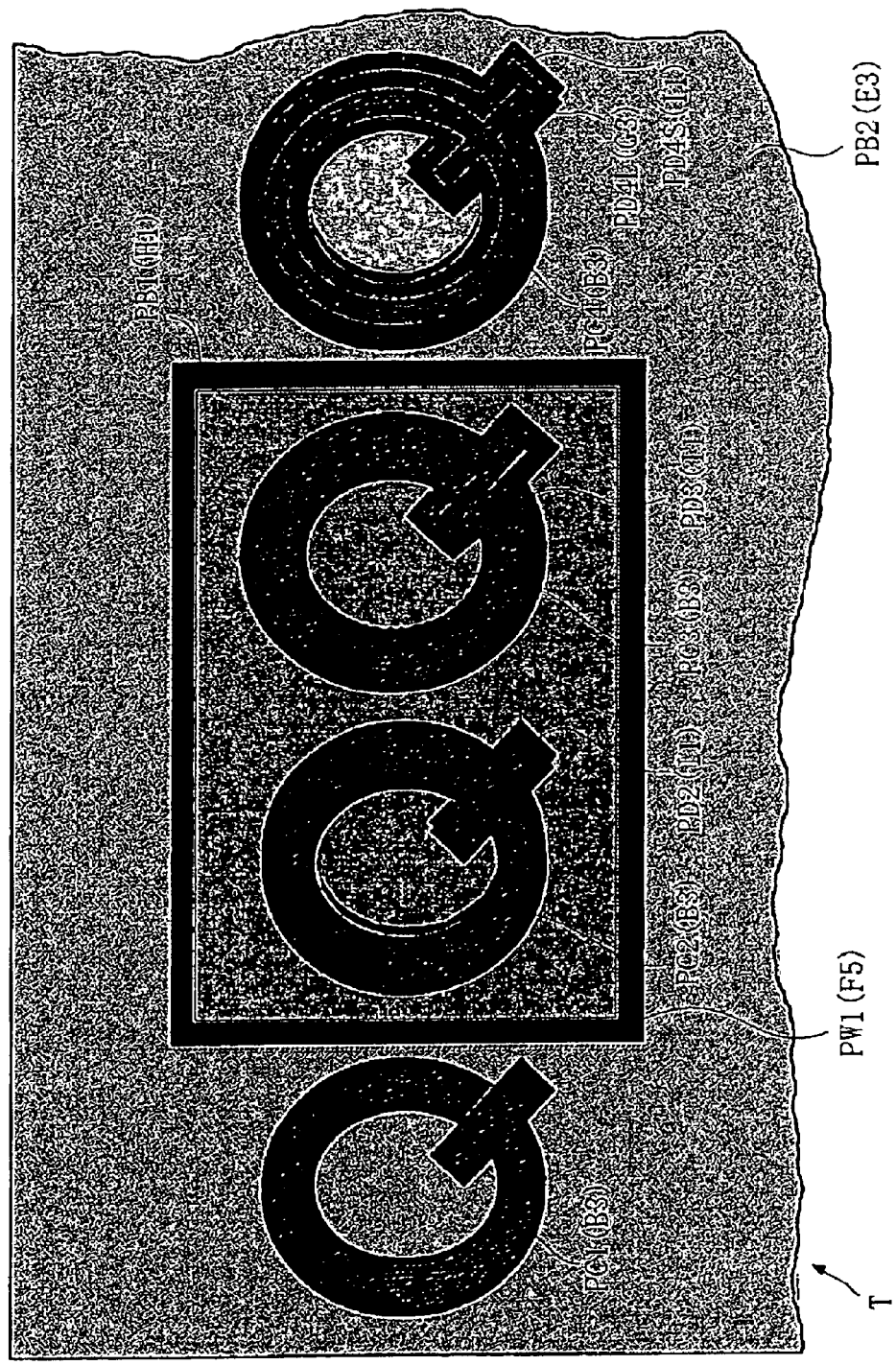
FIG. 18 is a diagram showing an example of a result of printing of a decorated color character image, which is formed by changing a decorative color of the FIG. 8 decorated color character image to a color conspicuous against a background color thereof, by the FIG. 16 color-limiting printing method in which 256-gradation monochrome preview printing is carried out on a tape.

When the colors are arranged as above, the problem described hereinbefore becomes more noticeable. More specifically, as described above, generally, both a character portion and a decorative portion of a decorated character image are desired to be made conspicuous against the background of the character image, and actually, such a color arrangement is usually carried out. In such cases, however, if a decorated character image having a higher resolution is output (limited-color output) in a manner simply adapted to a lower resolution of a lower resolution output device without further processing, that is, if each decorated character image in the above example is subjected to preview printing as it is without further processing, the character portion and the decorative portion thereof which have been distinguished by the resolution high enough to express colors are caused to have an identical color or a similar color (identical or similar gray tones, in this example) to each other. Thus, one or more boundaries dividing the plurality of image elements can not be discerned, thereby making it impossible to identify the output image. For instance, if a decorated character image having colors arranged as above is subjected to preview printing to form a monochrome character image having the same number of gradation values (256 gradation levels) as described above with reference to FIGS. 16 and 17, e.g. a print image as shown in FIG. 18 is obtained, in which it is difficult to distinguish the character portions PC1 (B3), PC2 (B3) and the decorative portions PD2 (I1), PD3 (I1) from each other.

Figure 19:
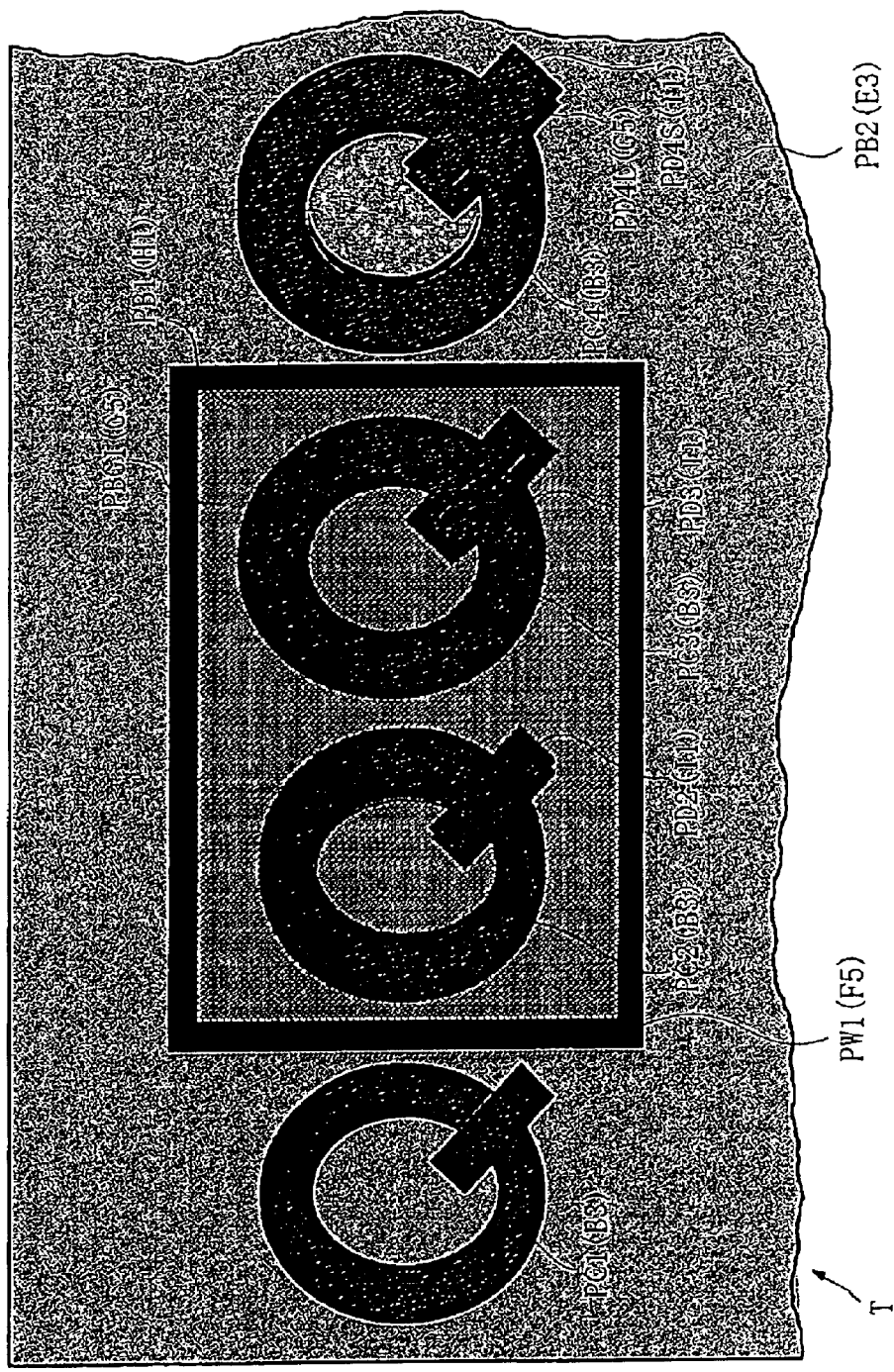
FIG. 19 is a diagram similar to FIG. 18, which is useful in explaining an example of a result of printing of a decorated color character image, which is formed by changing a decorative color of the FIG. 9 decorated color character image to a color conspicuous against a background color thereof, by the FIG. 16 color-limiting printing method.

Further, for instance, in the case described above with reference to FIG. 9, if the decorative color is changed from the color "K3" (light gray color) to the color "I1" (light blue color), as described hereinbefore, and further the color (decorative color) set for the decorative portion (character outline portion) PD4L and the color (background pattern color) set for the background pattern portion PBG1 are changed from the color "G3" (green color) to the color "G5" (dark green color), the decorative portion PD4L and the background pattern portion PBG1 as well are made more conspicuous against the background portion PB2 (E3) and the background portion PB1 (H1), and at the same time even when the above color arrangement is effected, resolutions high enough for expressing colors enable the character portions, the decorative portions and the background pattern portion to be positively distinguished from each other. However, if the decorated character image having the above portions is subjected to limited-color output in a manner simply adapted to the lower resolution of a lower resolution output device without further processing, it becomes difficult to distinguish the portions from each other. For instance, if the decorated character image having colors arranged as above is subjected to the same preview printing as described hereinabove, for instance, a print image as shown in FIG. 19 is obtained, in which it is difficult to distinguish the character portion PC1 (B3) and the decorative portion PD4L (G5) from each other in addition to indistinguishable portions of the example illustrated in FIG. 18.

Actually, the above problem as well can be solved by employing the same image processing method as described hereinabove in the description of the first embodiment. In the tape printing apparatus 1 of the second embodiment, also in cases where preview printing produces a print image whose character portions and decorative portions are difficult to distinguish from each other, the transparent character color-setting method and the background pattern deletion-setting method (described above in the description of the first embodiment) which are selectively set by operating the format key are employed.

As described above in the description of the first embodiment, depending on the type of character decoration, a decorated character image sometimes has a more excellent appearance when a character portion is assimilated with a background, that is, only a decorative portion is made conspicuous against the background than when both of the character portion and the decorative portion are made conspicuous. Therefore, when the transparent character color-setting method is set, and if preview printing of a print image would produce a preview print image whose character portion and decorative portion are difficult to distinguish from each other, the tape printing apparatus 1 sets a transparent color designated as a default color to the character color.

Figure 20:
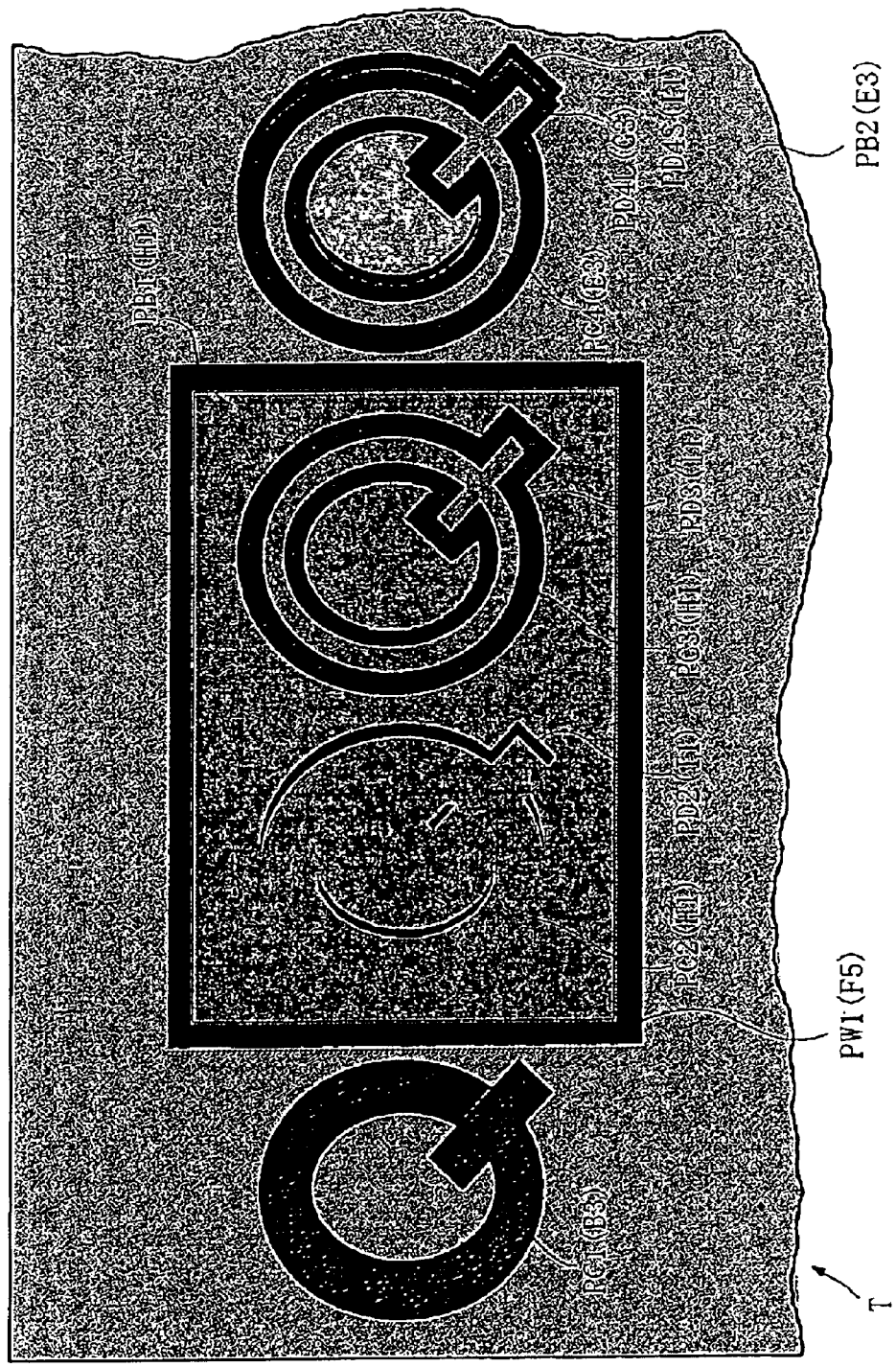
FIG. 20 is a diagram showing an example of a result of printing of a decorated color character image, which is formed by executing the FIG. 13 character color-transparentizing processing on the FIG. 18 decorated color character image, by the FIG. 16 color-limiting printing method.

When the preview print key is depressed by the user, if the print image as described above with reference to FIG. 18 is obtained as a result of printing of a decorated character image without further processing, the color (character color) set for the character portions PC2, PC3 is changed to the color "H1" (aqua color) for assimilating the character portions PC2, PC3 with the background portion PB1, whereby an output image is formed and output (i.e. monochrome preview printing is carried out), so that a printed image as viewed in FIG. 20, for instance, can be obtained. In this case, as shown in the figure, the character portions PC2, PC3 can be assimilated with the background portion PB1, thereby making the decorative portions PD2, PD3 more conspicuous. Further, as in this case, if the resulting decorative portions clearly show deletion of character portions corresponding thereto, it is also possible to implicitly emphasize (make potentially conspicuous) the existence of the invisible character portions. Further, this prevents the character portions and the decorative portions from having an identical color or similar colors (identical or similar gray tones, in this example), so that color arrangement can be effected such that the character portions and the decorative portions are made readily distinguishable from each other. Although in this example, the character portion PC4 outside the frame is also subjected to the character color-transparentizing processing, the transparentizing processing on the character portion PC4 may be omitted, since the total (256) of gradation values in this case makes the character portions and the decorative portions distinguishable from each other, similarly to the illustrated example of FIG. 18 (here, an example in which the character portions are transparentized is shown for purposes of ease of comparison with the case in which the total of gradation values is extremely small, referred to hereinbelow).

As described in the description of the first embodiment, the background pattern deletion-setting method is applied only to a portion whose background is subjected to background pattern printing, while to the other portions is applied the default transparent character color-setting method. In general, when the image of a background is a background pattern image which has a background pattern of a predetermined color on an achromatic or unicolored plain image, omission (deletion) of a character portion or a decorative portion therefrom sometimes provides a conspicuous achromatic or unicolored portion. Depending on the pattern of the background pattern image, if a character portion or a decorative portion is omitted (deleted), and a background pattern portion supposed to exist thereunder also disappears, only the color of the basic plain image is left to make conspicuous the resulting portion of this color. For instance, when the preview print key is depressed by the user, if printing of a decorated character image without further processing produces the print image as described above with reference to FIG. 19, the background pattern deletion-setting method is applied to a portion whose background is subjected to background pattern printing, that is, in this example, to the image portions of the character portions PC2, PC3, whose background is the in-frame portion PB1 (H1) with the background pattern portion PBG1 (G3) depicted thereon, while to the other portions is applied the default transparent character color-setting method. This produces a print image as shown in FIG. 21 or 22.

Figure 21:
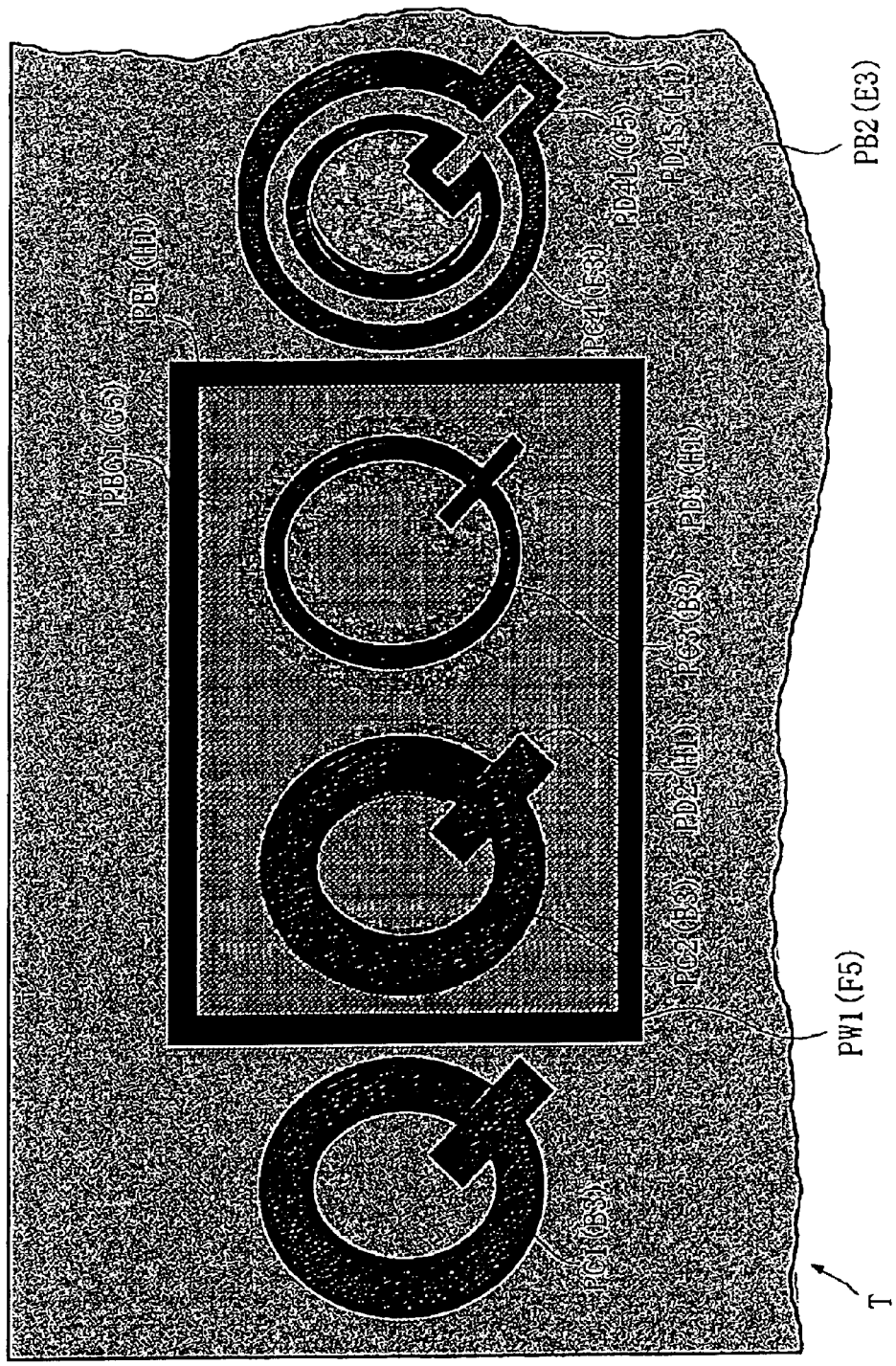
FIG. 21 is a diagram showing an example of a result of printing of a decorated color character image, which is formed by executing the FIG. 14 background pattern deletion processing on decorative portions of the FIG. 19 decorated color character image, by the FIG. 16 color-limiting printing method.
Figure 22:
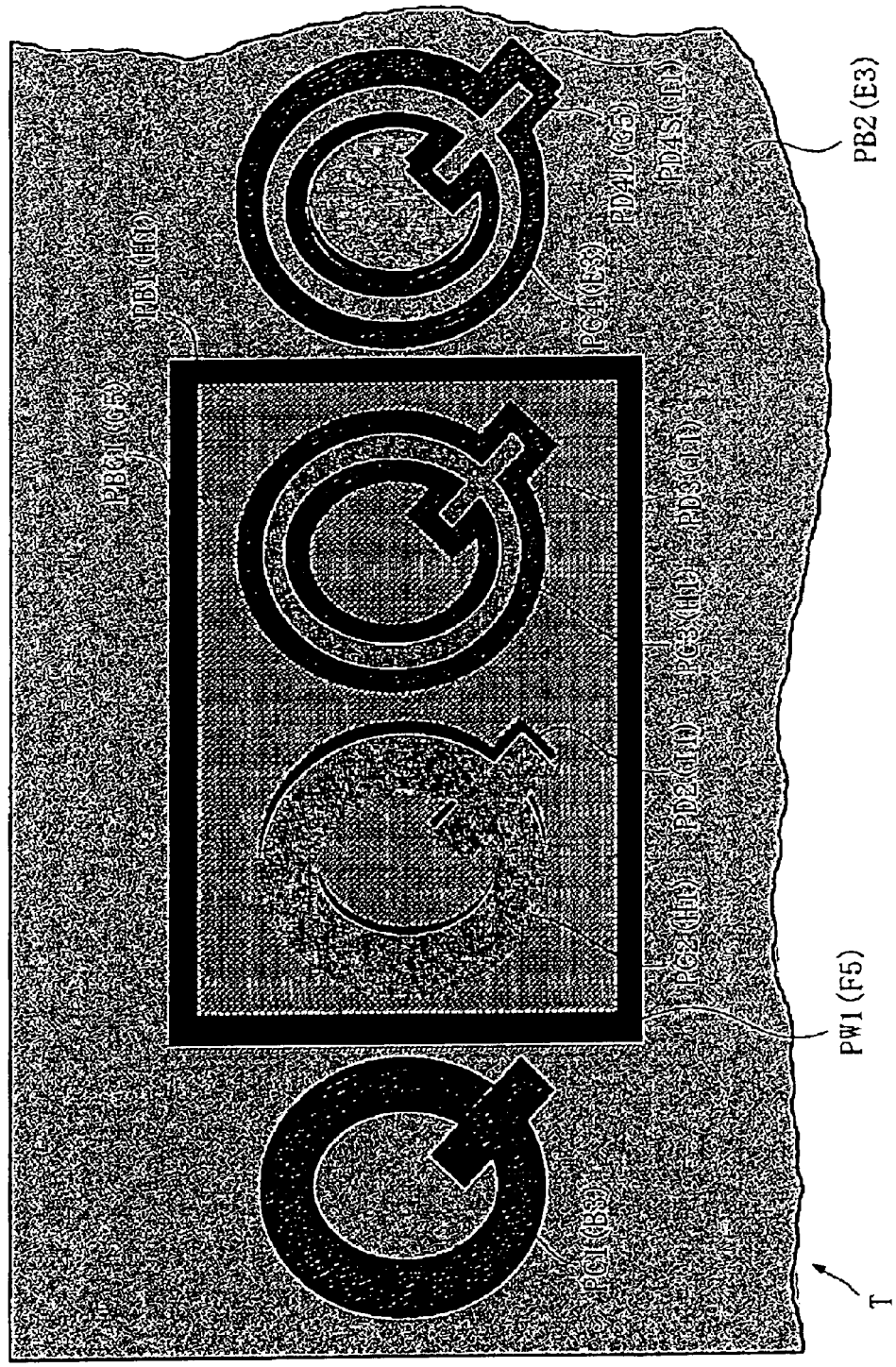
FIG. 22 is a diagram similar to FIG. 21, which is useful in explaining an example of a result of printing of a decorated color character image, which is formed by executing the FIG. 14 background pattern deletion processing on character portions of the FIG. 19 decorated color character image, by the FIG. 16 color-limiting printing method.

In the above cases, as shown in the figures, within the frame, a default color, which is set to a color identical to the color "H1" (aqua color) set for the in-frame portion PB1 (background portion within the frame) of the plain image, is set to one of the character color and the decorative color (i.e. set to the decorative color in FIG. 21, and set to the character color in FIG. 22). Hence, it is possible to make one of the character portions and the decorative portions (the decorative portions PD2, PD3 in FIG. 21, and the character portions PC2, PC3 in FIG. 22) conspicuous against the color identical to the color of the plain image, and the other (the character portions PC2, PC3 in FIG. 21, and the decorative portions PD2. PD3 in FIG. 22) conspicuous against a color set beforehand. As a result, since the character portions and the decorative portions are prevented from having an identical color or similar colors (identical or similar gray tones, in this example) to each other, colors can be arranged such that the character portions and the decorative portions are made readily distinguishable from each other. Further, similarly to the first embodiment, when the background pattern deletion-setting method has been set, which of the character portions and the decorative portions should be caused to have a default color (i.e. the color of the plain image) may be determined beforehand, or it may be selected on a selection screen hierarchically immediately under the option of the background pattern deletion-setting method when the method is set.

Further, to a portion outside the frame whose background is not subjected to background pattern printing, the default transparent character color-setting method is applied, so that the character portion PC4 can be assimilated with the background portion PB2, thereby making the decorative portions PD4L, PD4S more conspicuous. Further, similarly to this case, if the resulting decorative portions clearly show deletion of character portions corresponding thereto, it is also possible to implicitly emphasize (make potentially conspicuous) the existence of the invisible character portions. Further, this prevents the character portion and the decorative portion from having an identical color or similar colors (identical or similar gray tones, in this example), so that they can be made readily distinguishable from each other.

As described above, in the tape printing apparatus 1 of the present embodiment, by operation of the preview print key, it is possible to carry out preview printing for printing a decorated color character image as a monochrome image. In other words, according to the tape printing apparatus 1, a color-limiting mode for effecting limited-color output can be set by operating the preview print key, and when the color-limiting mode is set, colors set for character portions and decorative portions are changed, so that the apparatus 1 can be applied to a case in which a decorated character image prepared (formed) to have a higher resolution (as a color image, for instance) is desired to be output intentionally as an output image having a lower resolution (monochrome image, for instance).

Although in the above example, the case in which a decorated color character image is printed as a monochrome image has been described by way of the most easily understandable example, this is not limitative, but if the same image processing method as described above is employed, it is possible to cope with a problem of the same kind which occurs also when a decorated color character image having multiple gradation values (having a higher resolution) is output as a color output image having a smaller number of gradation values (having a lower resolution), or when a decorated monochrome character image having a higher resolution is output as a monochrome output image having a smaller number of gradation values (having a lower resolution). In other words, the character color-transparentizing processing and the background pattern deletion processing, described hereinabove, enables the user to cope with a lot of cases in which, if a decorated character image whose colors are arranged based on a higher resolution is output for limited-color output in a manner simply adapted to the lower resolution of a lower resolution output device without further processing, the portions (image elements: e.g. character portions and decorative portions) of the decorated character image which can be originally distinguished by the higher resolution are caused to have an identical color or similar colors, and one or more boundaries dividing the image elements can become indiscernible, thereby making it impossible to identify the output image.

Now, it is difficult to represent in drawings examples of decorated color character images having multiple gradation values and corresponding color output images having a smaller number of gradation values, and further in such a case each of basic colors (e.g. CMYK) is required to be described, making the description troublesome. Therefore, hereinafter, for purposes of simplicity, only the case will be described in which a decorated monochrome character image having multiple gradation values is output as a monochrome output image having a smaller number of gradation values. Here, it is additionally noted that the same principle applies to the case of a color output image being output and the color output image can be processed by the same image processing method. Further, it is expected from the above description that if one of a case in which the transparent character color-setting method is employed and a case in which the background pattern deletion-setting method is employed (a case in which the character color-transparentizing processing is carried out and a case in which the background pattern deletion-processing is carried out) is explained, the other can be known by analogy, so that in the following, only the more basic case (hence corresponding to a default setting of the apparatus) in which the transparent character color-setting method is employed (the case in which the character color-transparentizing processing is carried out) will be described.

Figure 16:
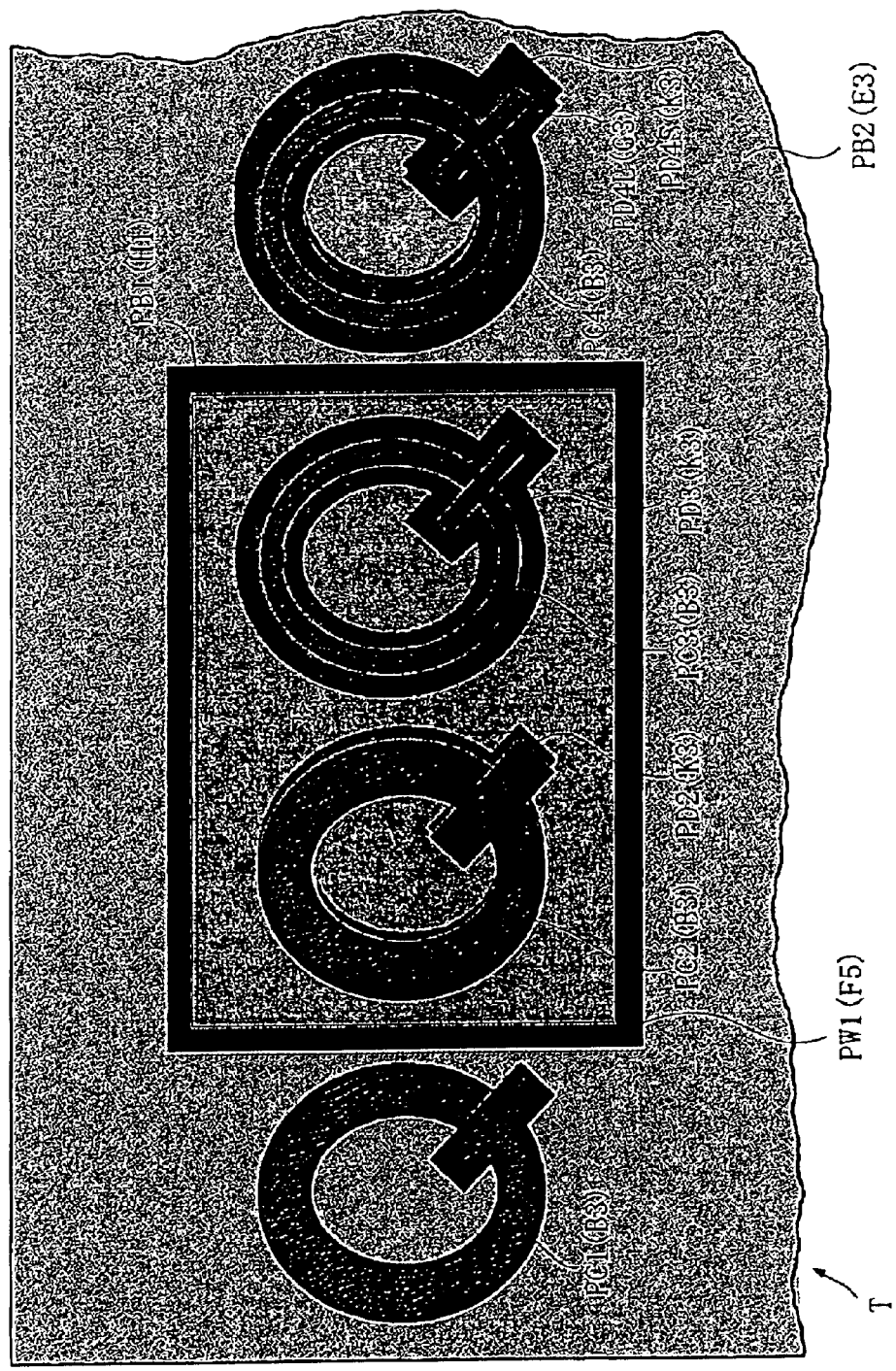
FIG. 16 is a diagram showing an example of a result of printing of the FIG. 8 decorated color character image by a color-limiting printing method in which 256-gradation monochrome preview printing is carried out on a tape.
Figure 23:
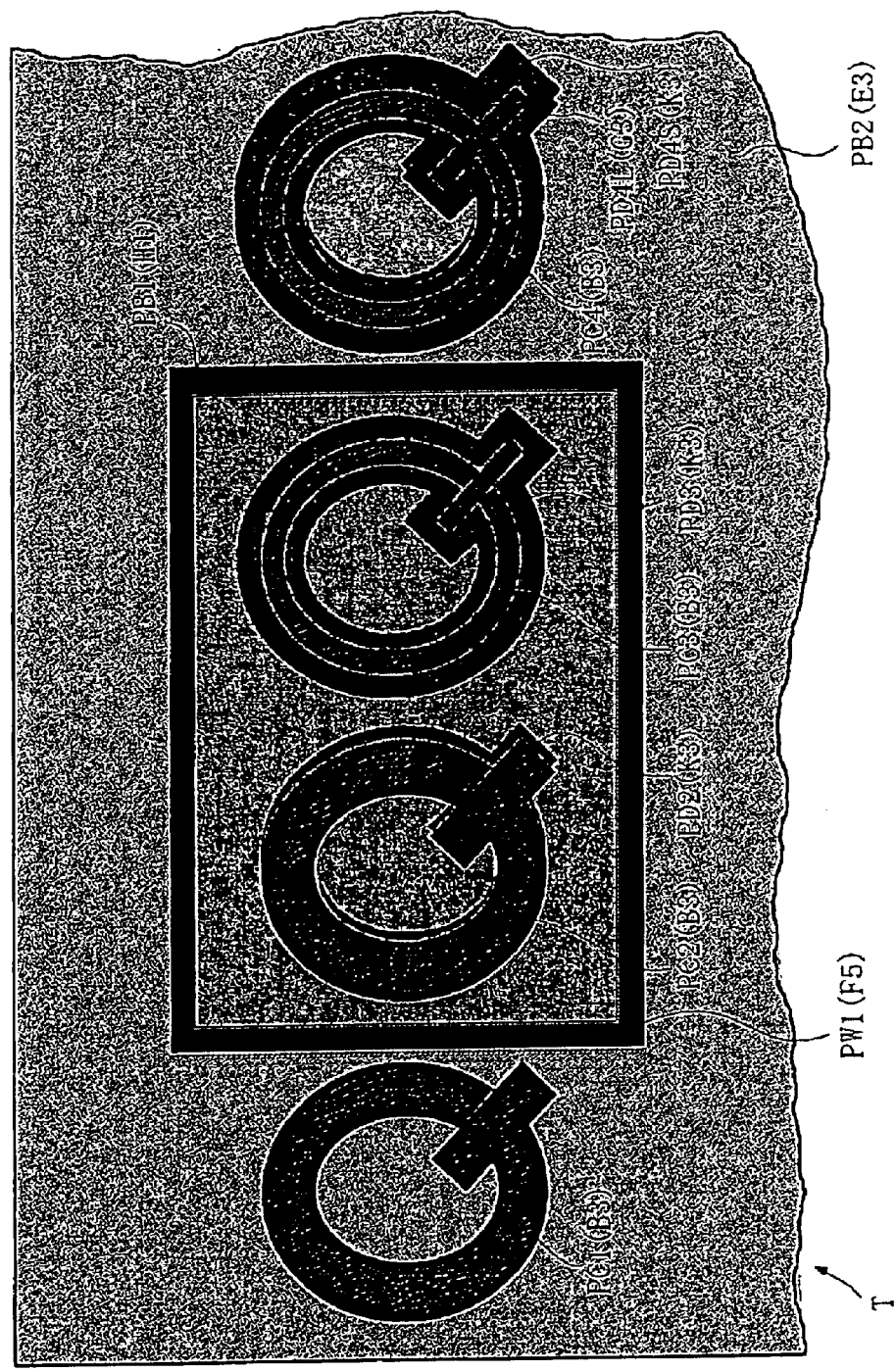
FIG. 23 is a diagram showing an example of a result of printing of the FIG. 8 decorated color character image, or the FIG. 16 decorated monochrome character image with 256 gradation levels, by a color-limiting printing method in which 16-gradation monochrome preview printing is carried out on a tape.
Figure 24:
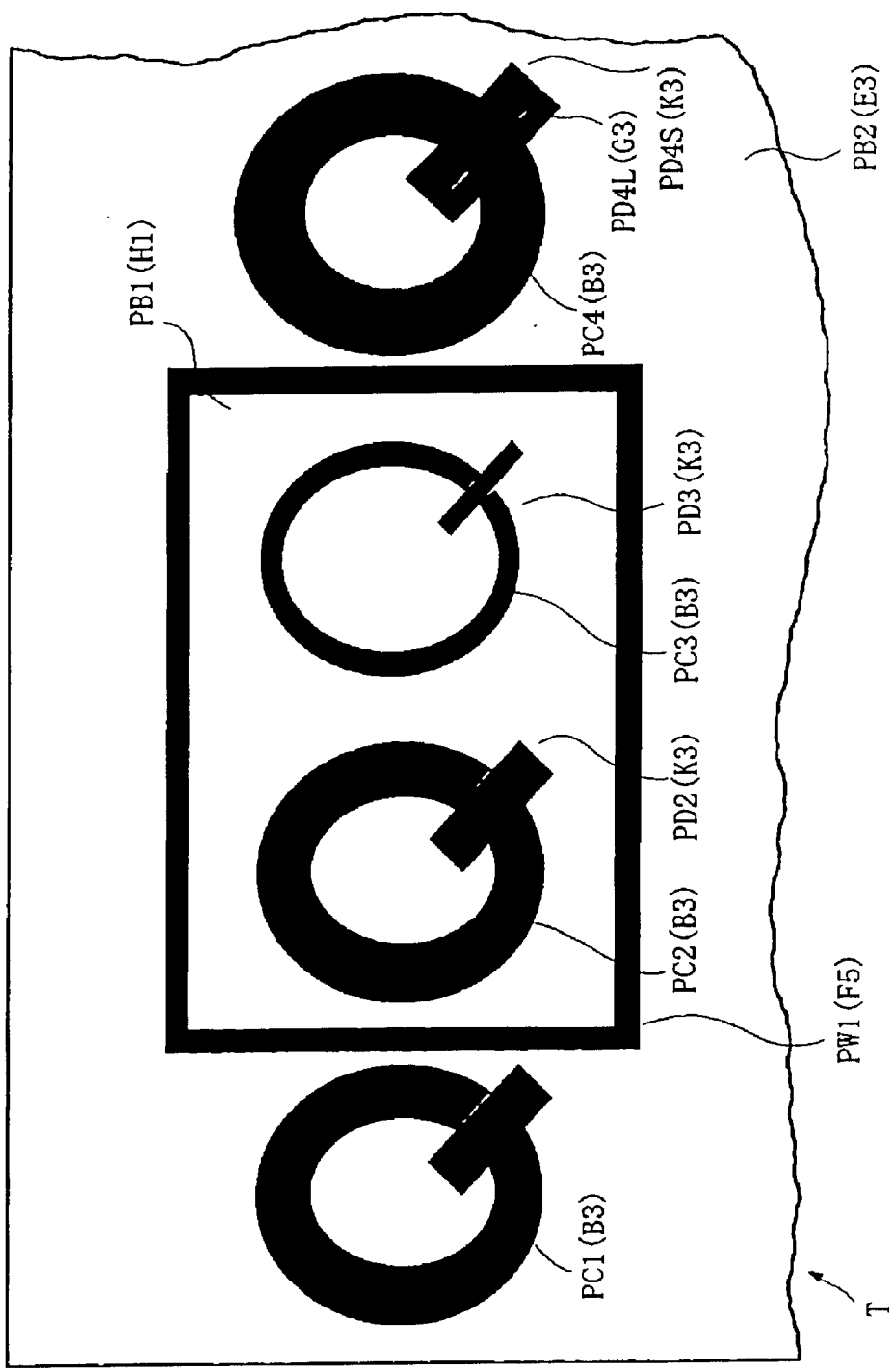
FIG. 24 is a diagram similar to FIG. 23, which is useful in explaining an example of a result of printing of the FIG. 8 decorated color character image, or the FIG. 16 decorated monochrome character image with 256 gradation levels, by a color-limiting printing method in which 2-gradation monochrome preview printing is carried out on a tape.

As described hereinbefore, FIG. 16 and the like illustrate examples of monochrome prints with 256 gradation levels. Hereinafter, the decorated character image prepared for obtaining the print images of these examples is referred to as the above-mentioned decorated monochrome character image having multiple gradation values. When the decorated character image is formed (colored) which will produce the print image shown in FIG. 16 if printed without further processing, is subjected to the limited-color output e.g. as a monochrome output image with 16 gradation levels, that is, when the decorated character image is subjected to the color-limiting processing, a print image shown in FIG. 23 is obtained. In this example, although it becomes difficult to some extent to identify the image, it is possible, as shown in the figure, to identify the output image which is originally not composed of so many colors. However, when the same FIG. 16 decorated monochrome character image with 256 gradation levels is converted to a monochrome output image with still smaller gradation values, that is, a monochrome output image with two gradation levels, for limited-color output (color-limiting printing) of the same, a print image shown in FIG. 24 is obtained.

In the above case, the color "G3" (green color) as a color (decorative color) set for the decorative portion PD4L, which is originally more conservative than the character color "B3" (red color) but more conspicuous than the other decorative color "K3" (light gray color), is represented in black similarly to the character color "B3", which makes it impossible to distinguish the character portion PC4 and the decorative portion PD4L from each other. Further, the color (decorative color) of the decorative portions PD2, PD3 other than PD4L is represented in white, which causes the decorative portions PD2, PD3 to melt in (assimilate with) the background which also white in color, and disappear from the image.

Figure 25:
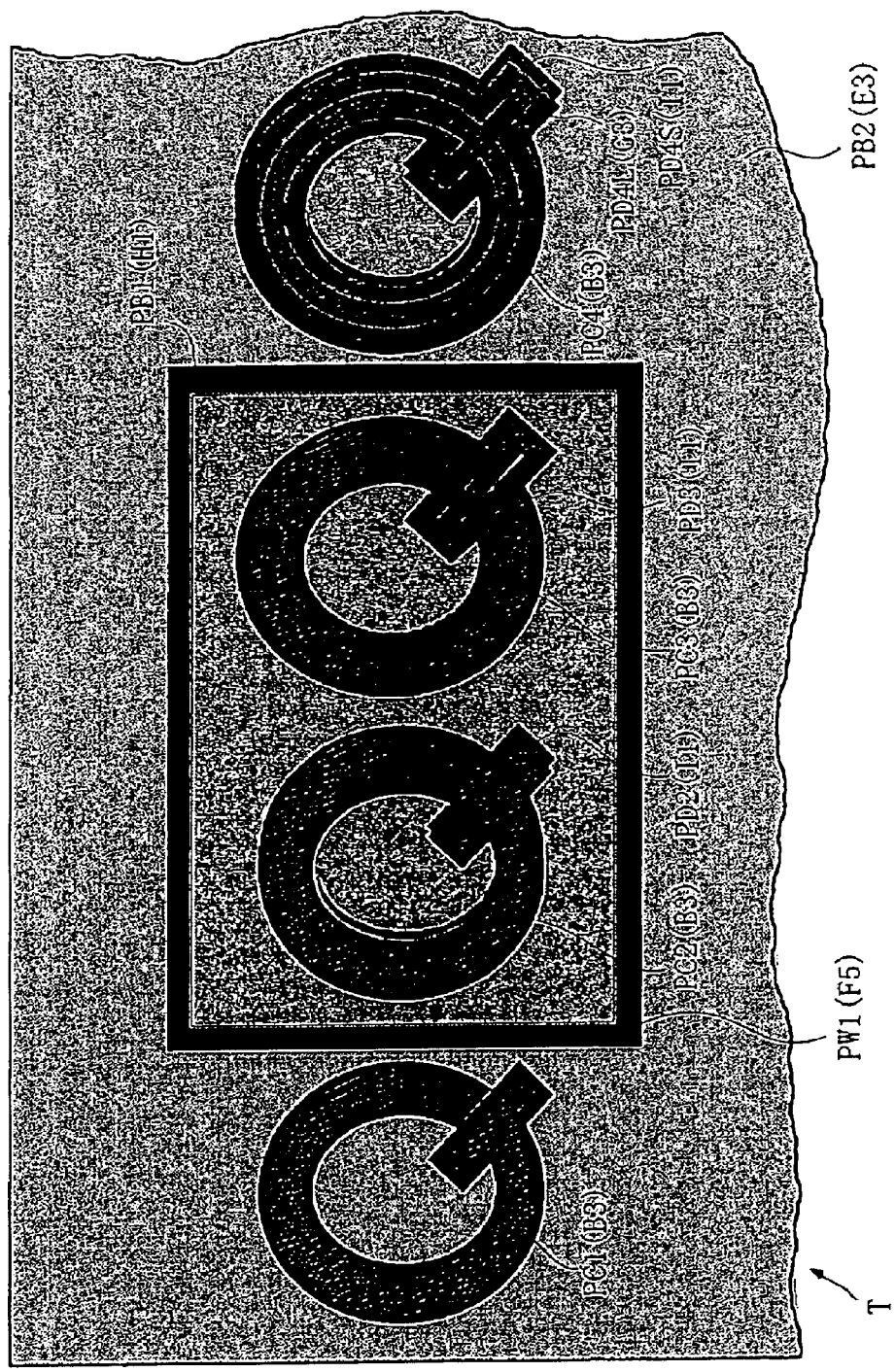
FIG. 25 is a diagram showing an example of a result of printing of the FIG. 18 decorated monochrome character image with 256 gradation levels, by carrying out the FIG. 16-gradation monochrome preview printing on a tape.
Figure 26:
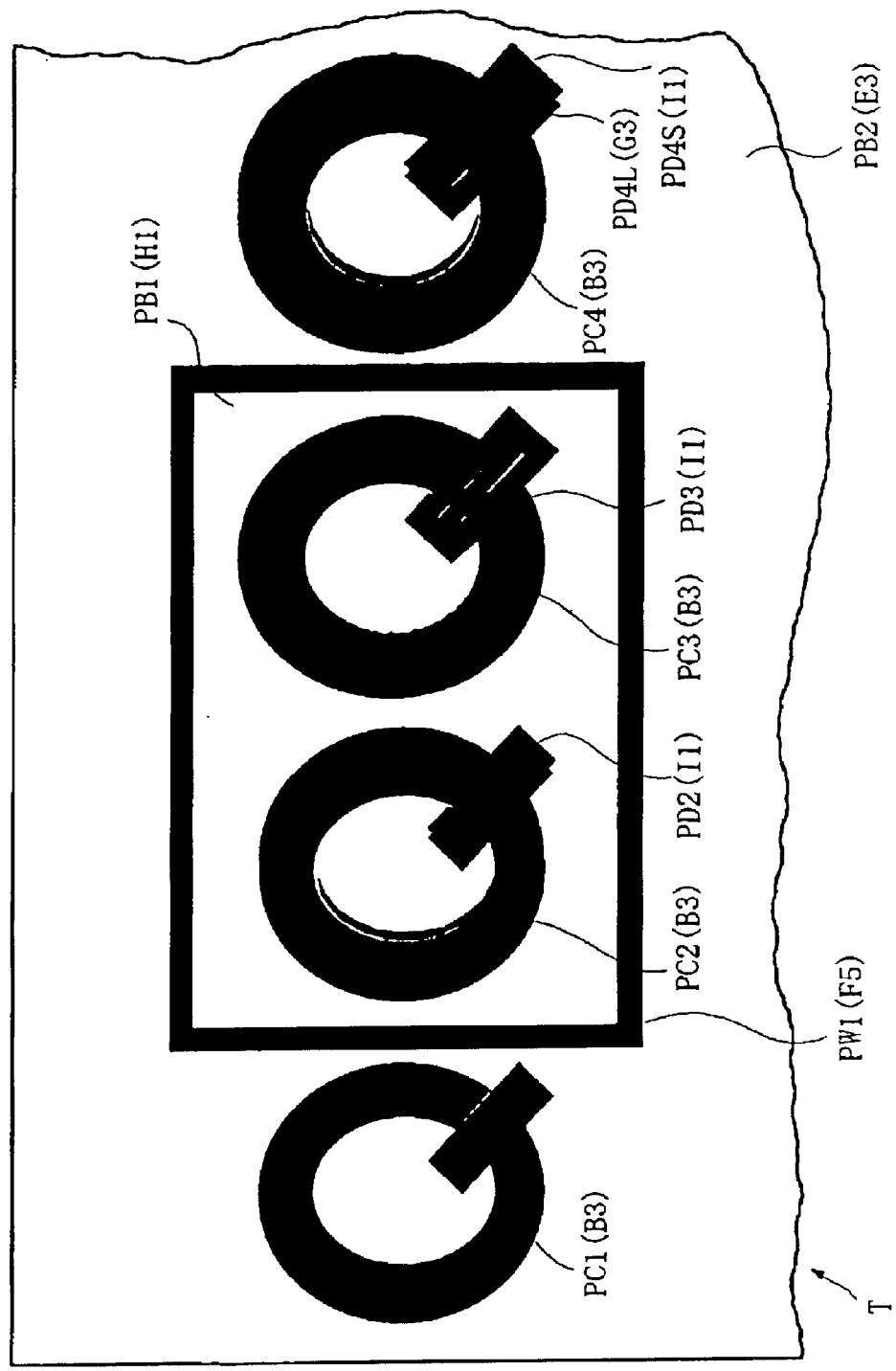
FIG. 26 is a diagram similar to FIG. 25, which is useful in explaining an example of a result of printing of the FIG. 18 decorated monochrome character image with 256 gradation levels, by carrying out the FIG. 24 2-gradation monochrome preview printing on a tape.

As described above, the color (decorative color) set for the decorative portions PD2, PD3, PD4S of the (FIG. 8) color image, which is the original color image of the FIG. 16 decorated character image, is changed from the color "K3" (light gray color) to a more conspicuous color "I1". (bright blue color), and the resulting color image is formed into the FIG. 18 decorated monochrome character image with 256 gradation levels. If this image is subjected to limited-color output (color-limiting printing) as a monochrome output image with 16 gradation levels, a print image as shown in FIG. 25 is obtained. Further, if the FIG. 25 decorated monochrome character image is subjected to limited-color output (color-limiting printing) as a monochrome output image with still smaller gradation values, that is, as a monochrome output image with two gradation levels, a print image as shown in FIG. 26 is obtained. For instance, in the case of the FIG. 25 monochrome output image with 16 gradation levels, the character portions PC2, PC3 within the frame and the decorative portions PD2, PD3 become unable to be distinguished from each other. In the case of the FIG. 26 monochrome output image with two gradation levels, the decorative portion PD4L is also printed in black, so that the character portion PC4, the decorative portion PD4L, and the decorative portion PD4S are assimilated with each other, which makes it impossible to distinguish them from each other.

Figure 27:
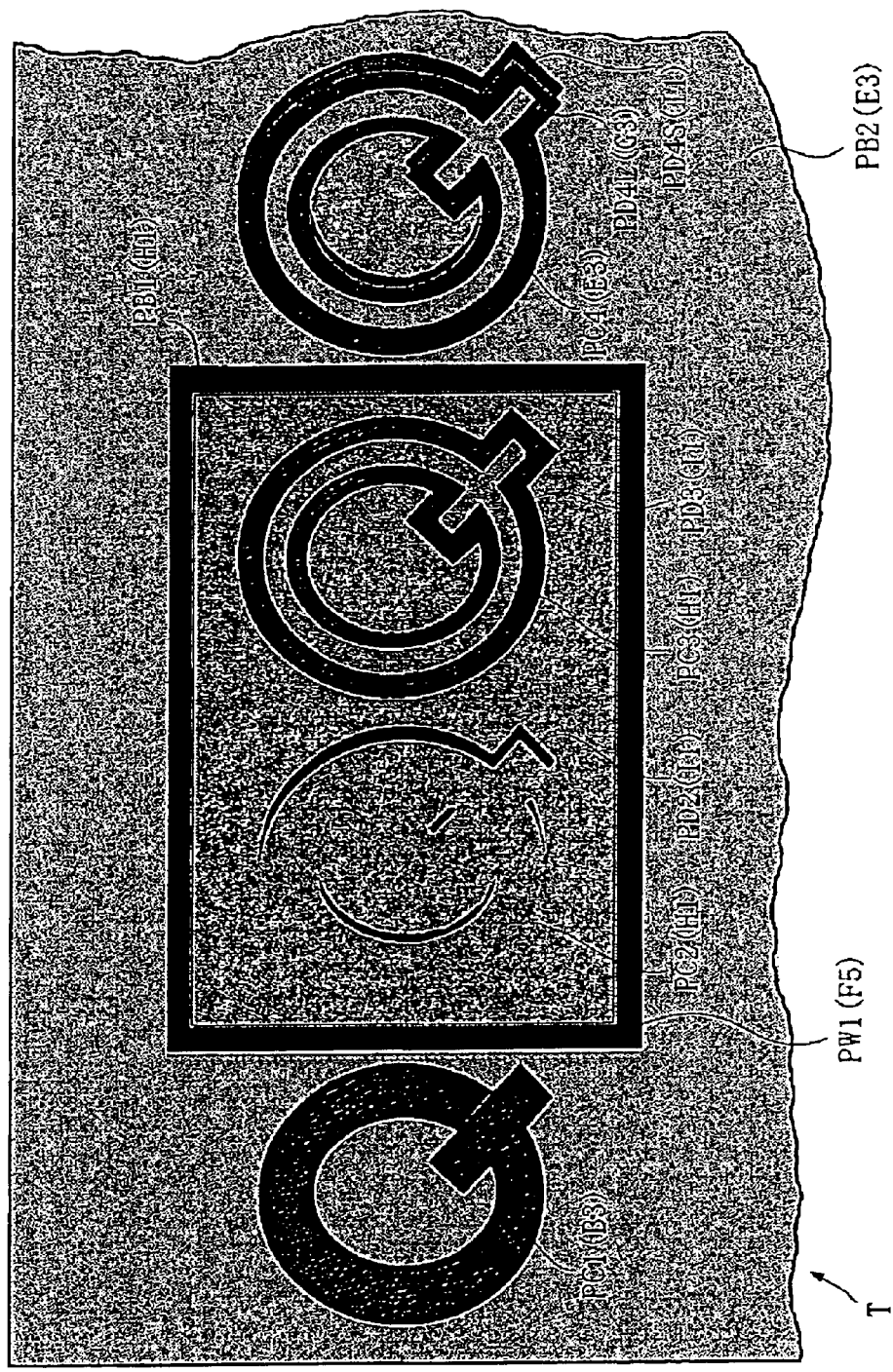
FIG. 27 is a diagram showing an example of a result of printing of the decorated color character image without a background pattern, which has been subjected to the FIG. 13 character color-transparentizing processing, by carrying out the FIG. 25 monochrome preview printing.

However, the above-mentioned character color-transparentizing processing makes it possible to cope with the latter case, that is, the case in which the print images as shown in FIGS. 25, 26 are obtained if the decorated character images are output (printed) without further processing. More specifically, when the preview print key is depressed by the user, if printing of a decorated character image without further processing produces such a print image as described above with reference to FIG. 25, the character color-transparentizing processing changes the color (character color) set for the character portions PC2, PC3 to the color "H1" (aqua color) to assimilate the character portions PC2, PC3 with the background portion PB1, to thereby form an output image which is output (i.e. subjected to monochrome preview printing of 16 gradation level). This produces, for instance, a print image as shown in FIG. 27. In this case, the character portions PC2, PC3 are assimilated with the background portion PB1, thereby making it possible to make the decorative portions PD2, PD3 more conspicuous. Further, similarly to this case, if the resulting decorative portions clearly show deletion of character portions corresponding thereto, it is also possible to implicitly emphasize (make potentially conspicuous) the existence of the invisible character portions. Further, this prevents the character portions and the decorative portions from having an identical color or similar colors (identical or similar gray tones, in this example), so that color arrangement can be effected such that the character portions and the decorative portions are made readily distinguishable from each other. It should be noted that although in this example as well, the character portion PC4 outside the frame is subjected to the character color-transparentizing processing, the transparentizing processing on the character portion PC4 may be omitted, since the character portion PC4, the decorative portion PD4L, and the decorative portion PD4S can be distinguished from each other.

Figure 28:
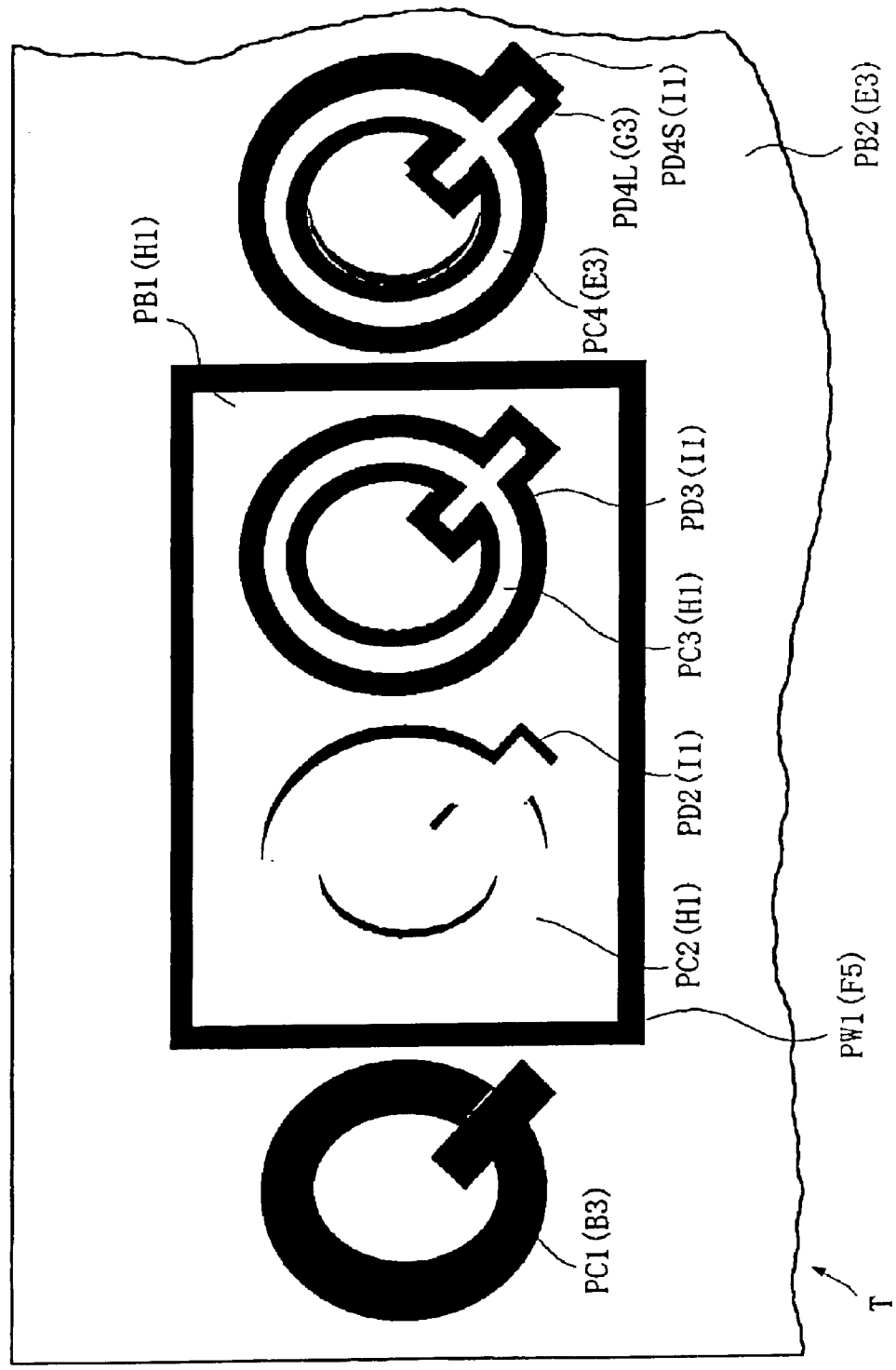
FIG. 28 is a diagram showing an example of a result of printing of the decorated color character image without a background pattern, which has been subjected to the FIG. 13 character color-transparentizing processing, by carrying out the FIG. 26 monochrome preview printing.

Similarly, when the preview print key is depressed by the user, if printing of a decorated character image without further processing produces such a print image as described above with reference to FIG. 26, the character color-transparentizing processing changes the color (character color) set for the character portions PC2, PC3 to the color "H1" (aqua color) to assimilate the character portions PC2, PC3 with the background portion PB1, and the color (character color) set for the character portion PC4 to the color "E3" (yellow color) to assimilate the character portion PC4 with the background portion PB2, to thereby form an output image which is output (i.e. subjected to monochrome preview printing of 2 gradation level). This provides, for instance, a print image as shown in FIG. 28. In this case, the character portions PC2, PC3 are assimilated with the background portion PB1, thereby making it possible to make the decorative portions PD2, PD3 more conspicuous, and at the same time the character portion PC4 is assimilate with the background portion PB1, thereby making it possible to make the decorative portions PD4L, PD4S more conspicuous. Further, similarly to this case, if the resulting decorative portions clearly show deletion of character portions corresponding thereto, it is also possible to implicitly emphasize (make potentially conspicuous) the existence of the invisible character portions. Further, this prevents, the character portions and the decorative portions from having an identical color or similar colors (identical or similar gray tones, in this example), so that color arrangement can be effected such that the character portions and the decorative portions are made readily distinguishable from each other.

As described hereinabove, in the image processing method employed in the tape printing apparatus 1 of the present embodiment, when a decorated character image is formed which has a character portion, a decorative portion, and a background portion as a portion of a background on which the decoration character image is formed, exclusive of the character portion and the decorative portion, with a color being set for the character portion as a character color, and a color being set for the decorative portion as a decorative color, and output at a lower resolution than the resolution thereof, by limited-color output, the colors set for the decorated character image are changed to colors permitting the limited-color output. That is, when a decorated character image is subjected to the limited color output, the colors are adapted thereto (the colors are subjected to the color-limiting processing), thereby making it possible to carry out the limited-color output of the decorated character image.

However, when it is difficult to distinguish the character portion and the decorative portion from each other, depending on the combination of a character color and a decorative color determined, one of the character color and the decorative color is changed to a predetermined default color. More specifically, if it is difficult to distinguish the character portion and the decorative portion from each other, depending on a combination of a character color and a decorative color which are initially set when limited-color output is not effected, or depending on a combination of the colors of the character portion and the decorative portion, which are changed so as to be adapted to the limited-color output when limited-color output is carried out, one of the character color and the decorative color is changed to a predetermined default color. This makes it possible to prevent the character portion and the decorative portion from becoming difficult to discriminate from each other irrespective of whether limited-color output is performed.

Further, when at least one of the character color and the decorative color is changed, the resulting colors are newly arranged , whereby an output image is prepared based 1on the decorated character image, whereas when the character color and the decorative color are not changed, the decorated character image is set to an output image. In other words, when limited-color output is performed, or when it is difficult to distinguish the character portion and the decorative portion from each other depending on colors set therefor, at least one of the character color and the decorative color can be changed to a suitable one. If the change in color is effected, an output image is prepared based on new settings of colors, whereas if the change in color is not effected, the decorated character image is prepared as an output image, so that it is possible to prepare the output image such that it has a suitable color arrangement. Therefore, according to the tape printing apparatus 1 of the present embodiment, when a decorated character image, which is formed by arranging at least one decorated character formed by providing a desired character decoration on an arbitrary background, with a character color being set to a character portion corresponding to the at least one arbitrary character and a decorative color being set to a decorative portion corresponding to a portion formed by the desired character decoration, is output as an output image, it is possible to output the output image formed such that the character portion and the decorative portion have suitable colors readily distinguishable from each other. Further, even when limited-color output is carried out, similarly, it is possible to output the output image formed such that the character portion and the decorative portion have suitable colors readily distinguishable from each other.

Further, also in the tape printing apparatus 1 of the present embodiment, the arbitrary character decoration includes the shading decoration for forming a shaded character of an arbitrary character, and hence when a decorated character image is formed by the shading decoration, it is possible to form a decorated character image having a character-shading portion as a decorative portion with a character portion and the decorative portion set to such suitable colors as make these portions readily distinguishable from each other. Similarly, the arbitrary character decoration includes the character-outlining decoration for forming an outlined character of an arbitrary character, and hence when a decorated character image is formed by the character-outlining decoration and output, it is possible to output an output image having a character-outlining portion as a decorative portion with a character portion and the decorative portion set to such suitable colors as make these portions readily distinguishable from each other. Further, the arbitrary character decoration includes the character-outlining/shading decoration for forming an outlined and shaded character of an arbitrary character, and hence when a decorated character image is formed by the character-outlining/shading decoration and output, it is possible to output an output image having a character-outlining/shading portion as a decorative portion with a character portion and the decorative portion set to such suitable colors as make these portions readily distinguishable from each other.

Further, although examples of the enclosing decoration and the half-tone dot shading decoration have not been given similarly to the description thereof in the first embodiment, they can be employed similarly to the above decoration methods. In the enclosing decoration and the half-tone dot shading decoration, the character portion of a decorated character results in a portion enclosed by a decorative portion of the decorated character, so that similarly to the case of the character-outlining decoration, if the character portion is made transparent or caused to have the same color as that of a plain image left behind after deleting the background pattern of the background of the decorated character, the result is that both of the character portion and the decorative portion are made conspicuous. Further, when the background of the decorated character has a background pattern, if the decorative portion enclosing the character portion is caused to have the same color as that of the plain image, both of the character portion and the decorative portion can be made conspicuous. Further, particularly in the case of the enclosing decoration, since an enclosing line color and the color of an enclosed portion can be set or configured, it is possible to employ a method of setting the color of the enclosed portion to a transparent color or to the same color as that of the plain image. Further, similarly, in the case of the character-outlining/shading decoration as well, a method of setting an outline color to a transparent color or to the same color as that of the plain image can also be employed, since the outline color and a shade color can be set or configured.

It should be noted that in the above case in which an output image is formed based on the FIG. 16 decorated character image for limited-color output, as is clearly understood from FIGS. 23, 24, the character portions and the decorative portions can not have colors readily distinguishable from each other simply by carrying out the character color-transparentizing processing. In such a case, a color arrangement may carried out in advance such that the decorative portions are made conspicuous against the background portion e.g. to form the FIG. 18 decorated character image, thereafter performing the character color-transparentizing processing. Further, although in the above description, the FIG. 16 decorative character image is used for describing the examples of forming a monochrome image with 256 gradation levels into output an image with sixteen or two gradation levels for limited-color output, the FIG. 16 decorated character image is originally formed from the color image described above with reference to FIG. 8, so that similarly, a decorated color character image represented in the CMYK colors as a color image with 256 gradation levels per color can also be directly output as a monochrome image with two gradation levels by limited-color output.

Further, if the decorative color set for the decorative portions of the FIG. 8 color image is changed to a color conspicuous against the background color to form an output image, and then the output image formed is subjected to monochrome preview printing, the FIG. 18 decorated character image is obtained, and hence the above-mentioned color-setting processing for making the decorative portions conspicuous against the background portion can be effected by automating the same color-setting processing as carried out on the FIG. 8 color image. This color-setting processing also meets the general requirement of making decorative portions as well conspicuous against a background portion. Further, the color-setting processing can be regarded identical to the image processing method of the first embodiment, if a default color set by the automated color-setting processing is regarded as a first default color, and a transparent color set by the character color-transparentizing processing for a limited-color output is regarded as a second default color. Although in the above description, only the character color-transparentizing processing is explained, this is not limitative, but as described above, the same applies to the background pattern deletion processing.

Figure 29:
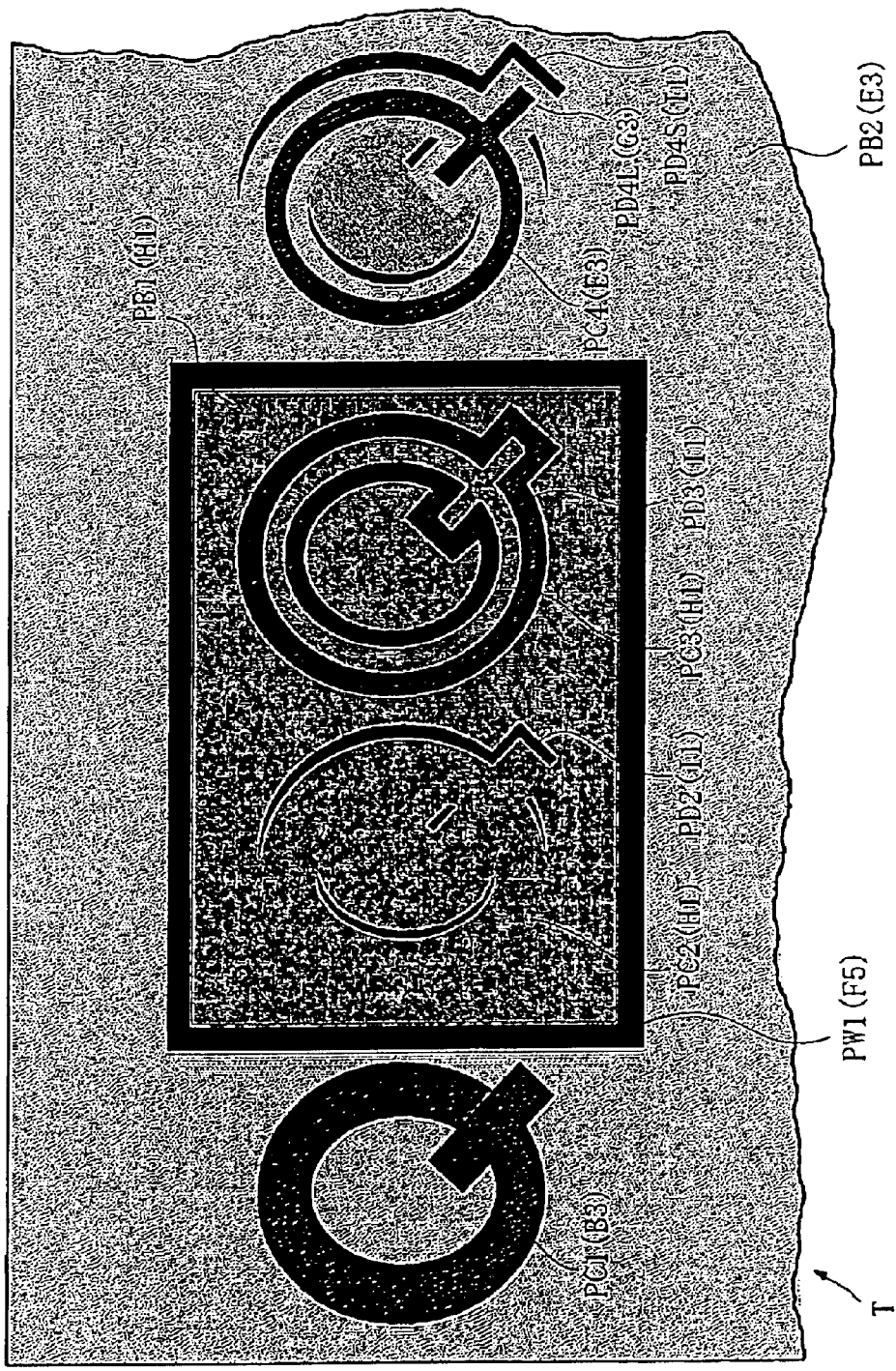
FIG. 29 is a diagram similar to FIG. 27, which is useful in explaining an example of a result of printing of the decorated color character image without a background pattern, which has been subjected to color-changing processing other than the FIG. 27 character color-transparentizing processing, by carrying out the FIG. 25 monochrome preview printing.
Figure 30:
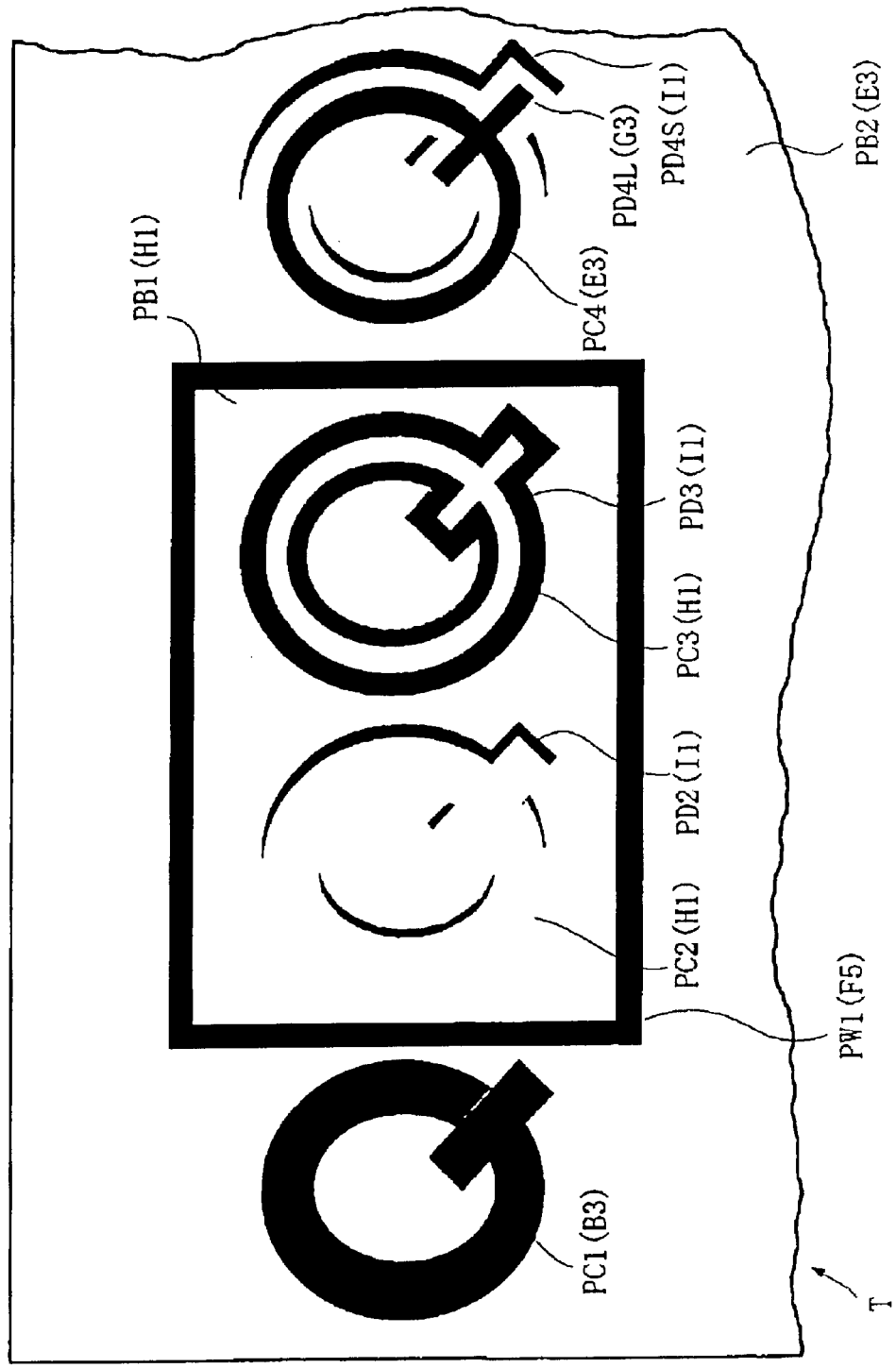
FIG. 30 is a diagram similar to FIG. 28, which is useful in explaining an example of a result of printing of the decorated color character image without a background pattern, which has been subjected to color-changing processing other than the FIG. 28 character color-transparentizing processing, by carrying out the FIG. 25 monochrome preview printing.

Further, although in preview printing operations as well for obtaining print images e.g. as shown in FIGS. 20 to 22, 27, 28 (similarly to the print images illustrated in FIGS. 12 to 15 in the first embodiment), the same character color-transparentizing processing as carried out in the case of the shading decoration (on the second "Q") and the character-outlining decoration is carried out on a decorated character image subjected to the character-outlining/shading decoration, that is, the decorated character image of the character C4 i.e. the fourth "Q") in the figures, in the case of the character-outlining/shading decoration, a character outline portion (e.g. PD4L) of the decorated character image is positioned between a character portion (e.g. PC4) and a character shade portion (e.g. PD4S) thereof. Therefore, it is also possible to transparentize the character outline portion instead of transparentizing the character portion (setting the character color to a transparent color). This makes a boundary dividing the character portion (e.g. PC4) and the character shade portion (e.g. PD4S) readily distinguishable by the transparent color, while the character outline portion itself can be made conspicuous by the transparent color (see FIG. 29 corresponding to FIG. 27, see FIG. 30 corresponding to FIG. 28).

Although in the first embodiment and the second embodiment, examples of print images are given in the description of output images since decorated character images are prepared for printing operations, that is, as print images, this is not limitative, but a decorated character image to be prepared (formed) may be an image prepared for display, that is, a display image, and an output image may be a display image. Further, a print image formed to have a high resolution for high resolution printing may be applied to limited-color output for outputting (displaying) the print image as a low resolution display image, e.g., for checking on the print image on a display screen which is only capable of monochrome display. In such a case, a decorated character image is formed as a print image for being printed on a tape (printing medium) T, and colors set for portions thereof are changed to be adapted to limited-color output when the decorated character image has a higher resolution than a resolution at which the character image can be displayed on a display screen. This makes it possible to display and check on a decorated character image prepared (formed) as a print image, even when the display resolution is lower than the print resolution.

Although in the above embodiments, print means in the tape printing apparatus 1 is used as image output means, this is not limitative, but any output means may be employed so long as it outputs an image. Further, the output means may be formed by any devices or apparatus, such as a printing apparatus and a display device, of a general type. Further, the invention can be applied to image processing for forming images for any possible purposes. Although in the above embodiments of the present invention, the printing apparatus of a thermal type is employed as an of example of print means in the above embodiments, this is not limitative, but the invention is applicable to an ink jet type, a laser type and the like.

It is further understood by those skilled in the art that the foregoing are preferred embodiments of the invention, and that various changes and modifications may be made without departing from the spirit and scope thereof.

What is claimed is:

1. An image processing method for creating a decorated character image formed by arranging at least one decorated character formed by providing a desired character decoration on at least one arbitrary character, on an arbitrary background, with a character color being set to a character portion corresponding to said at least one arbitrary character, and a decorative color being set to a decorative portion corresponding to a portion formed by said desired character decoration, said decorated character image including said character portion, said decorative portion, and a background portion formed by removing said character portion and said decorative portion from said background, the image processing method comprising the steps of:

setting at least one predetermined first default color each to a corresponding one of at least one of said character color and said decorative color, when arbitrary setting of said at least one of said character color and said decorative character is omitted;

setting, when a combination of said character color and said decorative color makes said character portion and said decorative portion difficult to discriminate from each other, a predetermined second default color to one of said character color and said decorative color; and forming said decorated character image by coloring said character portion and said decorative portion with said character color and said decorative color, respectively;

wherein said predetermined second default color used when an image of said background is a plain image which is achromatic or unicolored, or a background pattern image with a predetermined background pattern of a predetermined color provided on said plain image, is a transparent color which is assimilated with said background, and set to said character color.

2. An image processing method according to claim 1, wherein said at least one arbitrary character decoration includes character-shading decoration forming a shaded character by shading said at least one arbitrary character.

3. An image processing method according to claim 1, wherein said desired character decoration includes character-outlining decoration forming an outlined character by outlining a contour of said at least one arbitrary character.

4. An image processing method according to claim 1, wherein said desired character decoration includes character-outlining/shading decoration forming an outlined and shaded character by providing an outlined character with shades.

5. An image processing method according to claim 1, further including the step of outputting an output image based on said decorated character image.

6. An image processing method according to claim 5, wherein the step of outputting said output image is the step of displaying said output image on a display screen.

7. An image processing method according to claim 5, wherein the step of outputting said output image is the step of printing said output image on a printing medium.

8. An image processing method according to claim 7, wherein said printing medium is a tape.

9. An image processing method for creating a decorated character image formed by arranging at least one decorated character formed by providing a desired character decoration on at least one arbitrary character, on an arbitrary background, with a character color being set to a character portion corresponding to said at least one arbitrary character, and a decorative color being set to a decorative portion corresponding to a portion formed by said desired character decoration, said decorated character image including said character portion, said decorative portion, and a background portion formed by removing said character portion and said decorative portion from said background, the image processing method comprising the steps of:

setting at least one predetermined first default color each to a corresponding one of at least one of said character color and said decorative color, when arbitrary setting of said at least one of said character color and said decorative character is omitted;

setting, when a combination of said character color and said decorative color makes said character portion and said decorative portion difficult to discriminate from each other, a predetermined second default color to one of said character color and said decorative color; and forming said decorated character image by coloring said character portion and said decorative portion with said character color and said decorative color, respectively;

wherein said predetermined second default color used when an image of said background is a background pattern image having a predetermined background pattern of a predetermined color provided on a plain image which is achromatic or unicolored, is a color identical to a color of said plain image.

10. An image processing apparatus for creating a decorated character image formed by arranging at least one decorated character formed by providing a desired character decoration on at least one arbitrary character, on an arbitrary background, with a character color being set to a character portion corresponding to said at least one arbitrary character, and a decorative color being set to a decorative portion corresponding to a portion formed by said desired character decoration, said decorated character image including said character portion, said decorative portion, and a background portion formed by removing said character portion and said decorative portion from said background, the image processing apparatus comprising:

first default color-setting means for setting at least one predetermined first default color each to a corresponding one of at least one of said character color and said decorative color, when arbitrary setting of said at least one of said character color and said decorative character is omitted;

second default color-setting means for setting, when a combination of said character color and said decorative color makes said character portion and said decorative portion difficult to discriminate from each other, a predetermined second default color to one of said character color and said decorative color; and image-forming means for forming said decorated character image by coloring said character portion and said decorative portion with said character color and said decorative color, respectively;

wherein said predetermined second default color used when an image of said background is a plain image which is achromatic or unicolored, or a background pattern image with a predetermined background pattern of a predetermined color provided on said plain image, is a transparent color which is assimilated with said background, and set to said character color.

11. An image processing apparatus according to claim 10, wherein said at least one arbitrary character decoration includes character-shading decoration forming a shaded character by shading said at least one arbitrary character.

12. An image processing apparatus according to claim 10, wherein said desired character decoration includes character-outlining decoration forming an outlined character by outlining a contour of said at least one arbitrary character.

13. An image processing apparatus according to claim 10, wherein said desired character decoration includes character-outlining/shading decoration forming an outlined and shaded character by providing an outlined character with shades.

14. An image processing apparatus according to claim 10, further including image output means for outputting an output image based on said decorated character image.

15. An image processing apparatus according to claim 14, wherein said image output means comprises display means for displaying said output image on a display screen.

16. An image processing apparatus according to claim 14, wherein said image output means comprises printing means for printing said output image on a printing medium.

17. An image processing apparatus according to claim 16, wherein said printing medium is a tape.

18. An image processing apparatus for creating a decorated character image formed by arranging at least one decorated character formed by providing a desired character decoration on at least one arbitrary character, on an arbitrary background, with a character color being set to a character portion corresponding to said at least one arbitrary character, and a decorative color being set to a decorative portion corresponding to a portion formed by said desired character decoration, said decorated character image including said character portion, said decorative portion, and a background portion formed by removing said character portion and said decorative portion from said background, the image processing apparatus comprising:

first default color-setting means for setting at least one predetermined first default color each to a corresponding one of at least one of said character color and said decorative color, when arbitrary setting of said at least one of said character color and said decorative character is omitted;

second default color-setting means for setting, when a combination of said character color and said decorative color makes said character portion and said decorative portion difficult to discriminate from each other, a predetermined second default color to one of said character color and said decorative color; and image-forming means for forming said decorated character image by coloring said character portion and said decorative portion with said character color and said decorative color, respectively;

wherein said predetermined second default color used when an image of said background is a background pattern image having a predetermined background pattern of a predetermined color provided on a plain image which is achromatic or unicolored, is a color identical to a color of said plain image.

19. An image processing method comprising the steps of:

creating a decorated character image formed by arranging at least one decorated character formed by providing a desired character decoration on at least one arbitrary character, on an arbitrary background, with a character color being set to a character portion corresponding to said at least one arbitrary character, and a decorative color being set to a decorative portion corresponding to a portion formed by said desired character decoration, said decorated character image including said character portion, said decorative portion, and a background portion formed by removing said character portion and said decorative portion from said background, changing, when said decorated character image is to be subjected to limited-color output at a resolution lower than a resolution of said decorated character image as created, setting colors set for said character portion, said decorative portion, and said background portion of said decorated character image, including said character color and said decorative color, for said limited-color output;

changing, when a combination of said character color and said decorative color makes said character portion and said decorative portion difficult to discriminate from each other, one of said character color and said decorative color to a predetermined default color:

forming, when at least one of said setting colors is changed, an output image based on said decorated character image by using said setting colors including said changed at least one of said setting colors, or setting, when none of said setting colors are changed, said decorated character image to said output image; and outputting said output image.

20. An image processing method according to claim 19, wherein said predetermined default color used when an image of said background is a plain image which is achromatic or unicolored, or a background pattern image with a predetermined background pattern of a predetermined color provided on said plain image, is a transparent color which is assimilated with said background, and set to said character color.

21. An image processing method according to claim 19, wherein said predetermined default color used when an image of said background is a background pattern image having a predetermined background pattern of a predetermined color provided on a plain image which is achromatic or unicolored, is a color identical to a color of said plain image.

22. An image processing method according to claim 19, wherein said at least one arbitrary character decoration includes character-shading decoration forming a shaded character by shading said at least one arbitrary character.

23. An image processing method according to claim 19, wherein said desired character decoration includes character-outlining decoration forming an outlined character by outlining a contour of said at least one arbitrary character.

24. An image processing method according to claim 19, wherein said desired character decoration includes character-outlining/shading decoration forming an outlined and shaded character by providing an outlined character with shades.

25. An image processing method according to claim 19, further including the step of setting a limited color mode for carrying out said limited-color output, and wherein the step of changing said setting colors for said limited-color output is executed when said limited color mode is set.

26. An image processing method according to claim 19, wherein the step of outputting said output image is the step of displaying said output image on a display screen.

27. An image processing method according to claim 26, wherein said decorated character image is created as a print image to be printed on a printing medium, and wherein the step of changing said setting colors for said limited-color output is executed when said resolution of said decorated character image is higher than a resolution at which said display screen can perform display.

28. An image processing method according to claim 27, wherein said printing medium is a tape.

29. An image processing method according to claim 19, wherein the step of outputting said output image is the step of printing said output image on a printing medium.

30. An image processing method according to claim 29, wherein said printing medium is a tape.

31. An image processing apparatus comprising:

decorated character image-creating means for creating a decorated character image formed by arranging at least one decorated character formed by providing a desired character decoration on at least one arbitrary character, on an arbitrary background, with a character color being set to a character portion corresponding to said at least one arbitrary character, and a decorative color being set to a decorative portion corresponding to a portion formed by said desired character decoration, said decorated character image including said character portion, said decorative portion, and a background portion formed by removing said character portion and said decorative portion from said background, limited color-setting means for changing, when said decorated character image is to be subjected to limited-color output at a resolution lower than a resolution of said decorated character image as created, setting colors set for said character portion, said decorative portion, and said background portion of said decorated character image, including said character color and said decorative color, for said limited-color output;

default color-setting means for changing, when a combination of said character color and said decorative color makes said character portion and said decorative portion difficult to discriminate from each other, one of said character color and said decorative color to a predetermined default color;

output image-forming/setting means for forming, when at least one of said setting colors is changed, an output image based on said decorated character image by using said setting colors including said changed at least one of said setting colors, or setting, when none of said setting colors are changed, said decorated character image to said output image; and image output means for outputting said output image.

32. An image processing apparatus according to claim 31, wherein said predetermined default color used when an image of said background is a plain image which is achromatic or unicolored, or a background pattern image with a predetermined background pattern of a predetermined color provided on said plain image, is a transparent color which is assimilated with said background, and set to said character color.

33. An image processing apparatus according to claim 31, wherein said predetermined default color used when an image of said background is a background pattern image having a predetermined background pattern of a predetermined color provided on a plain image which is achromatic or unicolored, is a color identical to a color of said plain image.

34. An image processing apparatus according to claim 31, wherein said at least one arbitrary character decoration includes character-shading decoration forming a shaded character by shading said at least one arbitrary character.

35. An image processing apparatus according to claim 31, wherein said desired character decoration includes character-outlining decoration forming an outlined character by outlining a contour of said at least one arbitrary character.

36. An image processing apparatus according to claim 31, wherein said desired character decoration includes character-outlining/shading decoration forming an outlined and shaded character by providing an outlined character with shades.

37. An image processing apparatus according to claim 31, further including limited color mode-setting means for setting a limited color mode for carrying out said limited-color output, and wherein said limited color-setting means changes said setting colors, when said limited color mode is set.

38. An image processing apparatus according to claim 31, wherein said image output means comprises display means for displaying said output image on a display screen.

39. An image processing apparatus according to claim 38, wherein said decorated character image is created as a print image to be printed on a printing medium, and wherein said limited color-setting means changes said setting colors when a resolution of said decorated character image is higher than a resolution at which said display screen can perform display.

40. An image processing apparatus according to claim 39, wherein said printing medium is a tape.

41. An image processing apparatus according to claim 31, wherein said image output means comprises printing means for printing said output image on a printing medium.

42. An image processing apparatus according to claim 41, wherein said printing medium is a tape.

* * * * *